United States Patent
Oh

(10) Patent No.: US 12,504,667 B2
(45) Date of Patent: Dec. 23, 2025

(54) WAVEGUIDE LIGHT MULTIPLEXER USING CROSSED GRATINGS

(71) Applicant: Magic Leap, Inc., Plantation, FL (US)

(72) Inventor: Chulwoo Oh, Sammamish, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/738,024

(22) Filed: Jun. 9, 2024

(65) Prior Publication Data

US 2024/0329492 A1 Oct. 3, 2024

Related U.S. Application Data

(63) Continuation of application No. 18/179,779, filed on Mar. 7, 2023, now Pat. No. 12,044,952, which is a
(Continued)

(51) Int. Cl.
*G02F 1/365* (2006.01)
*G02B 3/00* (2006.01)
(Continued)

(52) U.S. Cl.
CPC ............... *G02F 1/365* (2013.01); *G02B 3/00* (2013.01); *G02F 1/0045* (2013.01);
(Continued)

(58) Field of Classification Search
CPC .. G02F 1/365; G02F 1/0045; G02F 1/133528; G02F 2201/30; G02F 2201/305; G02F 2201/307; G02B 3/00
See application file for complete search history.

(56) References Cited

U.S. PATENT DOCUMENTS

| 4,251,137 A | 2/1981 | Knop et al. |
| 4,693,544 A | 9/1987 | Yamasaki et al. |
| (Continued) | | |

FOREIGN PATENT DOCUMENTS

| CN | 101133348 A | 2/2008 |
| CN | 101133348 B | 9/2010 |
| (Continued) | | |

OTHER PUBLICATIONS

Davis et al., Polarization beam splitters using polarization diffraction gratings, Opt. Lett. 26, 587-589 (2001) (Year: 2001).*
(Continued)

*Primary Examiner* — Peter Radkowski
(74) *Attorney, Agent, or Firm* — Tobias Intellectual Property Law, PLLC

(57) ABSTRACT

A two-dimensional waveguide light multiplexer can efficiently multiplex and distribute a light signal in two dimensions. An example of a two-dimensional waveguide light multiplexer can include a waveguide, a first diffraction grating, and a second diffraction grating arranged such that the grating direction of the first diffraction grating is perpendicular to the grating direction of the second diffraction grating. In some examples, the first and second diffraction gratings are on opposite sides of a waveguide. In some examples, the first and second diffraction gratings are on a same side of a waveguide, with the second grating over the first grating.

20 Claims, 31 Drawing Sheets

Related U.S. Application Data continuation of application No. 17/143,039, filed on Jan. 6, 2021, now Pat. No. 11,609,480, which is a continuation of application No. 15/815,567, filed on Nov. 16, 2017, now Pat. No. 11,378,864.

(60) Provisional application No. 62/424,293, filed on Nov. 18, 2016.

(51) Int. Cl.
  *G02F 1/00* (2006.01)
  *G02F 1/1335* (2006.01)

(52) U.S. Cl.
  CPC .. *G02F 1/133528* (2013.01); *G02F 1/133541* (2021.01); *G02F 2201/30* (2013.01); *G02F 2201/305* (2013.01); *G02F 2201/307* (2013.01)

(56) References Cited

U.S. PATENT DOCUMENTS

| | | | |
|---|---|---|---|
| 4,763,995 A | 8/1988 | Katagiri et al. | |
| 4,834,500 A | 5/1989 | Hilsum et al. | |
| 4,850,681 A | 7/1989 | Yamanobe et al. | |
| 4,856,869 A | 8/1989 | Sakata et al. | |
| 4,991,924 A | 2/1991 | Shankar et al. | |
| 5,082,354 A | 1/1992 | Kalmanash | |
| 5,091,983 A | 2/1992 | Lukosz | |
| 5,187,372 A | 2/1993 | Clube | |
| 5,416,866 A | 5/1995 | Sahlen | |
| 5,473,455 A | 12/1995 | Koike et al. | |
| 5,544,268 A | 8/1996 | Bischel et al. | |
| 5,566,982 A | 10/1996 | Lehureau et al. | |
| 5,808,797 A | 9/1998 | Bloom et al. | |
| 5,825,448 A | 10/1998 | Bos et al. | |
| 5,915,051 A | 6/1999 | Damask et al. | |
| 5,966,483 A | 10/1999 | Chowdhury | |
| 6,014,197 A | 1/2000 | Hikmet | |
| 6,040,885 A | 3/2000 | Koike et al. | |
| 6,181,393 B1 | 1/2001 | Enomoto et al. | |
| 6,188,462 B1 | 2/2001 | Lavrentovich et al. | |
| 6,334,960 B1 | 1/2002 | Willson et al. | |
| 6,542,671 B1 | 4/2003 | Ma et al. | |
| 6,680,767 B2 | 1/2004 | Coates et al. | |
| 6,690,845 B1 | 2/2004 | Yoshimura et al. | |
| 6,735,224 B2 | 5/2004 | Murry et al. | |
| 6,750,941 B2 | 6/2004 | Satoh et al. | |
| 6,850,221 B1 | 2/2005 | Tickle | |
| 6,873,087 B1 | 3/2005 | Choi et al. | |
| 6,900,881 B2 | 5/2005 | Sreenivasan et al. | |
| 6,982,818 B2 | 1/2006 | Riza et al. | |
| 7,023,466 B2 | 4/2006 | Favalora et al. | |
| 7,070,405 B2 | 7/2006 | Sreenivasan et al. | |
| 7,098,572 B2 | 8/2006 | Choi et al. | |
| 7,122,482 B2 | 10/2006 | Xu et al. | |
| 7,140,861 B2 | 11/2006 | Watts et al. | |
| 7,206,107 B2 | 4/2007 | Levola | |
| 7,341,348 B2 | 3/2008 | Eagan | |
| 7,375,784 B2 | 5/2008 | Smith et al. | |
| 7,454,103 B2 | 11/2008 | Parriaux | |
| 7,471,362 B1 | 12/2008 | Jones | |
| 7,502,168 B2 | 3/2009 | Akutsu et al. | |
| 7,519,096 B2 | 4/2009 | Bouma et al. | |
| 7,573,640 B2 | 8/2009 | Nivon et al. | |
| 7,692,759 B2 | 4/2010 | Escuti et al. | |
| 7,705,943 B2 | 4/2010 | Kume et al. | |
| 7,841,745 B2 | 11/2010 | Mukawa | |
| 7,990,543 B1 | 8/2011 | Mello et al. | |
| 8,064,035 B2 | 11/2011 | Escuti et al. | |
| 8,076,386 B2 | 12/2011 | Xu et al. | |
| 8,160,411 B2 | 4/2012 | Levola et al. | |
| 8,233,204 B1 | 7/2012 | Robbins et al. | |
| 8,248,458 B2 | 8/2012 | Schowengerdt et al. | |
| 8,254,031 B2 | 8/2012 | Levola | |
| 8,264,623 B2 | 9/2012 | Marrucci | |
| 8,339,566 B2 | 12/2012 | Escuti et al. | |
| 8,494,229 B2 | 7/2013 | Järvenpää et al. | |
| 8,508,848 B2 | 8/2013 | Saarikko | |
| 8,520,170 B2 | 8/2013 | Escuti et al. | |
| 8,547,638 B2 | 10/2013 | Levola | |
| 8,548,290 B2 * | 10/2013 | Travers | G02B 27/01 359/569 |
| 8,619,363 B1 | 12/2013 | Coleman | |
| 8,654,420 B2 | 2/2014 | Simmonds | |
| 8,757,812 B2 | 6/2014 | Melville et al. | |
| 8,810,913 B2 * | 8/2014 | Simmonds | G02B 27/0172 359/631 |
| 8,842,294 B2 | 9/2014 | Minoda et al. | |
| 8,842,368 B2 | 9/2014 | Simmonds et al. | |
| 8,847,162 B2 | 9/2014 | Favier | |
| 8,848,289 B2 | 9/2014 | Amirparviz et al. | |
| 8,885,161 B2 | 11/2014 | Scheeline et al. | |
| 8,885,997 B2 | 11/2014 | Nguyen et al. | |
| 8,950,867 B2 | 2/2015 | Macnamara | |
| 8,962,103 B2 | 2/2015 | Lee et al. | |
| 8,965,152 B2 * | 2/2015 | Simmonds | G02B 27/145 385/27 |
| 8,985,803 B2 * | 3/2015 | Bohn | G02F 1/292 362/104 |
| 9,164,290 B2 * | 10/2015 | Robbins | G02B 27/0172 |
| 9,164,351 B2 * | 10/2015 | Bohn | G02F 1/133524 |
| 9,195,092 B2 | 11/2015 | Escuti et al. | |
| 9,215,293 B2 | 12/2015 | Miller | |
| 9,283,720 B2 | 3/2016 | Minoda et al. | |
| 9,291,754 B2 | 3/2016 | Masuyama et al. | |
| 9,310,559 B2 | 4/2016 | Macnamara | |
| 9,310,566 B2 * | 4/2016 | Valera | G02B 6/0035 |
| 9,341,846 B2 * | 5/2016 | Popovich | G02B 6/0035 |
| 9,341,850 B1 * | 5/2016 | Cakmakci | G02B 27/4216 |
| 9,345,402 B2 | 5/2016 | Gao | |
| 9,348,143 B2 | 5/2016 | Gao et al. | |
| D758,367 S | 6/2016 | Natsume | |
| 9,366,864 B1 * | 6/2016 | Brown | G02B 17/0884 |
| 9,406,166 B2 * | 8/2016 | Futterer | G02B 27/0172 |
| 9,411,210 B2 | 8/2016 | Sugiyama et al. | |
| 9,417,452 B2 | 8/2016 | Schowengerdt et al. | |
| 9,423,360 B1 * | 8/2016 | Kostamo | G01M 11/0264 |
| 9,456,744 B2 * | 10/2016 | Popovich | H04N 23/20 |
| 9,470,906 B2 | 10/2016 | Kaji et al. | |
| 9,547,174 B2 | 1/2017 | Gao et al. | |
| 9,568,730 B2 | 2/2017 | Yamada et al. | |
| 9,575,366 B2 | 2/2017 | Srivastava et al. | |
| 9,632,226 B2 * | 4/2017 | Waldern | G02B 5/1819 |
| 9,651,778 B2 | 5/2017 | Yokoyama | |
| 9,664,905 B2 * | 5/2017 | Bohn | G02B 27/0172 |
| 9,671,566 B2 | 6/2017 | Abovitz et al. | |
| 9,715,067 B1 | 7/2017 | Brown et al. | |
| 9,720,236 B2 | 8/2017 | Yokoyama | |
| 9,740,006 B2 | 8/2017 | Gao | |
| 9,791,700 B2 | 10/2017 | Schowengerdt | |
| 9,791,703 B1 | 10/2017 | Vallius et al. | |
| 9,846,967 B2 | 12/2017 | Schowengerdt | |
| 9,851,563 B2 | 12/2017 | Gao et al. | |
| 9,857,591 B2 | 1/2018 | Welch et al. | |
| 9,874,667 B2 * | 1/2018 | Simmonds | G02B 6/0016 |
| 9,874,749 B2 | 1/2018 | Bradski et al. | |
| 9,904,058 B2 | 2/2018 | Yeoh et al. | |
| 9,933,684 B2 * | 4/2018 | Brown | G02F 1/29 |
| 10,007,233 B2 | 6/2018 | Schilling et al. | |
| 10,018,844 B2 * | 7/2018 | Levola | G02B 6/00 |
| 10,025,009 B2 | 7/2018 | Yamada et al. | |
| 10,025,160 B2 | 7/2018 | Park et al. | |
| 10,067,347 B2 | 9/2018 | Vallius et al. | |
| 10,146,053 B2 * | 12/2018 | Yuan | G03H 1/202 |
| 10,156,725 B2 | 12/2018 | TeKolste et al. | |
| 10,191,288 B2 | 1/2019 | Singer et al. | |
| 10,254,454 B2 | 4/2019 | Klug et al. | |
| 10,260,864 B2 | 4/2019 | Edwin et al. | |
| 10,261,318 B2 | 4/2019 | TeKolste et al. | |
| 10,267,970 B2 | 4/2019 | Jones, Jr. et al. | |
| 10,345,592 B2 | 7/2019 | Samec et al. | |
| 10,379,358 B2 | 8/2019 | Olkkonen et al. | |
| 10,386,639 B2 | 8/2019 | Samec et al. | |
| 10,409,059 B2 * | 9/2019 | Mason | G02B 6/34 |

(56) References Cited

U.S. PATENT DOCUMENTS

| | | |
|---|---|---|
| 10,451,799 B2 | 10/2019 | Klug et al. |
| 10,466,478 B2 | 11/2019 | Klug et al. |
| 10,466,561 B2 | 11/2019 | Oh |
| 10,534,179 B1 | 1/2020 | Ahuja et al. |
| 10,690,826 B2 | 6/2020 | Klug et al. |
| 10,690,915 B2 * | 6/2020 | Popovich .............. G02B 6/0076 |
| 10,852,547 B2 | 12/2020 | Bhargava et al. |
| 10,884,244 B2 | 1/2021 | Yamada et al. |
| 11,204,462 B2 | 12/2021 | Klug et al. |
| 11,237,393 B2 | 2/2022 | Bhargava et al. |
| 11,238,836 B2 | 2/2022 | Mathur et al. |
| 11,320,571 B2 * | 5/2022 | Brown ................. G02B 6/0076 |
| 11,378,864 B2 | 7/2022 | Oh |
| 11,609,480 B2 | 3/2023 | Oh |
| 12,044,952 B2 | 7/2024 | Oh |
| 2002/0097962 A1 | 7/2002 | Yoshimura et al. |
| 2002/0101560 A1 | 8/2002 | Satoh et al. |
| 2002/0126249 A1 | 9/2002 | Liang et al. |
| 2002/0167638 A1 | 11/2002 | Byun et al. |
| 2002/0172237 A1 | 11/2002 | Murry et al. |
| 2003/0050416 A1 | 3/2003 | Smith et al. |
| 2003/0147112 A1 | 8/2003 | Mukawa |
| 2003/0161573 A1 | 8/2003 | Ishida et al. |
| 2004/0007465 A1 | 1/2004 | Goldberg et al. |
| 2004/0022888 A1 | 2/2004 | Sreenivasan et al. |
| 2004/0120647 A1 | 6/2004 | Sakata et al. |
| 2004/0130797 A1 | 7/2004 | Leigh Travis |
| 2004/0150141 A1 | 8/2004 | Chao et al. |
| 2004/0184163 A1 | 9/2004 | Nishioka et al. |
| 2004/0189938 A1 | 9/2004 | Eagan |
| 2004/0191429 A1 | 9/2004 | Patrick |
| 2005/0042391 A1 | 2/2005 | Ryan et al. |
| 2005/0072959 A1 | 4/2005 | Moia et al. |
| 2005/0073577 A1 | 4/2005 | Sudo et al. |
| 2005/0213212 A1 | 9/2005 | Ooi et al. |
| 2005/0232530 A1 | 10/2005 | Kekas |
| 2005/0253112 A1 | 11/2005 | Kelly et al. |
| 2005/0270312 A1 | 12/2005 | Lad et al. |
| 2005/0270461 A1 | 12/2005 | Kitson et al. |
| 2006/0028436 A1 | 2/2006 | Armstrong |
| 2006/0120247 A1 | 6/2006 | Noda et al. |
| 2006/0121358 A1 | 6/2006 | Rich et al. |
| 2006/0126179 A1 | 6/2006 | Levola |
| 2006/0157443 A1 | 7/2006 | Mei |
| 2006/0221448 A1 | 10/2006 | Nivon et al. |
| 2006/0227283 A1 | 10/2006 | Ooi et al. |
| 2006/0228073 A1 | 10/2006 | Mukawa et al. |
| 2007/0031097 A1 | 2/2007 | Heikenfeld et al. |
| 2007/0070504 A1 | 3/2007 | Akutsu et al. |
| 2007/0081123 A1 | 4/2007 | Lewis |
| 2007/0109466 A1 | 5/2007 | Choi et al. |
| 2007/0229955 A1 | 10/2007 | Kawamura et al. |
| 2007/0273957 A1 | 11/2007 | Zalevsky et al. |
| 2008/0043166 A1 | 2/2008 | Liu et al. |
| 2008/0043334 A1 | 2/2008 | Itzkovitch et al. |
| 2008/0138013 A1 | 6/2008 | Parriaux |
| 2008/0169479 A1 | 7/2008 | Xu et al. |
| 2008/0278675 A1 | 11/2008 | Escuti et al. |
| 2009/0141216 A1 | 6/2009 | Marrucci |
| 2009/0303599 A1 | 12/2009 | Levola |
| 2010/0110363 A1 | 5/2010 | Escuti et al. |
| 2010/0142570 A1 | 6/2010 | Konttinen et al. |
| 2010/0142892 A1 | 6/2010 | Kuittinen et al. |
| 2010/0165465 A1 | 7/2010 | Levola |
| 2010/0177388 A1 | 7/2010 | Cohen et al. |
| 2010/0207964 A1 | 8/2010 | Kimmel et al. |
| 2010/0214659 A1 | 8/2010 | Levola |
| 2010/0225876 A1 | 9/2010 | Escuti et al. |
| 2010/0231693 A1 | 9/2010 | Levola |
| 2010/0232016 A1 | 9/2010 | Landa et al. |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0321781 A1 | 12/2010 | Levola et al. |
| 2011/0002143 A1 * | 1/2011 | Saarikko .............. G02B 6/0016 385/36 |
| 2011/0019874 A1 | 1/2011 | Järvenpää et al. |
| 2011/0024950 A1 | 2/2011 | Kruglick |
| 2011/0049761 A1 | 3/2011 | Mataki |
| 2011/0194058 A1 | 8/2011 | Amos et al. |
| 2011/0213664 A1 | 9/2011 | Osterhout et al. |
| 2011/0242461 A1 | 10/2011 | Escuti et al. |
| 2011/0242661 A1 * | 10/2011 | Simmonds ........... G02B 27/145 385/27 |
| 2011/0242670 A1 | 10/2011 | Simmonds |
| 2012/0021140 A1 | 1/2012 | Dijksman et al. |
| 2012/0033306 A1 | 2/2012 | Valera et al. |
| 2012/0086903 A1 | 4/2012 | Escuti et al. |
| 2012/0113678 A1 | 5/2012 | Cornelissen et al. |
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0218301 A1 | 8/2012 | Miller |
| 2012/0224126 A1 | 9/2012 | Chang et al. |
| 2012/0242918 A1 | 9/2012 | Valyukh et al. |
| 2012/0300311 A1 * | 11/2012 | Simmonds ......... G02B 27/0172 359/630 |
| 2012/0320460 A1 | 12/2012 | Levola |
| 2012/0327330 A1 | 12/2012 | Takahashi et al. |
| 2012/0328725 A1 | 12/2012 | Minoda et al. |
| 2013/0051730 A1 * | 2/2013 | Travers .............. G02B 27/4272 385/37 |
| 2013/0082922 A1 | 4/2013 | Miller |
| 2013/0093936 A1 | 4/2013 | Scheeline et al. |
| 2013/0117377 A1 | 5/2013 | Miller |
| 2013/0125027 A1 | 5/2013 | Abovitz |
| 2013/0169909 A1 | 7/2013 | Srivastava et al. |
| 2013/0175449 A1 | 7/2013 | Favier |
| 2013/0208234 A1 | 8/2013 | Lewis |
| 2013/0222384 A1 * | 8/2013 | Futterer ................. G03H 1/26 345/426 |
| 2013/0235440 A1 | 9/2013 | Takeda et al. |
| 2013/0242262 A1 | 9/2013 | Lewis |
| 2013/0242392 A1 | 9/2013 | Amirparviz et al. |
| 2013/0250207 A1 * | 9/2013 | Bohn ................. G02B 27/0172 372/50.11 |
| 2013/0301988 A1 | 11/2013 | Monmayrant et al. |
| 2013/0314765 A1 | 11/2013 | Padilla et al. |
| 2013/0314789 A1 | 11/2013 | Saarikko et al. |
| 2013/0321747 A1 | 12/2013 | Kondo et al. |
| 2013/0322810 A1 | 12/2013 | Robbins |
| 2014/0043689 A1 * | 2/2014 | Mason ................ G02B 6/4298 359/630 |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0104665 A1 * | 4/2014 | Popovich ............. G02B 6/0076 359/15 |
| 2014/0118829 A1 | 5/2014 | Ma et al. |
| 2014/0140653 A1 * | 5/2014 | Brown ................. G02B 6/0033 385/10 |
| 2014/0140654 A1 * | 5/2014 | Brown ............... G02B 27/0172 385/10 |
| 2014/0168735 A1 * | 6/2014 | Yuan ........................ G03H 1/28 359/13 |
| 2014/0177023 A1 | 6/2014 | Gao et al. |
| 2014/0204438 A1 | 7/2014 | Yamada et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0267420 A1 | 9/2014 | Schowengerdt et al. |
| 2014/0300695 A1 | 10/2014 | Smalley et al. |
| 2014/0306866 A1 | 10/2014 | Miller et al. |
| 2014/0340749 A1 | 11/2014 | Yamada et al. |
| 2014/0346694 A1 | 11/2014 | Minoda et al. |
| 2015/0002526 A1 | 1/2015 | Ginzburg |
| 2015/0002528 A1 * | 1/2015 | Bohn ................. G02B 27/0172 345/589 |
| 2015/0015879 A1 | 1/2015 | Papadopoulos et al. |
| 2015/0016777 A1 | 1/2015 | Abovitz et al. |

(56) References Cited

U.S. PATENT DOCUMENTS

| | | |
|---|---|---|
| 2015/0062500 A1 | 3/2015 | Park et al. |
| 2015/0062715 A1 | 3/2015 | Yamada et al. |
| 2015/0086163 A1* | 3/2015 | Valera ............... G02B 6/0035 427/163.2 |
| 2015/0103306 A1 | 4/2015 | Kaji et al. |
| 2015/0125109 A1* | 5/2015 | Robbins ............ G02B 27/0172 385/10 |
| 2015/0146147 A1 | 5/2015 | Choi et al. |
| 2015/0168731 A1 | 6/2015 | Robbins |
| 2015/0168802 A1* | 6/2015 | Bohn ..................... G02F 1/292 349/11 |
| 2015/0177591 A1 | 6/2015 | Sugiyama et al. |
| 2015/0178939 A1 | 6/2015 | Bradski et al. |
| 2015/0192897 A1 | 7/2015 | Schilling et al. |
| 2015/0205126 A1 | 7/2015 | Schowengerdt |
| 2015/0205182 A1 | 7/2015 | Leister |
| 2015/0222883 A1 | 8/2015 | Welch |
| 2015/0222884 A1 | 8/2015 | Cheng |
| 2015/0234205 A1 | 8/2015 | Schowengerdt |
| 2015/0235431 A1 | 8/2015 | Schowengerdt |
| 2015/0235440 A1 | 8/2015 | Schowengerdt |
| 2015/0241705 A1 | 8/2015 | Abovitz et al. |
| 2015/0260992 A1 | 9/2015 | Luttmann et al. |
| 2015/0268415 A1 | 9/2015 | Schowengerdt et al. |
| 2015/0277117 A1 | 10/2015 | Yamada et al. |
| 2015/0289762 A1* | 10/2015 | Popovich ................. G02B 6/34 351/209 |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033698 A1 | 2/2016 | Escuti et al. |
| 2016/0033771 A1 | 2/2016 | Tremblay et al. |
| 2016/0041390 A1 | 2/2016 | Poon et al. |
| 2016/0055801 A1 | 2/2016 | Kim et al. |
| 2016/0077338 A1* | 3/2016 | Robbins ............ G02B 27/4205 359/489.08 |
| 2016/0085300 A1 | 3/2016 | Robbins et al. |
| 2016/0097930 A1 | 4/2016 | Robbins et al. |
| 2016/0116739 A1 | 4/2016 | TeKolste et al. |
| 2016/0116979 A1 | 4/2016 | Border |
| 2016/0119057 A1 | 4/2016 | Mekis et al. |
| 2016/0124223 A1 | 5/2016 | Shinbo et al. |
| 2016/0124229 A1 | 5/2016 | Yokoyama |
| 2016/0154150 A1 | 6/2016 | Simmonds et al. |
| 2016/0167422 A1 | 6/2016 | Brehm et al. |
| 2016/0209648 A1 | 7/2016 | Haddick et al. |
| 2016/0216416 A1 | 7/2016 | TeKolste et al. |
| 2016/0231257 A1* | 8/2016 | Kostamo ............ G01N 21/8851 |
| 2016/0231567 A1 | 8/2016 | Saarikko et al. |
| 2016/0231570 A1* | 8/2016 | Levola ................ G02B 6/0035 |
| 2016/0234485 A1* | 8/2016 | Robbins ............... H04N 13/332 |
| 2016/0238772 A1* | 8/2016 | Waldern ............... G02B 5/1823 |
| 2016/0270656 A1 | 9/2016 | Samec et al. |
| 2016/0282615 A1 | 9/2016 | Yokoyama |
| 2016/0282808 A1 | 9/2016 | Smalley |
| 2016/0291328 A1* | 10/2016 | Popovich ............ G02B 27/0176 |
| 2016/0320536 A1* | 11/2016 | Simmonds ........... G02B 5/1823 |
| 2017/0007182 A1 | 1/2017 | Samec et al. |
| 2017/0010466 A1 | 1/2017 | Klug et al. |
| 2017/0010488 A1 | 1/2017 | Klug et al. |
| 2017/0131595 A1 | 5/2017 | Yim et al. |
| 2017/0153460 A1 | 6/2017 | Vallius et al. |
| 2017/0219841 A1 | 8/2017 | Popovich et al. |
| 2017/0307886 A1 | 10/2017 | Stenberg et al. |
| 2017/0322419 A1 | 11/2017 | TeKolste et al. |
| 2017/0373459 A1 | 12/2017 | Weng et al. |
| 2018/0004289 A1 | 1/2018 | Wilson et al. |
| 2018/0046859 A1 | 2/2018 | Jarvenpaa |
| 2018/0059320 A1 | 3/2018 | Miller et al. |
| 2018/0081176 A1 | 3/2018 | Olkkonen et al. |
| 2018/0113309 A1 | 4/2018 | Robbins et al. |
| 2018/0113310 A1 | 4/2018 | Rolland et al. |
| 2018/0143438 A1 | 5/2018 | Oh |
| 2018/0143470 A1 | 5/2018 | Oh et al. |
| 2018/0143485 A1 | 5/2018 | Oh |
| 2018/0143509 A1 | 5/2018 | Oh |
| 2018/0164627 A1 | 6/2018 | Oh |
| 2018/0164645 A1 | 6/2018 | Oh et al. |
| 2018/0188528 A1 | 7/2018 | Browy et al. |
| 2018/0188542 A1 | 7/2018 | Waldern et al. |
| 2018/0210146 A1 | 7/2018 | Klug et al. |
| 2018/0217395 A1 | 8/2018 | Lin et al. |
| 2018/0231771 A1 | 8/2018 | Schuck, III et al. |
| 2018/0239147 A1 | 8/2018 | Schowengerdt et al. |
| 2018/0239177 A1 | 8/2018 | Oh |
| 2018/0275350 A1 | 9/2018 | Oh et al. |
| 2018/0275409 A1 | 9/2018 | Gao et al. |
| 2018/0275410 A1 | 9/2018 | Yeoh et al. |
| 2018/0348876 A1 | 12/2018 | Banerjee et al. |
| 2019/0033684 A1 | 1/2019 | Favalora et al. |
| 2019/0041650 A1 | 2/2019 | Yamada et al. |
| 2019/0086674 A1 | 3/2019 | Sinay et al. |
| 2019/0121142 A1 | 4/2019 | TeKolste et al. |
| 2019/0187474 A1 | 6/2019 | Bhargava et al. |
| 2019/0227211 A1 | 7/2019 | Klug et al. |
| 2019/0235252 A1 | 8/2019 | Freedman et al. |
| 2019/0243141 A1 | 8/2019 | TeKolste et al. |
| 2019/0243142 A1 | 8/2019 | TeKolste et al. |
| 2020/0012044 A1 | 1/2020 | Klug et al. |
| 2020/0159023 A1 | 5/2020 | Bhargava et al. |
| 2020/0174304 A1 | 6/2020 | Oh |
| 2020/0241303 A1 | 7/2020 | Dobschal |
| 2020/0400955 A1 | 12/2020 | Messer et al. |
| 2021/0041704 A1 | 2/2021 | Bhargava et al. |
| 2021/0302802 A1 | 9/2021 | Oh |
| 2021/0364803 A1 | 11/2021 | Schowengerdt et al. |
| 2022/0148538 A1 | 5/2022 | Mathur et al. |
| 2023/0205046 A1 | 6/2023 | Oh |

FOREIGN PATENT DOCUMENTS

| | | |
|---|---|---|
| CN | 101945612 A | 1/2011 |
| CN | 103196562 A | 7/2013 |
| CN | 104145208 A | 11/2014 |
| CN | 104423042 A | 3/2015 |
| CN | 102683803 A | 4/2015 |
| CN | 104903117 A | 9/2015 |
| CN | 105005106 A | 10/2015 |
| CN | 106101691 A | 11/2016 |
| CN | 106842397 A | 6/2017 |
| EP | 0132077 A1 | 1/1985 |
| EP | 0415735 A2 | 3/1991 |
| EP | 0549283 A2 | 6/1993 |
| EP | 2065750 A2 | 6/2009 |
| EP | 2664430 A1 | 11/2013 |
| EP | 2767852 A1 | 8/2014 |
| GB | 2539166 A | 12/2016 |
| JP | S62269174 A | 11/1987 |
| JP | H0384516 A | 4/1991 |
| JP | 2000121815 A | 4/2000 |
| JP | 2001091715 A | 4/2001 |
| JP | 2004184505 A | 7/2004 |
| JP | 2005316304 A | 11/2005 |
| JP | 2005316314 A | 11/2005 |
| JP | 2010271565 A | 12/2010 |
| JP | 5151518 B2 | 2/2013 |
| JP | 2014089476 A | 5/2014 |
| JP | 2014132328 A | 7/2014 |
| JP | 2014224846 A | 12/2014 |
| JP | 2016085426 A | 5/2016 |
| JP | 2016085430 A | 5/2016 |
| JP | 2016177232 A | 10/2016 |
| JP | WO2014156167 A1 | 2/2017 |
| KR | 20120007050 A | 1/2012 |
| KR | 20120050398 A | 5/2012 |
| KR | 20160052334 A | 5/2016 |
| KR | 20160062030 A | 6/2016 |

(56) References Cited

FOREIGN PATENT DOCUMENTS

| | | |
|---|---|---|
| WO | 2005024469 A2 | 3/2005 |
| WO | 2006064301 A1 | 6/2006 |
| WO | 2006092758 A2 | 9/2006 |
| WO | 2006106501 A1 | 10/2006 |
| WO | 2007029034 A1 | 3/2007 |
| WO | 2008130555 A1 | 10/2008 |
| WO | 2008130561 A1 | 10/2008 |
| WO | 2010067114 A1 | 6/2010 |
| WO | 2011107831 A1 | 9/2011 |
| WO | 2013054115 A1 | 4/2013 |
| WO | 2014016403 A1 | 1/2014 |
| WO | 2014036537 A1 | 3/2014 |
| WO | 2014091204 A1 | 6/2014 |
| WO | 2014172252 A1 | 10/2014 |
| WO | 2015081313 A2 | 6/2015 |
| WO | 2016020643 A1 | 2/2016 |
| WO | 2016042283 A1 | 3/2016 |
| WO | 2016054092 A1 | 4/2016 |
| WO | 2016082031 A1 | 6/2016 |
| WO | 2016113533 A2 | 7/2016 |
| WO | 2016162606 A1 | 10/2016 |
| WO | 2016205249 A1 | 12/2016 |
| WO | 2016205256 A1 | 12/2016 |
| WO | 2017123793 A1 | 7/2017 |
| WO | 2017180403 A1 | 10/2017 |
| WO | 2017213907 A1 | 12/2017 |
| WO | 2018093730 A1 | 5/2018 |
| WO | 2018094079 A1 | 5/2018 |
| WO | 2018094093 A1 | 5/2018 |
| WO | 2018106963 A1 | 6/2018 |
| WO | 2018112101 A1 | 6/2018 |
| WO | 2018136892 A1 | 7/2018 |
| WO | 2018156779 A1 | 8/2018 |
| WO | 2018156784 A1 | 8/2018 |
| WO | 2018175343 A1 | 9/2018 |
| WO | 2018175488 A1 | 9/2018 |
| WO | 2019118930 A1 | 6/2019 |
| WO | 2020069026 A1 | 4/2020 |
| WO | 2020106824 A1 | 5/2020 |
| WO | 2020257469 A1 | 12/2020 |

OTHER PUBLICATIONS

Giridhar et al., Optical diffraction in nonuniform cholestericliquid crystals: phase-grating mode, J. Opt. Soc. Am. A 19, 19-23 (2002) (Year: 2002).*
Jing et al., Polarity-dependent bistable optical grating in chiral bent-core nematic liquid crystals, Opt. Mater. Express 6, 2584-2592 (2016) (Year: 2016).*
Oh et al., Achromatic diffraction from polarization gratings with high efficiency, Opt. Lett. 33, 2287-2289 (2008) (Year: 2008).*
Zhao et al., Beam splitting, combining, and cross coupling through multiple superimposed vol. index gratings, Optics & Laser Technology, vol. 33, Issue 1, 2001, pp. 23-28, ISSN 0030-3992 (Year: 2001).*
Lin, R. et al. Molecular-Scale soft imprint lithography for alignment layers in liquid crystal devices; Nano Letters, vol. 7, No. 6; Publication [online]. May 23, 2007 [retrieved Feb. 7, 2018]. Retrieved from the Internet: URL:https://pubs.acs.org/doi/abs/10.1021/nl070559y; pp. 1613-1621.
Loukina et al., Volume diffraction gratings for optical telecommunications applications: design study for a spectral equalizer, Opt. Eng. 43(11), 2658-2665 (Nov. 2004).
Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.
Nersisyan et al., Polarization insensitive imaging through polarization gratings, Feb. 2, 2009 / vol. 17, No. 3 / Optics Express 1817 (Year: 2009).
Nikolova et al., "Diffraction Efficiency and Selectivity of Polarization Holographic Recording", Optica Acta: Int'l J Optics (1984) 31(5):579-588.
NZ794284 Examination Report dated May 15, 2024.
Office Action dated Sep. 7, 2022 for KR2019-7017342.
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages, Chapters 7 and 8, pp. 125-145.
Oh et al., "Polarization-Independent Modulation Using Standard Liquid Crystal Microdisplays and Polymer Polarization Gratings," NC State University; International Display Research Conference, vol. 28, pp. 298-301, 2008. in 16 pages.
Oh, C. et al., "Numerical analysis of polarization gratings using the finite-difference time-domain method", Physical review A, vol. 76, Oct. 12, 2007, in 8 pages.
Park et al., Homeotropic alignment of liquid crystals on a nanopatterned polyimide surface using nanoimprint lithography, Soft Matter, 2011, 7, 5610 (Year: 2017).
Scheeline, et al., "Stacked Mutually Rotated Diffraction Gratings as Enablers of Portable Visible Spectrometry," Appl. Spectrosc. 70, 766-777, May 11, 2016.
Serak et al., All-optical diffractive/transmissive switch based on coupled cycloidal diffractive waveplates, Feb. 27, 2012 / vol. 20, No. 5 / Optics Express 5461 (Year: 2012).
Sun et al., Light-reconfigured waveband-selective diffraction device enabled by micro-patterning of a photoresponsive self-organized helical superstructure, Journal of Materials Chemistry C, 2016, 4, 9325 (Sep. 2016).
Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).
Wikipedia Blind spot (vision), archived Jun. 9, 2016, in 2 pages. URL: https://web.archive.org/web/20160609224858/https:en.wikipedia.org/wiki/Blind_spot(vision).
Yang et al. Negative Dispersion of Birefringence of Smectic Liquid Crystal-Polymer Composite: Dependence on the Constituent Molecules and Temperature, Optical Society of America, Optics Express 2466, vol. 23, No. 3, Feb. 9, 2015.
Yu, N. et al., "Flat optics with designer metasurfaces", Review Article; Nature Materials, (Feb. 2014) 13: 139-150.
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.
"Metamaterials". Duke University. Center for Metamaterials and Integrated Plasmonics. May 11, 2015 (Retrieved from the internet Aug. 12, 2016). URL: http://web.archive.org/web/20150511045547/http://metamaterials.duke.edu/research/metamaterials.
Aieta, F. et al., "Multiwavelength achromatic metasurfaces by dispersive phase compensation," Science, vol. 347, Issue 6228, Mar. 20, 2015, in 5 pages. URL: www.sciencemag.org.
Andrusyak et al., External and common-cavity high spectral density beam combining of high power fiber lasers, Proceedings of SPIE—The International Society for Optical Engineering Feb. 2008 (Year: 2008).
Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.
Azuma, "Predictive Tracking for Augmented Realty," TR95-007, Department of Computer Science, UNC—Chapel Hill, NC, Feb. 1995.

(56) References Cited

OTHER PUBLICATIONS

Bimber, et al., "Spatial Augmented Reality-Merging Real and Virtual Worlds," 2005 https://web.media.mit.edu/raskar/book/BimberRaskarAugmentedRealityBook.pdf.
Chang et al., "Tunable liquid crystal-resonant grating filters using superimposed grating structures fabricated by nanoimprint lithography," The 17th Annual Meeting of the IEEE Lasers and Electro-Optics Society, 2004. LEOS 2004., 2004, pp. 298-299 vol. 1, doi: 10.1109/LEOS.2004.1363229 (Year: 2004).
Chen et al., Beam steering for virtual/augmented reality displays with a cycloidal diffractive waveplate, Apr. 4, 2016 | vol. 24, No. 7 | DOI: 10.1364/OE.24.007287 | Optics Express 7287 (Year: 2016).
Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.
Chiu et al.: "P-33: Large Area Self-aligning of Liquid Crystal Molecules induced by Nanoimprinting Lithography and a Multiple Function Film Made Therein," EuroDisplay, Sep. 20, 2005-Sep. 22, 2020, pp. 323-325.
Choi, Y. et al.: "Determination of Surface Nematic Liquid Crystal Anchoring Strength Using Nano-scale Surface Grooves," Optical Society of America, May 2013, in 10 pages.
Crawford, et al.: "Liquid-crystal Diffraction Gratings using Polarization Holography Alignment Techniques," Journal of Applied Physics 98, 123102, Dec. 2005.
Cunningham et al., "A plastic colorimetric resonant optical biosensor for multiparallel detection of label-free biochemical interactions," Sensors and Actuators B, vol. 85, 2190226, Jul. 2002, in 8 pages.
Dierking, I.: "Chiral Liquid Crystals: Structures, Phases, Effects," Symmetry, (Jun. 2014) 6(2): 444-472.
Digilens, White Paper Digilens' Waveguide HUD Technology Jul. 20, 2016 (Year: 2016).
EP17871904.3 Examination Report dated Aug. 21, 2023.
Escuti J., "Polarization-Independent Modulation & Simplified Spectropolarimetry Using LC Polarization Gratings," paper #39.4, posters p. 209, p. 167, SID Symposium Digest, 2006.
Escuti, M. et al., "39.4: Polarization-Independent Switching with High Contrast from a Liquid Crystal Polarization Grating", SID Symposium Digest, vol. 37, pp. 1443-1446, Jun. 2006, in 4 pages.
Escuti, M. et al., "Polarization-Independent LC Microdisplays Using Liquid Crystal Polarization Gratings: A Viable Solution", ILCC presentation, Jul. 1, 2008, in 15 pages.
Gao et al., Wavefront distortion optimized with volume Bragg gratings in photothermorefractive glass, vol. 41, No. 6 / Mar. 15, 2016 / Optics Letters (Year: 2016).
Gear, C. et al.: "Engineered Liquid Crystal Anchoring Energies with Nanopatterned Surfaces," Optical Society of America, Jan. 2015, in 8 pp.
International Preliminary Report for Patentability for PCT Application No. PCT/US18/65856, dated Jul. 23, 2019.
International Preliminary Report for Patentability for PCT Application No. PCT/US18/65856, dated Jun. 16, 2020.
International Preliminary Report on Patentability for PCT Application No. PCT/US18/24735, dated Jul. 23, 2019.
International Preliminary Report on Patentability for PCT Application No. PCT/US20/38456, dated Dec. 30, 2021.
International Preliminary Report on Patentability for PCT Application No. PCT/US2017/062080, dated May 21, 2019.
International Preliminary Report on Patentability for PCT Application No. PCT/US2019/062386, dated Jun. 3, 2021.
International Search Report and Written Opinion for PCT Application No. PCT/US18/24735, dated Apr. 12, 2018.
International Search Report and Written Opinion for PCT Application No. PCT/US20/38456, dated Sep. 28, 2020.
International Search Report and Written Opinion for PCT Application No. PCT/US2017/062080, dated Feb. 2, 2018.
International Search Report and Written Opinion for PCT Application No. PCT/US2019/062386, dated Mar. 11, 2020.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Jiang et al., Analysis of stacked rotated gratings, Applied Optics vol. 46, No. 8, pp. 1177-1183, Mar. 10, 2007.
Kim, J. et al., "Wide-angle, nonmechanical beam steering with high throughput utilizing polarization gratings", Applied Optics, vol. 50, No. 17, Jun. 10, 2011, in 4 pages.
Komanduri, et al., "Multi-twist retarders: broadband retadation control using self-aligning reactive liquid crystal layers," Optical Society of America, Optics Express 404, vol. 21, No. 1, Jan. 14, 2013.
Komanduri, R. et al., "18:3: Late-News Paper: Polarization Independent Liquid Crystal Microdisplays", SID Digest, vol. 39, No. 1, pp. 236-239, May 2008, in 4 pages.
Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.
Komanduri, R. et al., "Elastic Continuum Analysis of the Liquid Crystal Polarization Grating", Physical review. E, Statistical, nonlinear, and soft matter physics, May 25, 2007, in 8 pages.
Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.
Komanduri, R. et al., "Polarization-independent modulation for projection displays using small-period LC polarization gratings", Journal of the Society for information display, vol. 15, No. 8, pp. 589-594, Aug. 2007, in 7 pages.
KR2019-7017342 Office Action dated Jun. 27, 2023.
KR2023-7033450 Office Action dated Feb. 2, 2024.
Kurioz, Y. et al.: "P-128: Orientation of a Reactive Mesogen on Photosensitive Surface," Society for Information Display (SID) Symposium Digest of Technical Papers, May 2007, in 3 pages.
Lee et al., Photo-induced handedness inversion with opposite-handed cholesteric liquid crystal, Aug. 24, 2015 | vol. 23, No. 17 | DOI: 10.1364/OE.23.022658 | Optics Express 22658 (Year: 2015).
Lee, et al., Negative dispersion of birefringence in two-dimensionally self-organized smectic liquid crystal and monomer thin film, Optics Letters, vol. 39, No. 17, Sep. 1, 2014.
Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.
Lin, D. et al., "Dielectric gradient metasurface optical elements", Science, vol. 345, Issue 6194, Jul. 18, 2014, in 6 pages.
Lin, D. et al., "Supplementary Materials for Dielectric gradient metasurface optical elements", Science, vol. 345, Issue 6194, Jul. 18, 2014, in 22 pages.

\* cited by examiner

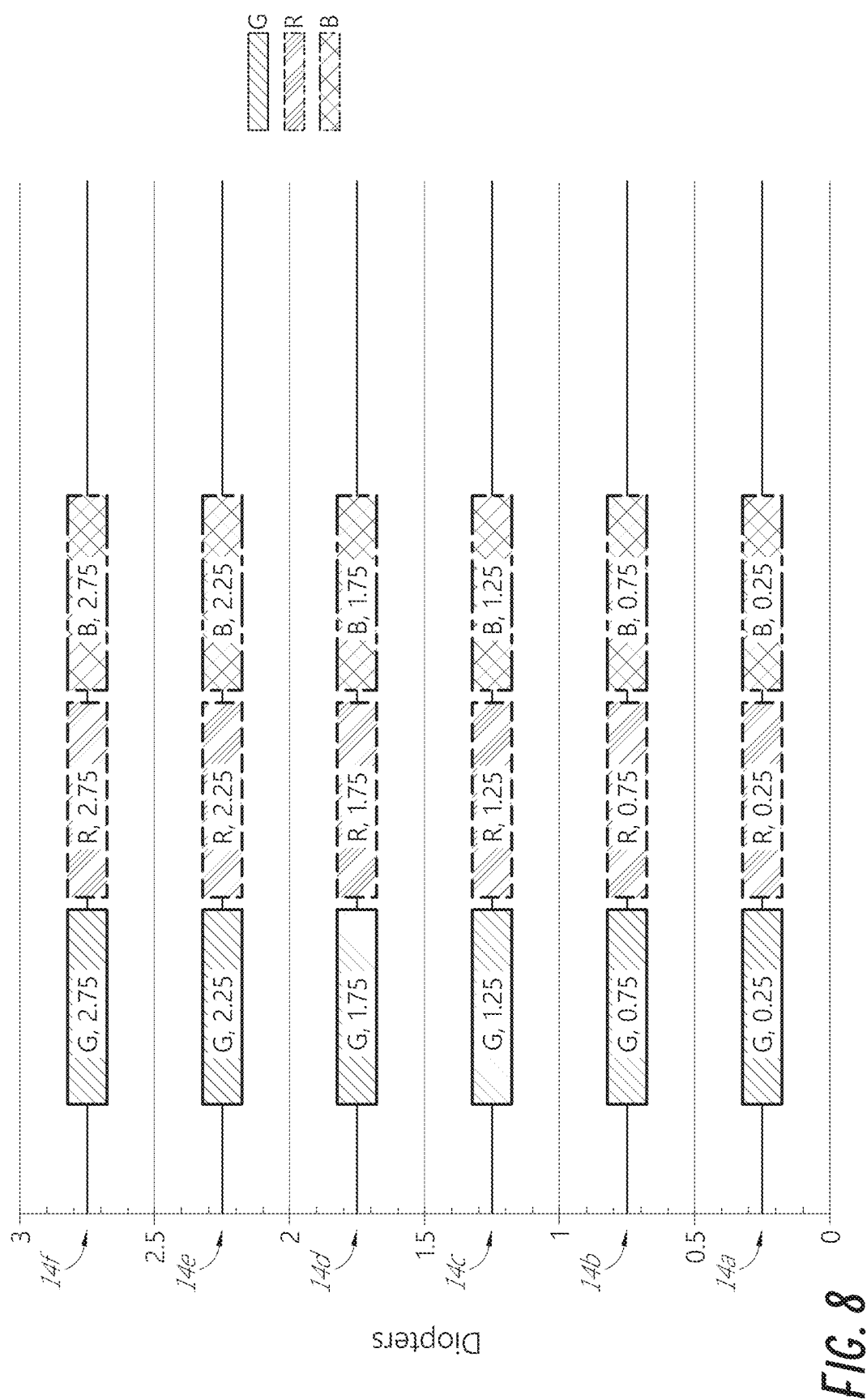

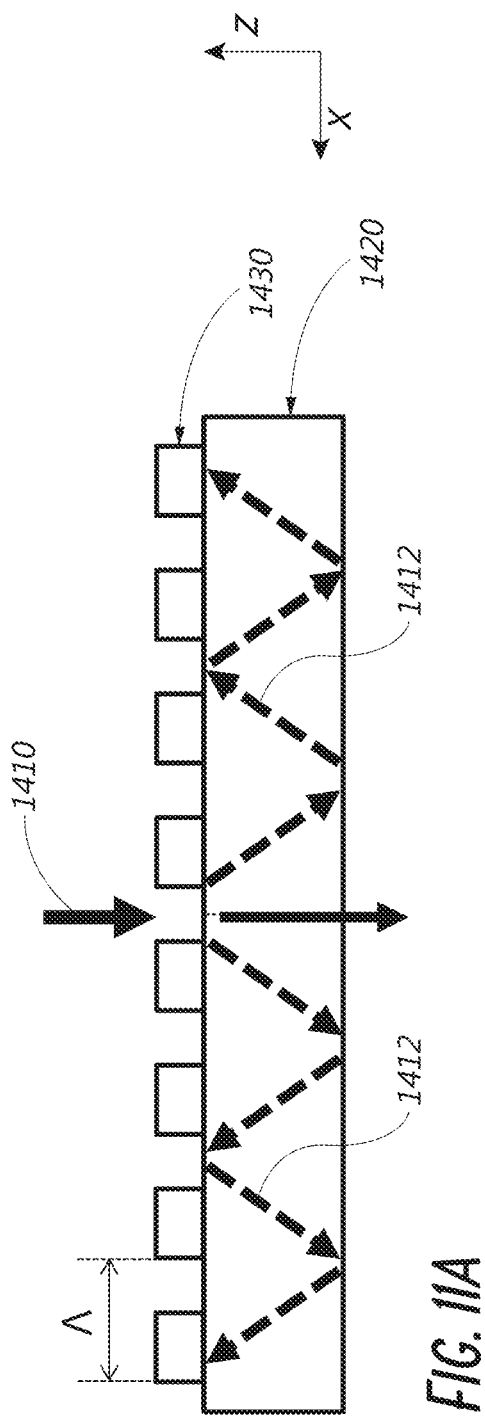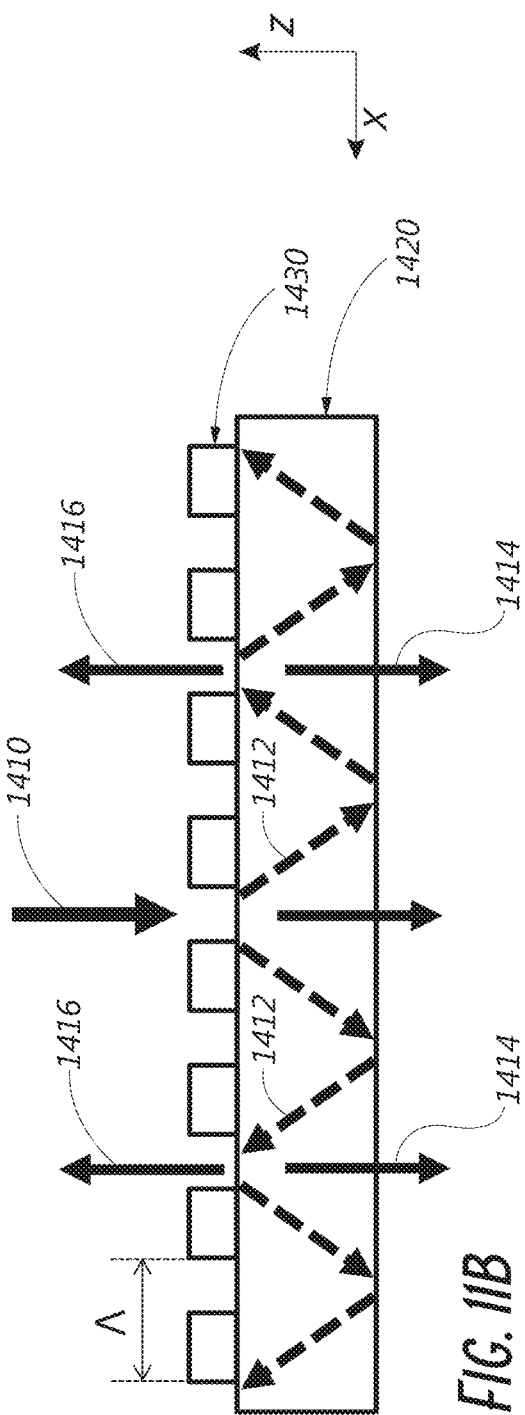

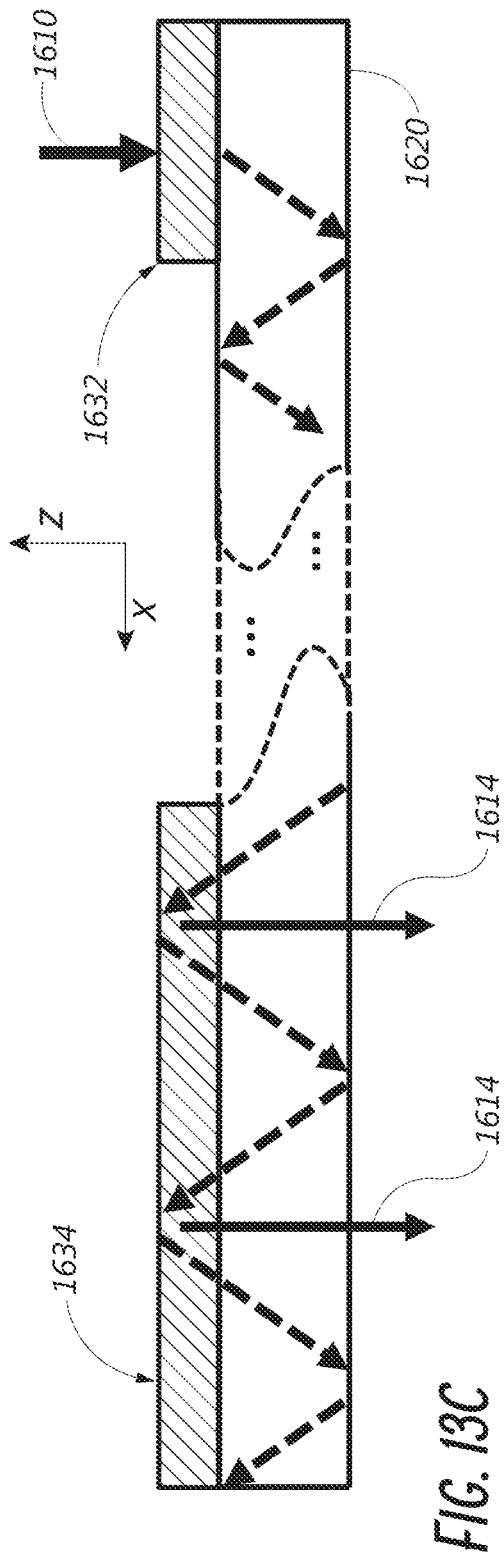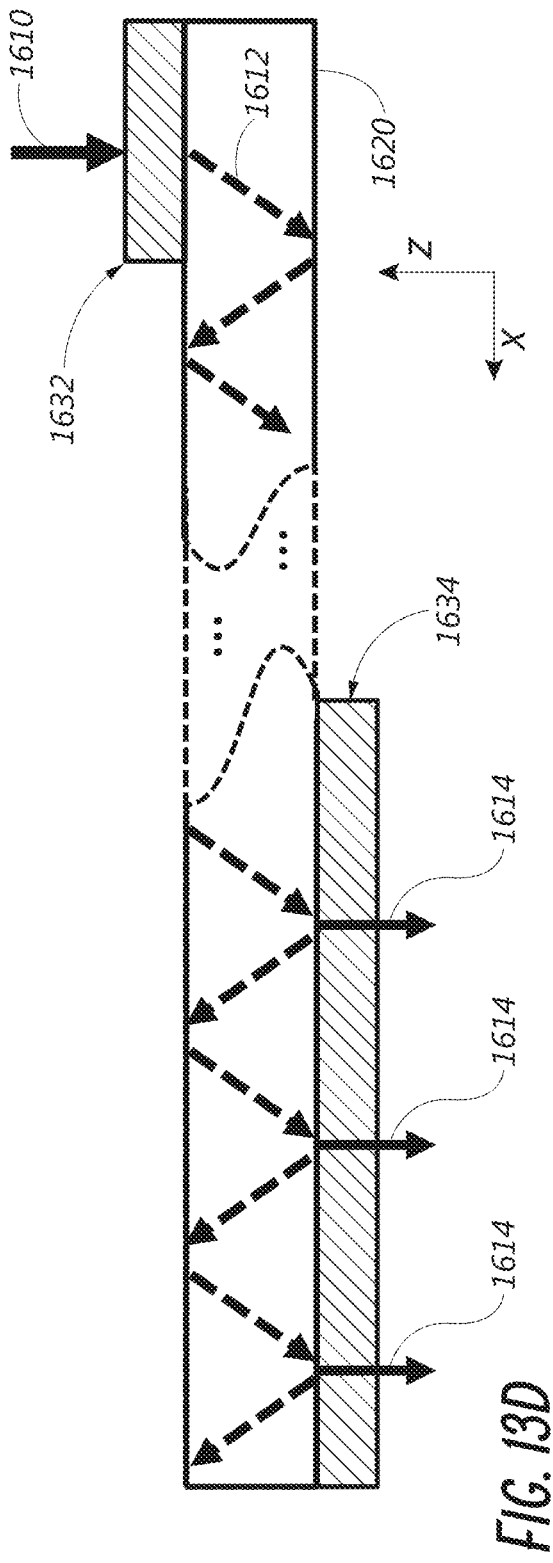
FIG. 13C
FIG. 13D

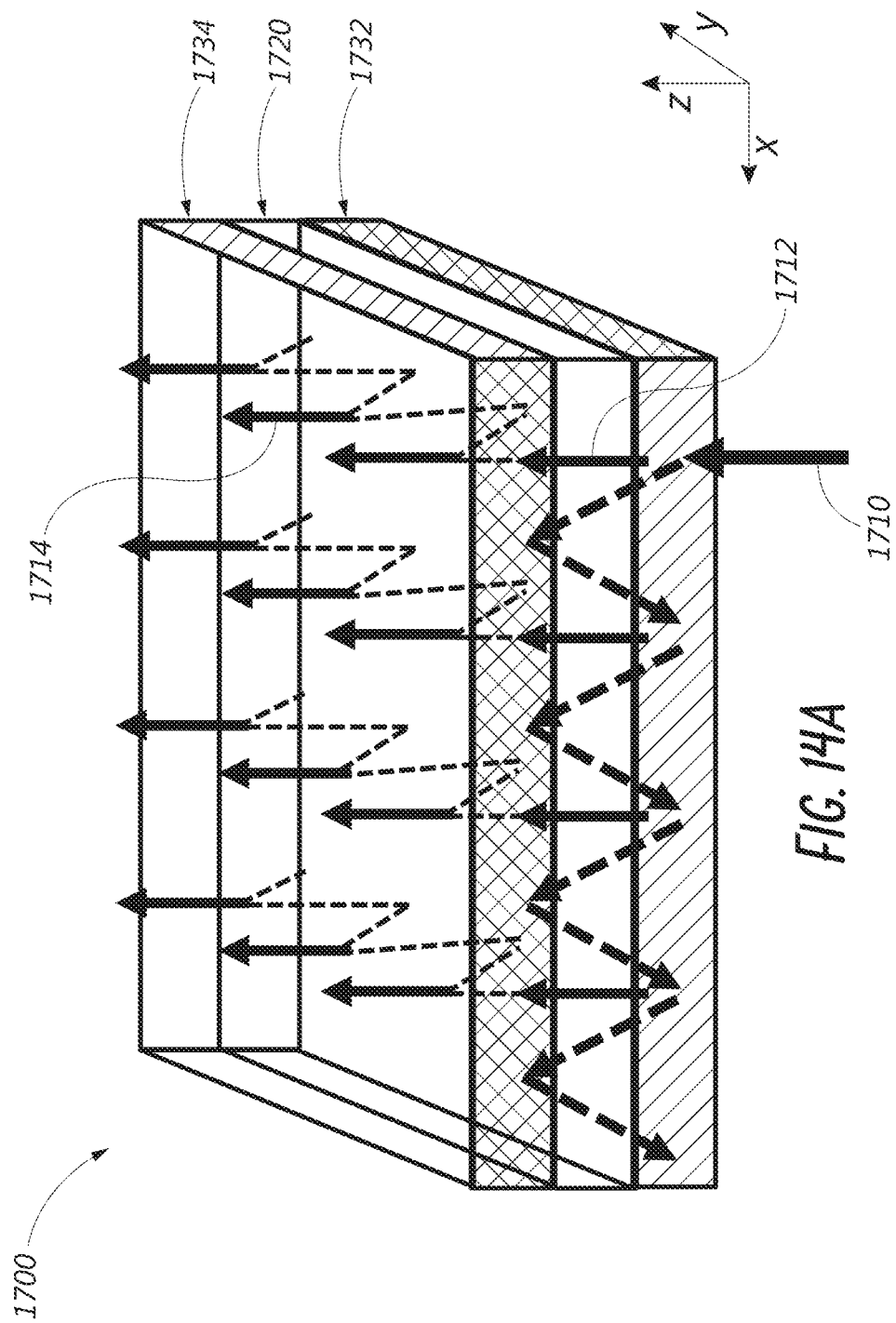

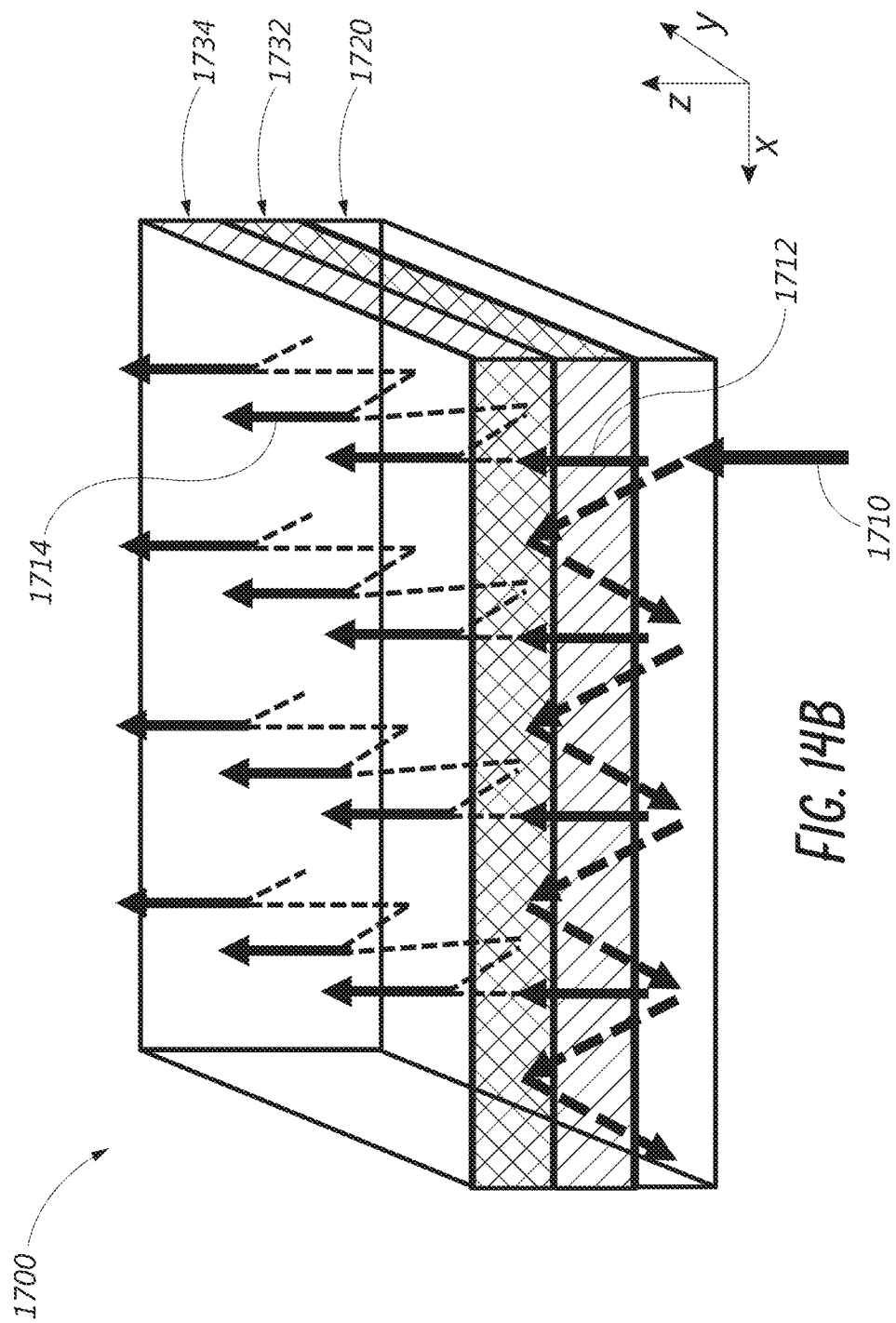

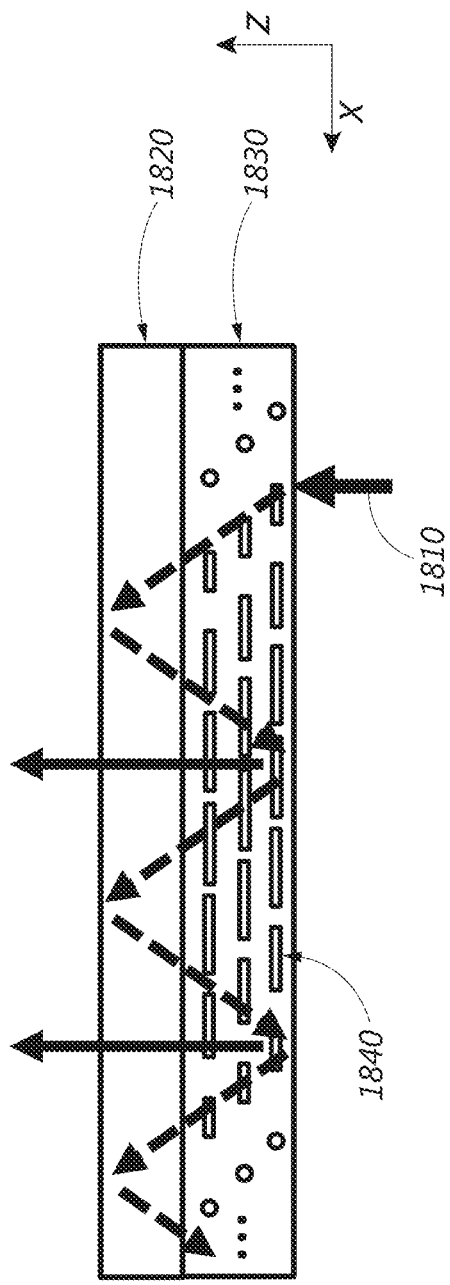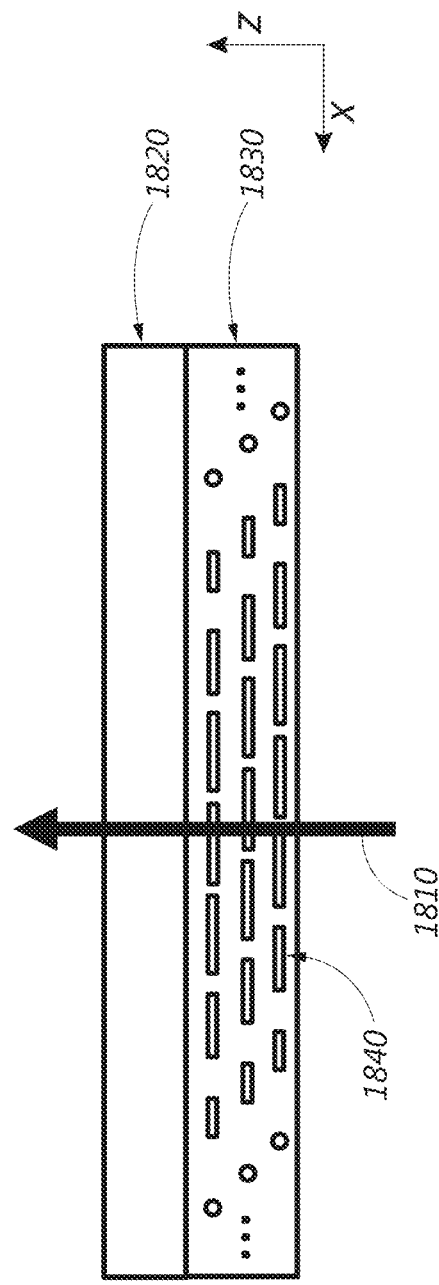
FIG. 15A
FIG. 15B

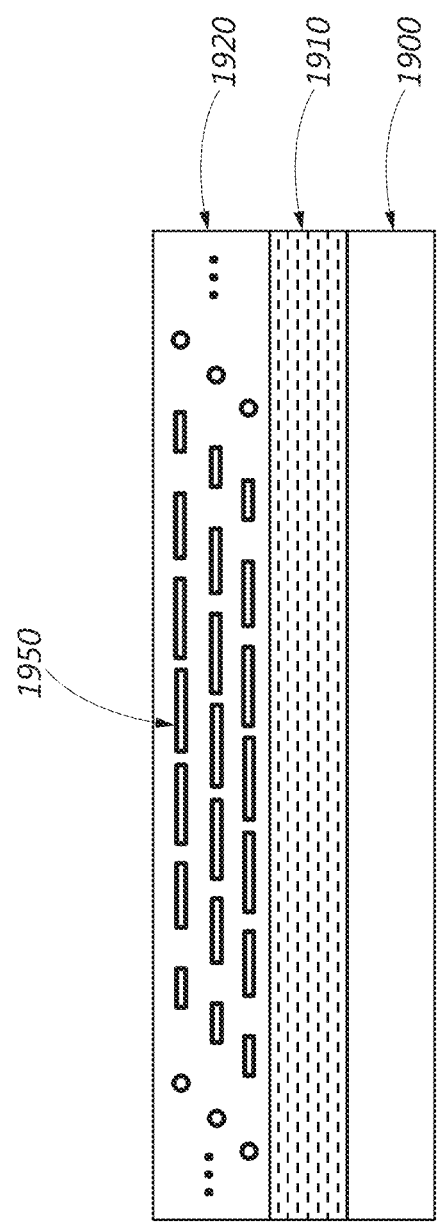

WAVEGUIDE LIGHT MULTIPLEXER USING CROSSED GRATINGS

PRIORITY CLAIM

This application is a continuation of U.S. application Ser. No. 18/179,779, filed Mar. 7, 2023, titled "WAVEGUIDE LIGHT MULTIPLEXER USING CROSSED GRATINGS", which is a continuation of U.S. application Ser. No. 17/143,039, filed Jan. 6, 2021, titled "WAVEGUIDE LIGHT MULTIPLEXER USING CROSSED GRATINGS", which is a continuation of U.S. application Ser. No. 15/815,567, filed Nov. 16, 2017, titled "WAVEGUIDE LIGHT MULTIPLEXER USING CROSSED GRATINGS", which claims the priority benefit of U.S. Provisional Application No. 62/424,293, filed Nov. 18, 2016, titled "WAVEGUIDE LIGHT MULTIPLEXER USING CROSSED GRATINGS". The entire contents of each of the above-listed applications are hereby incorporated by reference into this application.

INCORPORATION BY REFERENCE

This application incorporates by reference the entirety of each of the following patent applications: U.S. application Ser. No. 14/555,585, filed Nov. 27, 2014; U.S. application Ser. No. 14/690,401, filed Apr. 18, 2015; U.S. application Ser. No. 14/212,961, filed Mar. 14, 2014; U.S. application Ser. No. 14/331,218, filed Jul. 14, 2014; and U.S. application Ser. No. 15/072,290, filed Mar. 16, 2016.

BACKGROUND

Field

The present disclosure relates to display systems and, more particularly, to multiplexing of light.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" "virtual content" such as a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

According to some embodiments an optical element is provided herein. In some embodiments the optical element comprises a waveguide, at least one or more first diffraction gratings having a grating direction, the one or more first diffraction gratings disposed on a major surface of the waveguide, and at least one or more second diffraction gratings having a grating direction, the one or more second diffraction gratings disposed with respect to the one or more first diffraction gratings such that the grating direction of the one or more first diffraction gratings is perpendicular to the grating direction of the one or more second diffraction gratings.

In some embodiments the one or more first diffraction gratings are disposed on a bottom major surface of the waveguide and the one or more second diffraction gratings are disposed on a top major surface of the waveguide. In some embodiments the one or more first diffraction gratings are disposed on a top major surface of the waveguide and the one or more second diffraction gratings are disposed above the top major surface of the waveguide. In some embodiments the one or more second diffraction gratings are separated from the one or more first diffraction gratings by an isolation layer. In some embodiments the isolation layer comprises a transparent oxide or polymer material. In some embodiments the one or more first diffraction gratings and the one or more second diffraction gratings each comprise a symmetric diffraction grating.

In some embodiments the one or more first diffraction gratings further comprise at least one or more first asymmetric diffraction gratings having a first diffraction direction and at least one or more second asymmetric diffraction gratings having a second diffraction direction anti-parallel to the first diffraction direction, and the one or more second diffraction gratings further comprise at least one or more third asymmetric diffraction gratings having a third preferred diffraction direction and at least one or more fourth asymmetric diffraction gratings having a fourth diffraction direction anti-parallel to the third diffraction direction.

In some embodiments the one or more first, second, third, and fourth asymmetric diffraction gratings comprise a blazed grating, a Bragg grating, a liquid crystal grating, a sinusoidal grating, a binary grating, a volume phase grating, or a meta-surface grating. In some embodiments the one or more first, second, third, and fourth asymmetric diffraction gratings comprise a liquid crystal material. In some embodiments the one or more first, second, third, and fourth asymmetric diffraction gratings comprise nematic liquid crystal material. In some embodiments the one or more first, second, third, and fourth asymmetric diffraction gratings comprise a cholesteric liquid crystal material. In some embodiments the one or more first, second, third, and fourth asymmetric diffraction gratings comprise a polymerizable liquid crystal material. In some embodiments the one or more first, second, third, and fourth asymmetric diffraction gratings are formed by a nano-imprinting process. In some embodiments the first asymmetric diffraction grating is deposited on first alignment layer and the third asymmetric diffraction grating is deposited on a second alignment layer.

In some embodiments the second asymmetric diffraction grating is deposited directly on the first asymmetric diffraction grating and the fourth asymmetric diffraction grating is deposited directly on the third asymmetric diffraction grating. In some embodiments the one or more first, second, third, and fourth asymmetric diffraction gratings comprise a polarization grating. In some embodiments the one or more first, second, third, and fourth asymmetric diffraction gratings comprise a polarization grating and wherein a tilt angle of an asymmetric diffraction grating corresponds to a chirality, handedness, and helical pitch, of the cholesteric liquid crystal material. In some embodiments a tilt angle of each asymmetric diffraction grating corresponds to an amount of a chiral dopant in the liquid crystal material. In some embodiments the first, second, third, and fourth asymmetric diffraction grating comprise a plurality of liquid crystal material layers, wherein at least two of the plurality of liquid crystal material layers for one of said diffraction gratings have different tilt angles. In some embodiments the one or more first asymmetric diffraction gratings comprise a first circular polarization handedness and the one or more second asymmetric diffraction gratings comprises a second circular polarization handedness orthogonal to the to the first circular polarization handedness. In some embodiments the one or more third asymmetric diffraction gratings comprise a third circular polarization handedness and the one or more fourth asymmetric diffraction gratings comprise a fourth circular polarization handedness orthogonal to the to the third circular polarization handedness.

According to some aspects, methods of distributing a light signal in two dimensions are described herein. In some embodiments a method may comprise distributing the light signal in a first direction via a first diffraction grating, propagating the a portion of the light signal in the first direction via total internal refection in a waveguide, outcoupling a portion of the light signal propagating in the first direction in an outcoupling direction via the first diffraction grating, distributing a portion of the light signal in a second direction via a second diffraction grating, propagating the portion of the light signal in the second direction via total internal refection in the waveguide, and outcoupling the portion of the light signal propagating in the second direction in the outcoupling direction via the second diffraction grating. In some embodiments the first direction is perpendicular to the second direction. In some embodiments the light signal is outcoupled at a plurality of locations disposed on a major surface of the waveguide.

BRIEF DESCRIPTION OF THE DRAWINGS

FIG. 8 illustrates an example of a stacked waveguide assembly in which each depth plane includes images formed using multiple different component colors.

FIG. 11A shows a schematic diagram of light being incoupled into an example waveguide by an example diffraction grating.

FIG. 11B shows a schematic diagram of incoupled light propagating through an example waveguide and being outcoupled from the example waveguide via an example diffraction grating.

FIG. 13C shows a schematic diagram of light being incoupled into an example waveguide at a first location by an example diffraction grating having a preferred diffraction direction, and being outcoupled from one side by a second example diffraction grating having a preferred diffraction direction at a second location on the same side of the waveguide as the first diffraction grating.

FIG. 13D shows a schematic diagram of light being incoupled into an example waveguide at a first location by an example diffraction grating having a preferred diffraction direction, and being outcoupled from one side by a second example diffraction grating having a preferred diffraction direction at a second location on the opposite side of the waveguide as the first diffraction grating.

FIG. 14A shows a schematic diagram of light being incoupled, distributed in two dimensions, and outcoupled by a two-dimensional waveguide light multiplexer comprising crossed asymmetric gratings according to some embodiments.

FIG. 14B shows a schematic diagram of light being incoupled, distributed in two dimensions, and outcoupled by a two-dimensional waveguide light multiplexer comprising crossed asymmetric gratings according to some other embodiments.

FIG. 15A shows a schematic diagram of left-handed circularly polarized light being incoupled into an example waveguide, distributed along one direction in one dimension, and outcoupled via an example polarization grating.

FIG. 15B shows a schematic diagram of right-handed circularly polarized being transmitted through an example waveguide and polarization grating.

FIG. 16A shows a schematic diagram of an example liquid crystal diffraction grating deposited on an alignment layer overlaying a substrate according to some embodiments.

Figure 1:
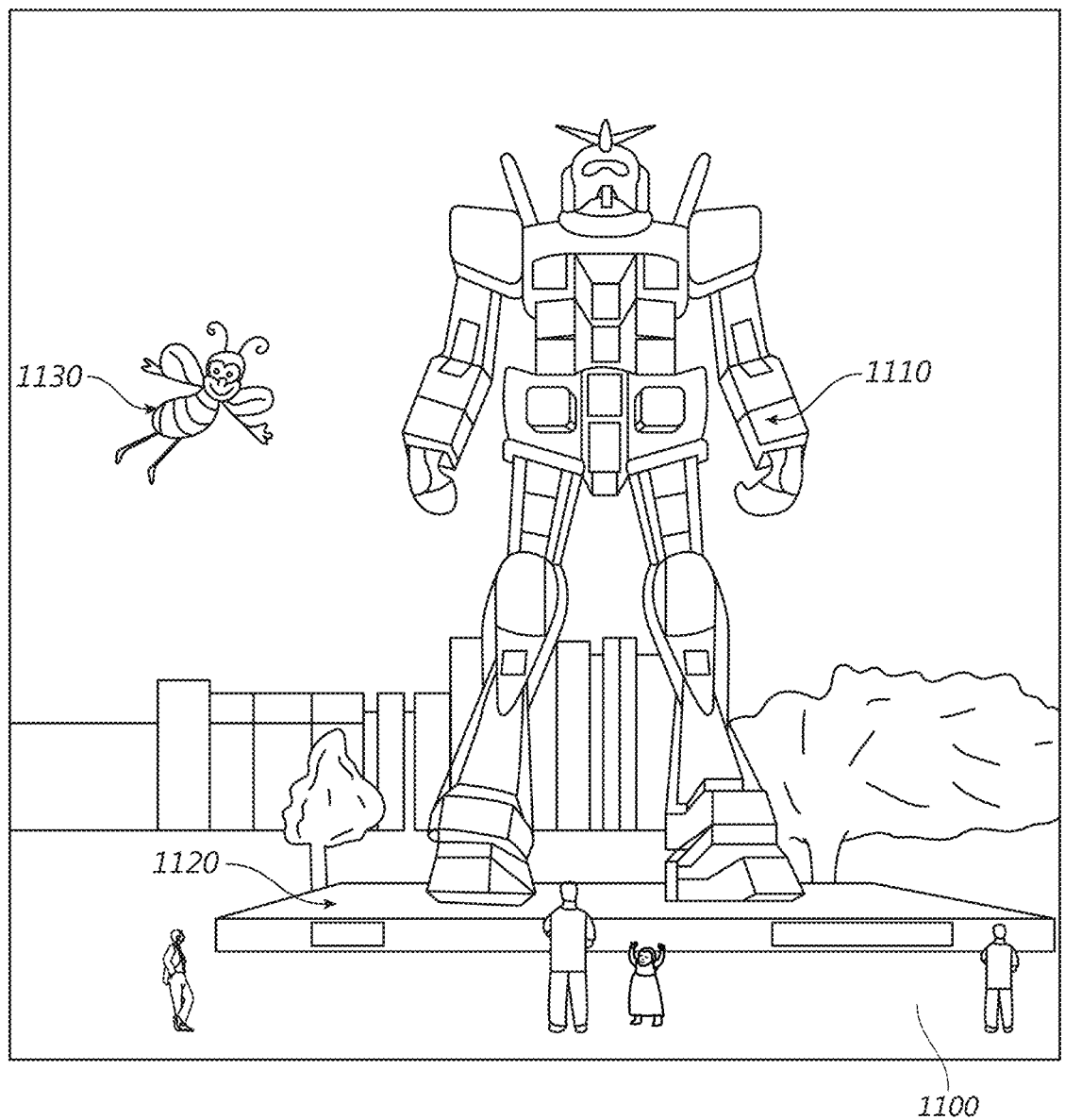
FIG. 1 illustrates a user's view of augmented reality (AR) through an AR device.

The drawings are provided to illustrate example embodiments and are not intended to limit the scope of the disclosure.

DETAILED DESCRIPTION

In some embodiments, optical elements are described herein which can distribute light incident upon the optical element in two dimensions via diffraction. That is, a ray of light incident upon a surface of the optical element at a location can propagate through the optical element in two dimensions, for example along a length and a width of the optical element. The incoupled light may also be directed out of the optical element, or outcoupled from the optical element, at a plurality of locations that are distributed in two dimensions on a surface of the optical element.

In some embodiments, an optical element as described herein may be used as a light distributing element, for example as a light distributing element that can distribute light into and/or out of a corresponding waveguide. In some embodiments, an optical element as described herein may be used as, for example, an orthogonal pupil expander (OPE) which can both deflect or distribute light and can also increase the beam or spot size of this light as it propagates. Advantageously, and according to some embodiments, a two-dimensional waveguide light multiplexer can serve to efficiently direct and distribute optical signals in the form of light to other optical elements in an augmented reality device. Further, a two-dimensional waveguide light multiplexer as described herein may be useful for multiplexing optical signals for optical fiber communication applications.

In some embodiments, a two-dimensional waveguide light multiplexer may take the form of a waveguide and at least two diffracting gratings. In some embodiments, each diffraction grating may have a grating direction and the diffraction gratings may be aligned such that the grating direction of a first diffraction grating is not aligned with a grating direction of a second diffraction grating. In some embodiments, a grating direction of a first diffraction grating is perpendicular to a grating direction of a second diffraction grating. The diffraction gratings may be disposed on a major surface (e.g., a top major surface) of the waveguide. For example, in some embodiments, the at least two diffraction gratings may be disposed on a top major surface of a waveguide. In some embodiments, the at least two diffraction gratings may be disposed on a bottom major surface of a waveguide. In some embodiments, diffraction gratings may be disposed on both a top major surface of a waveguide and on a bottom major surface of a diffraction grating.

In some embodiments, two diffraction gratings are arranged such that a grating direction of a first diffraction grating is perpendicular to the grating direction of the second diffraction grating and this arrangement can advantageously allow for the two-dimensional distribution of light. That is, in some embodiments, as incoupled light propagates through a waveguide it interacts with the diffraction gratings disposed on the waveguide such that the incoupled light is outcoupled at a plurality of locations which are distributed in two-dimensions over a major surface of the two-dimensional waveguide light multiplexer. As light propagates through the waveguide of the two-dimensional waveguide light multiplexer it can interact with a first diffraction grating whereby it is distributed along the first diffraction grating's diffraction grating. The distributed light will also interact with the second diffraction grating whereby the light distributed along a first direction is distributed along the second diffraction grating's grating direction to thereby achieve distribution of the light in two dimensions, for example along a length dimension and along a width dimension of a two-dimensional waveguide light multiplexer.

In some embodiments, the diffraction gratings of the two-dimensional waveguide light multiplexer may have preferred diffraction directions. In some embodiments, a diffraction grating may comprise structural features that provide a preferred diffraction direction. In some embodiments, a diffraction grating may be, for example, a blazed grating, a Bragg grating, a liquid crystal grating, a sinusoidal grating, a binary grating, a volume phase grating, or a meta-surface grating. In some embodiments, a diffraction grating may be an asymmetric diffraction grating. In some embodiments, a diffraction grating may be a polarization grating, for example a liquid crystal polarization grating. In some embodiments, where a diffraction grating is a polarization grating the diffraction grating may comprise liquid crystal material. In some embodiments, the liquid crystal material may comprise nematic liquid crystals or cholesteric liquid crystal. In some embodiments, the liquid crystal material may comprise azo-containing polymers. In some embodiments, the liquid crystal material may comprise polymerizable liquid crystal materials. In some embodiments, the liquid crystal material may comprise reactive mesogens.

In some embodiments, a liquid crystal polarization grating may be fabricated by a nano-imprinting process. In some embodiments, a liquid crystal polarization grating may be fabricated by depositing liquid crystal material on an alignment layer. In some embodiments, a liquid crystal polarization grating may not comprise an alignment layer.

In some embodiments, a liquid crystal polarization grating may comprise one or more chiral liquid crystal layers, with each layer of the same chirality having a different a different tilt angle. By providing multiple liquid crystal layers having multiple different tilt angles, the liquid crystal polarization grating can achieve high diffraction efficiencies for a broader range of incident angles of light than a liquid crystal polarization grating that does not comprise layers having multiple tilt angles. In this way, a two-dimensional waveguide light multiplexer comprising perpendicular liquid crystal polarization gratings comprising a plurality of liquid crystal layers, each having a plurality of tilt angles, can efficiently distribute light at a wide range of incident angles in two dimensions. Such a two-dimensional waveguide light multiplexer may be used to, for example, efficiently multiplex an image having a wide field-of-view, such as for a large pupil or large eye box, for an augmented reality device.

Reference will now be made to the drawings, in which like reference numerals refer to like parts throughout.

Figure 2:
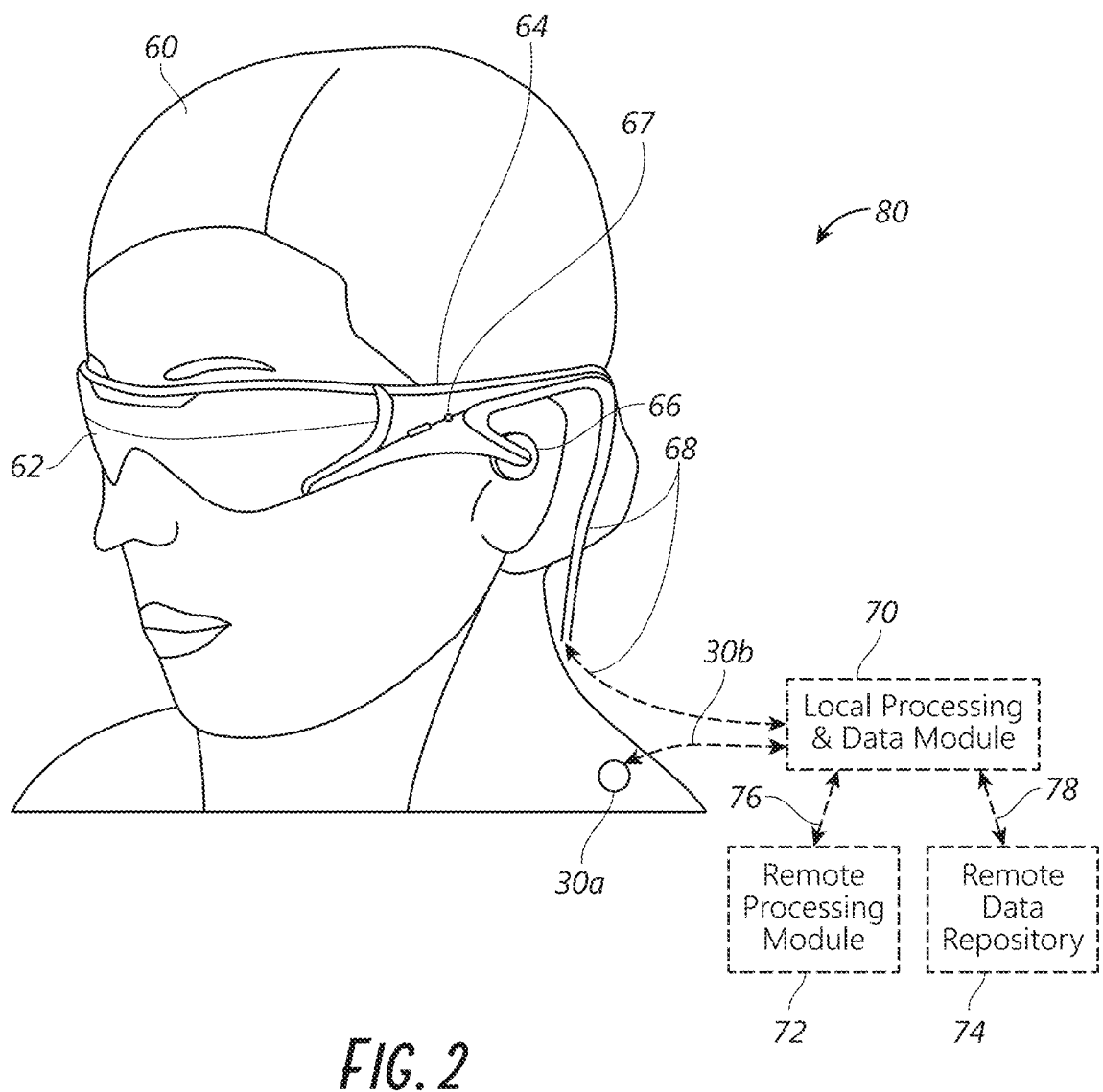
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.), and/or may allow audio communication with other persons (e.g., with other users of similar display systems). The microphone may further be configured as a peripheral sensor to continuously collect audio data (e.g., to passively collect from the user and/or environment). Such audio data may include user sounds such as heavy breathing, or environmental sounds, such as a loud bang indicative of a nearby event. The display system may also include a peripheral sensor 30a, which may be separate from the frame 64 and attached to the body of the user 60 (e.g., on the head, torso, an extremity, etc. of the user 60). The peripheral sensor 30a may be configured to acquire data characterizing the physiological state of the user 60 in some embodiments, as described further herein. For example, the sensor 30a may be an electrode.

With continued reference to FIG. 2, the display 62 is operatively coupled by communications link 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). Similarly, the sensor 30a may be operatively coupled by communications link 30b, e.g., a wired lead or wireless connectivity, to the local processor and data module 70. The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, gyros, and/or other sensors disclosed herein; and/or b) acquired and/or processed using remote processing module 72 and/or remote data repository 74 (including data relating to virtual content), possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the local processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the local processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
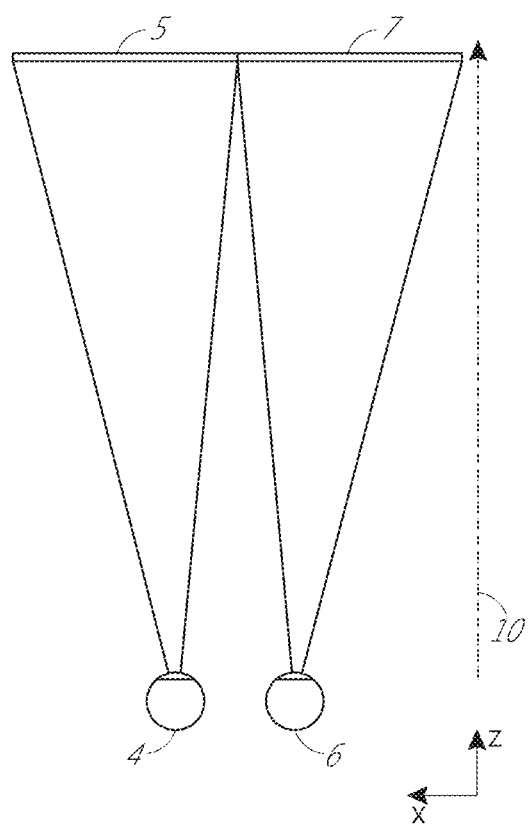
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery contributing to increased duration of wear and in turn compliance to diagnostic and therapy protocols.

Figure 4:
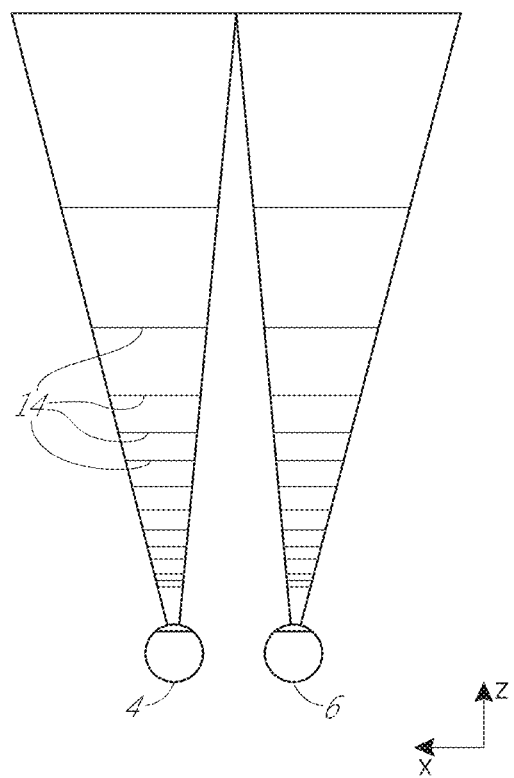
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 5A:
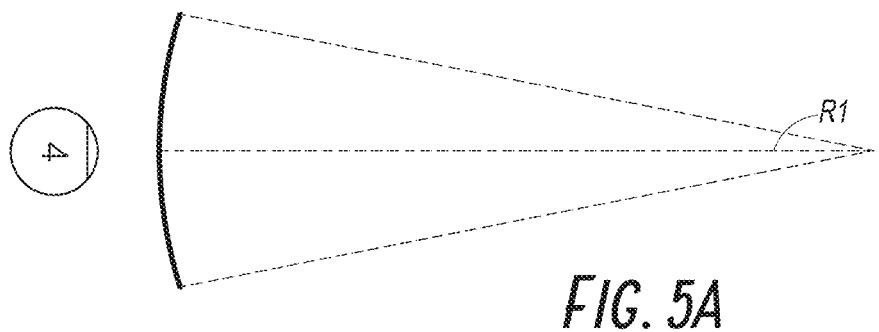
FIGS. 5A-5C illustrate relationships between radius of curvature and focal radius.
Figure 5B:
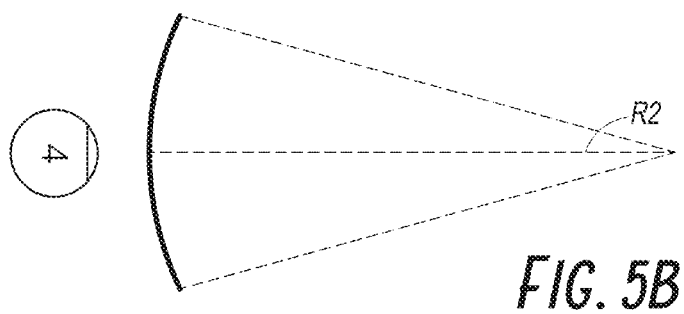
Figure 5C:
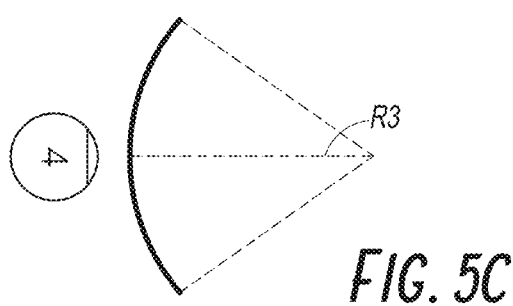

The distance between an object and the eye 4 or 6 may also change the amount of divergence of light from that object, as viewed by that eye. FIGS. 5A-5C illustrate relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
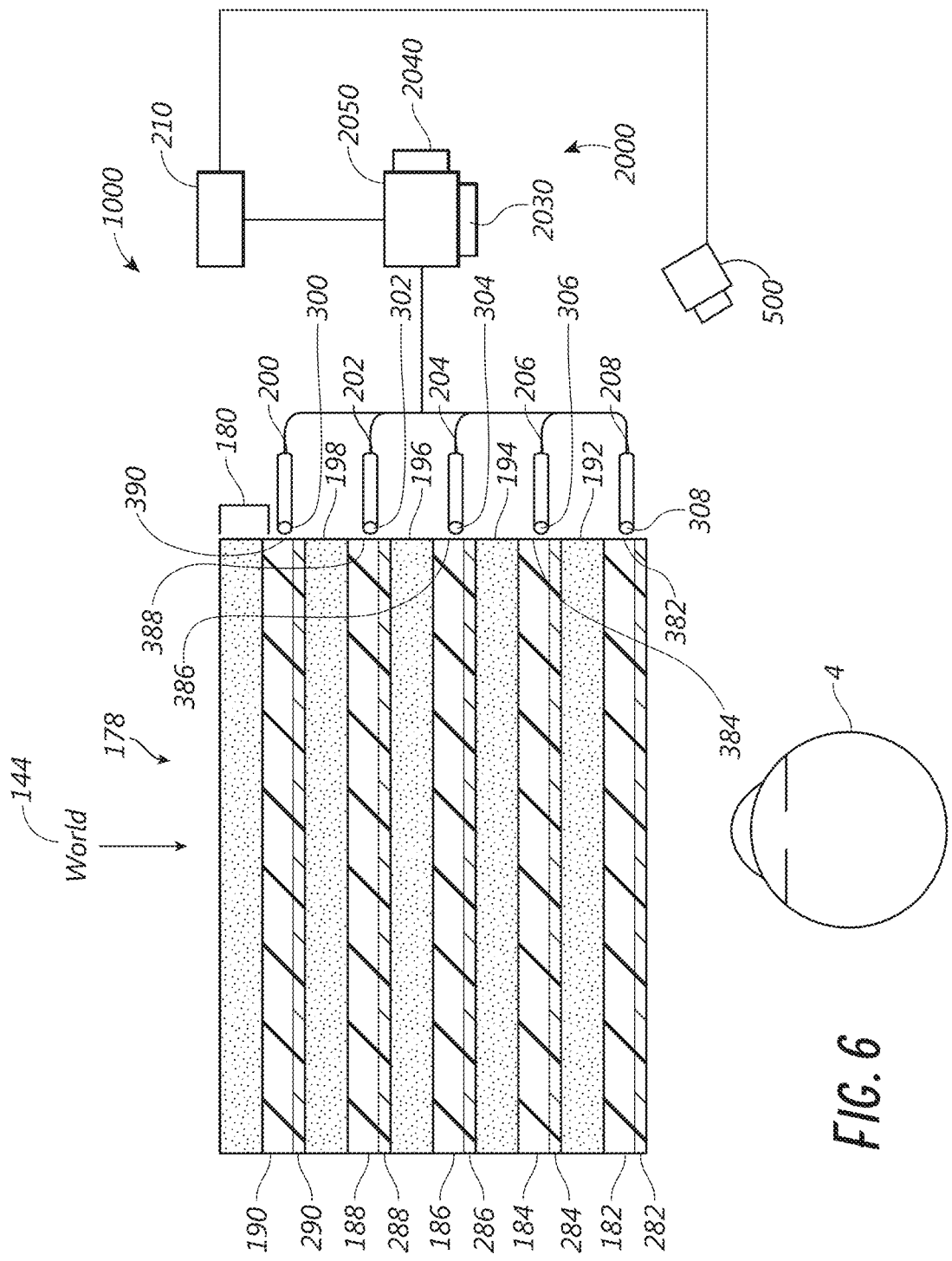
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2. It will be appreciated that the display system 1000 may be considered a light field display in some embodiments.

With continued reference to FIG. 6, the waveguide assembly 178 may also include a plurality of features 198, 196, 194, 192 between the waveguides. In some embodiments, the features 198, 196, 194, 192 may be one or more lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186,

188, 190. In some embodiments, the each of the input surfaces 382, 384, 386, 388, 390 may be an edge of a corresponding waveguide, or may be part of a major surface of the corresponding waveguide (that is, one of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the light injected into the waveguides 182, 184, 186, 188, 190 is provided by a light projector system 2000, which comprises a light module 2040, which may include a light emitter, such as a light emitting diode (LED). The light from the light module 2040 may be directed to and modified by a light modulator 2030, e.g., a spatial light modulator, via a beam splitter 2050. The light modulator 2030 may be configured to change the perceived intensity of the light injected into the waveguides 182, 184, 186, 188, 190. Examples of spatial light modulators include liquid crystal displays (LCD) including a liquid crystal on silicon (LCOS) displays.

In some embodiments, the display system 1000 may be a scanning fiber display comprising one or more scanning fibers configured to project light in various patterns (e.g., raster scan, spiral scan, Lissajous patterns, etc.) into one or more waveguides 182, 184, 186, 188, 190 and ultimately to the eye 4 of the viewer. In some embodiments, the illustrated image injection devices 200, 202, 204, 206, 208 may schematically represent a single scanning fiber or a bundles of scanning fibers configured to inject light into one or a plurality of the waveguides 182, 184, 186, 188, 190. In some other embodiments, the illustrated image injection devices 200, 202, 204, 206, 208 may schematically represent a plurality of scanning fibers or a plurality of bundles of scanning, fibers each of which are configured to inject light into an associated one of the waveguides 182, 184, 186, 188, 190. It will be appreciated that the one or more optical fibers may be configured to transmit light from the light module 2040 to the one or more waveguides 182, 184, 186, 188, 190. It will be appreciated that one or more intervening optical structures may be provided between the scanning fiber, or fibers, and the one or more waveguides 182, 184, 186, 188, 190 to, e.g., redirect light exiting the scanning fiber into the one or more waveguides 182, 184, 186, 188, 190.

A controller 210 controls the operation of one or more of the stacked waveguide assembly 178, including operation of the image injection devices 200, 202, 204, 206, 208, the light source 2040, and the light modulator 2030. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 282, 284, 286, 288, 290 may, for example, be gratings, including diffractive optical features, as discussed further herein. While illustrated disposed at the bottom major surfaces of the waveguides 182, 184, 186, 188, 190 for ease of description and drawing clarity, in some embodiments, the outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This can provide advantages for forming a tiled image to provide an expanded field of view at those depth planes.

With continued reference to FIG. 6, the outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 282, 284, 286, 288, 290, which output light with a different amount of divergence depending on the associated depth plane. In some embodiments, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. In some embodiments, the features 198, 196, 194, 192 may not be lenses; rather, they may simply be spacers (e.g., cladding layers and/or structures for forming air gaps).

In some embodiments, the outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 500 (e.g., a digital camera, including visible light and infrared light cameras) may be provided to capture images of the eye 4 and/or tissue around the eye 4 to, e.g., detect user inputs and/or to monitor the physiological state of the user. As used herein, a camera may be any image capture device. In some embodiments, the camera assembly 500 may include an image capture device and a light source to project light (e.g., infrared light) to the eye, which may then be reflected by the eye and detected by the image capture device. In some embodiments, the camera assembly 500 may be attached to the frame 64 (FIG. 2) and may be in electrical communication with the processing modules 70 and/or 72, which may process image information from the camera assembly 500 to make various determinations regarding, e.g., the physiological state of the user, as discussed herein. It will be appreciated that information regarding the physiological state of user may be used to determine the behavioral or emotional state of the user. Examples of such information include movements of the user and/or facial expressions of the user. The behavioral or emotional state of the user may then be triangulated with collected environmental and/or virtual content data so as to determine relationships between the behavioral or emotional state, physiological state, and environmental or virtual content data. In some embodiments, one camera assembly 500 may be utilized for each eye, to separately monitor each eye.

Figure 7:
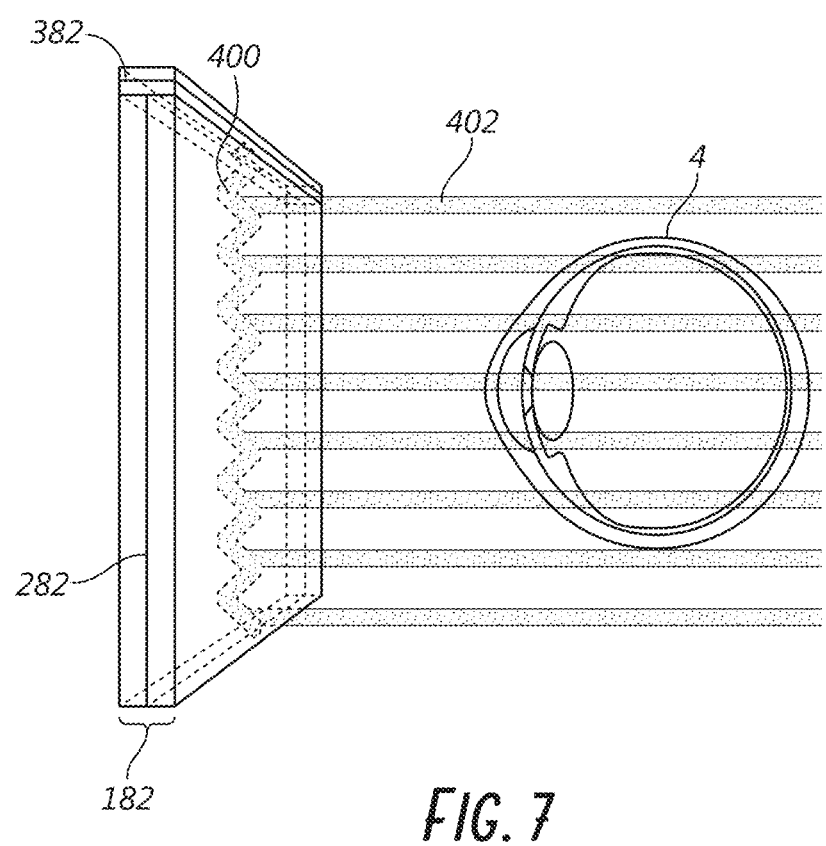
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 178 (FIG. 6) may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue. In some embodiments, features 198, 196, 194, and 192 may be active or passive optical filters configured to block or selectively light from the ambient environment to the viewer's eyes.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 2040 (FIG. 6) may be configured to emit light of one or more wavelengths outside the visual perception range of the viewer, for example, infrared and/or ultraviolet wavelengths. In addition, the incoupling, outcoupling, and other light redirecting structures of the waveguides of the display 1000 may be configured to direct and emit this light out of the display towards the user's eye 4, e.g., for imaging and/or user stimulation applications.

Figure 9A:
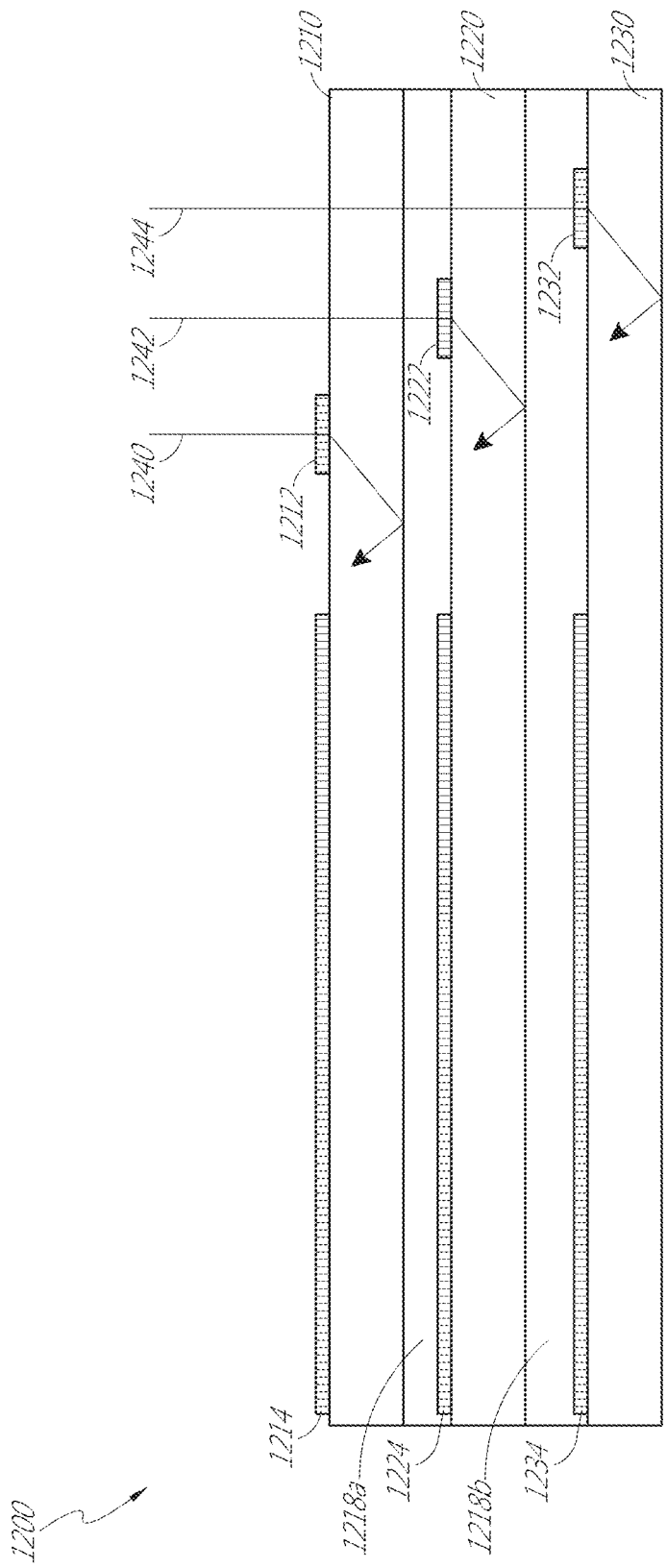
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that requires light to be redirected for incoupling.

The illustrated set 1200 of stacked waveguides includes waveguides 1210, 1220, and 1230. Each waveguide includes an associated incoupling optical element (which may also be referred to as a light input area on the waveguide), with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 200, 202, 204, 206, and 208 as shown in FIG. 6, and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by, e.g., gas, liquid, and/or solid layers of material. For example, as illustrated, layer 1218a may separate waveguides 1210 and 1220; and layer 1218b may separate waveguides 1220 and 1230. In some embodiments, the layers 1218a and 1218b are formed of low refractive index materials (that is, materials having a lower refractive index than the material forming the immediately adjacent one of waveguides 1210, 1220, 1230). Preferably, the refractive index of the material forming the layers 1218a, 1218b is 0.05 or more, or 0.10 or more less than the refractive index of the material forming the waveguides 1210, 1220, 1230. Advantageously, the lower refractive index layers 1218a, 1218b may function as cladding layers that facilitate total internal reflection (TIR) of light through the waveguides 1210, 1220, 1230 (e.g., TIR between the top and bottom major surfaces of each waveguide). In some embodiments, the layers 1218a, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218a, 1218b are similar or the same. In some embodiments, the material forming the waveguides 1210, 1220, 1230 may be different between one or more waveguides, and/or the material forming the layers 1218a, 1218b may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR.

For example, incoupling optical element 1212 may be configured to deflect ray 1240, which has a first wavelength or range of wavelengths. Similarly, the transmitted ray 1242 impinges on and is deflected by the incoupling optical element 1222, which is configured to deflect light of a second wavelength or range of wavelengths. Likewise, the ray 1244 is deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
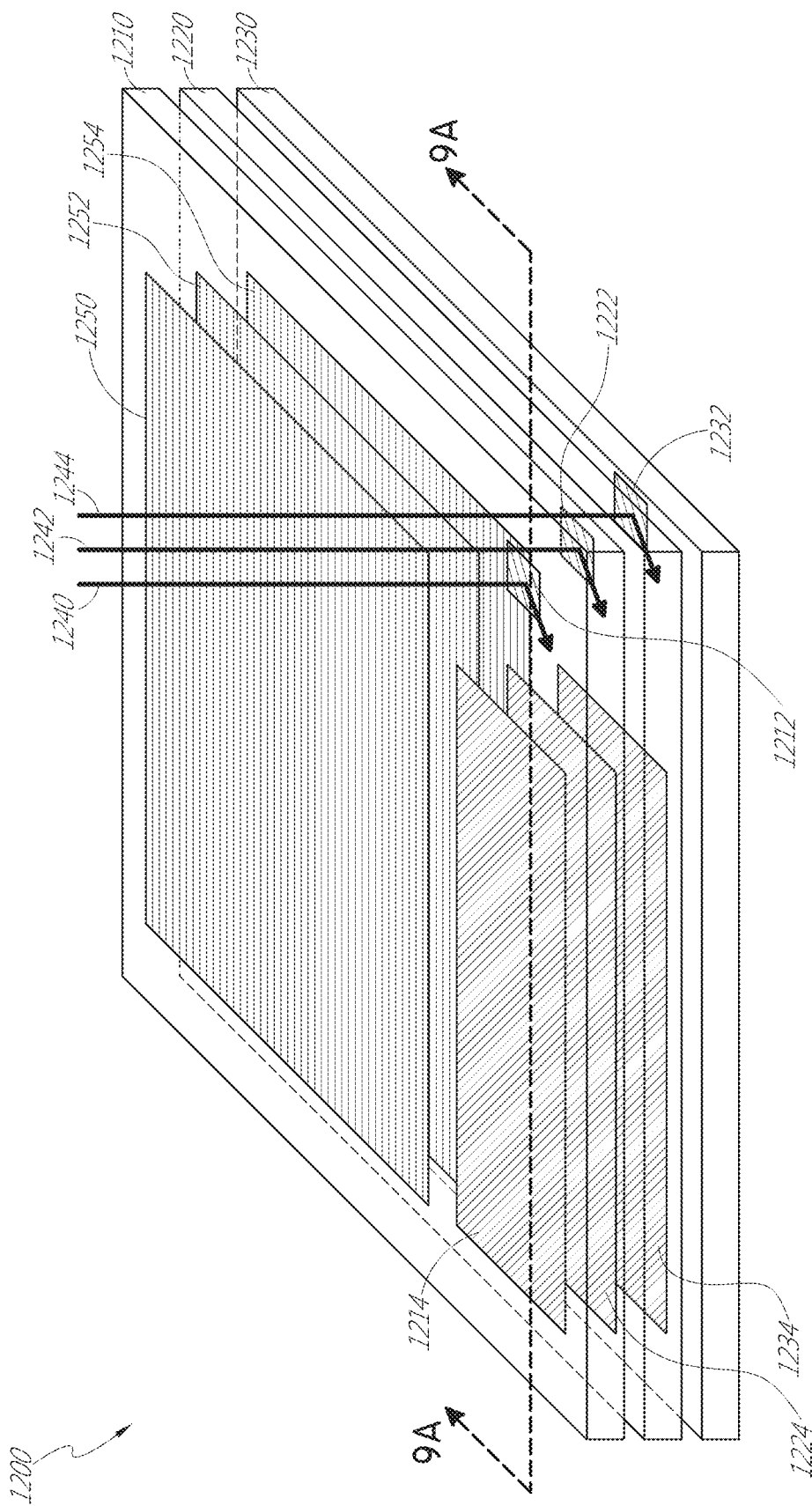
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPEs). In some embodiments, the OPEs both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EPs) or exit pupil expanders (EPEs) that direct light in a viewer's eye 4 (FIG. 7).

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPEs) 1214, 1224, 1234; and outcoupling optical elements (e.g., EPs) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1240 (e.g., blue light) is deflected by the first incoupling optical element 1212, and then continues to bounce down the waveguide, interacting with the light distributing element (e.g., OPEs) 1214 and then the outcoupling optical element (e.g., EPs) 1250, in a manner described earlier. The light rays 1242 and 1244 (e.g., green and red light, respectively) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EPs) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
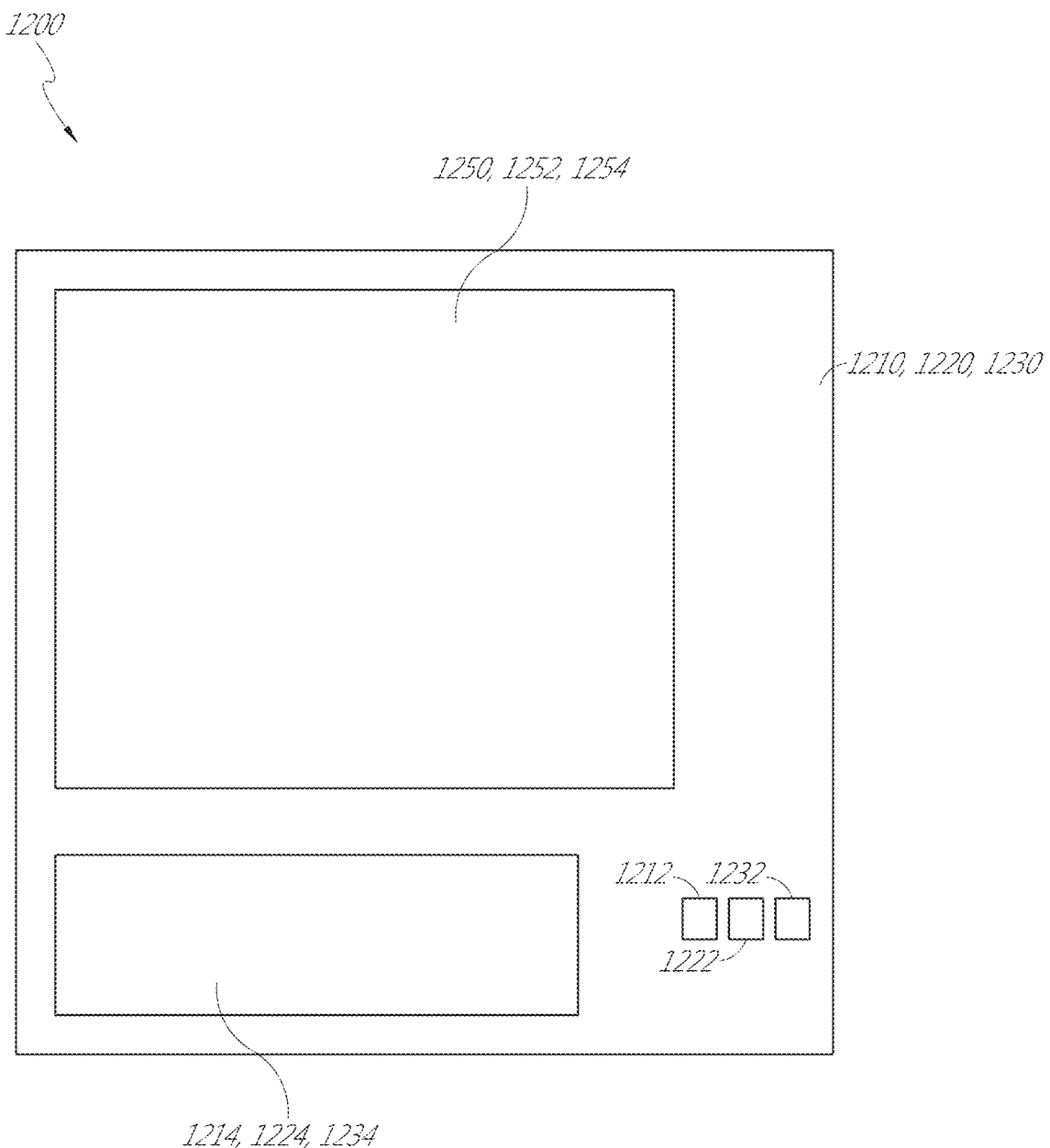
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated incoupling optical elements may be referred to as a shifted pupil system, and the in coupling optical elements within these arrangements may correspond to sub pupils.

Figure 10:
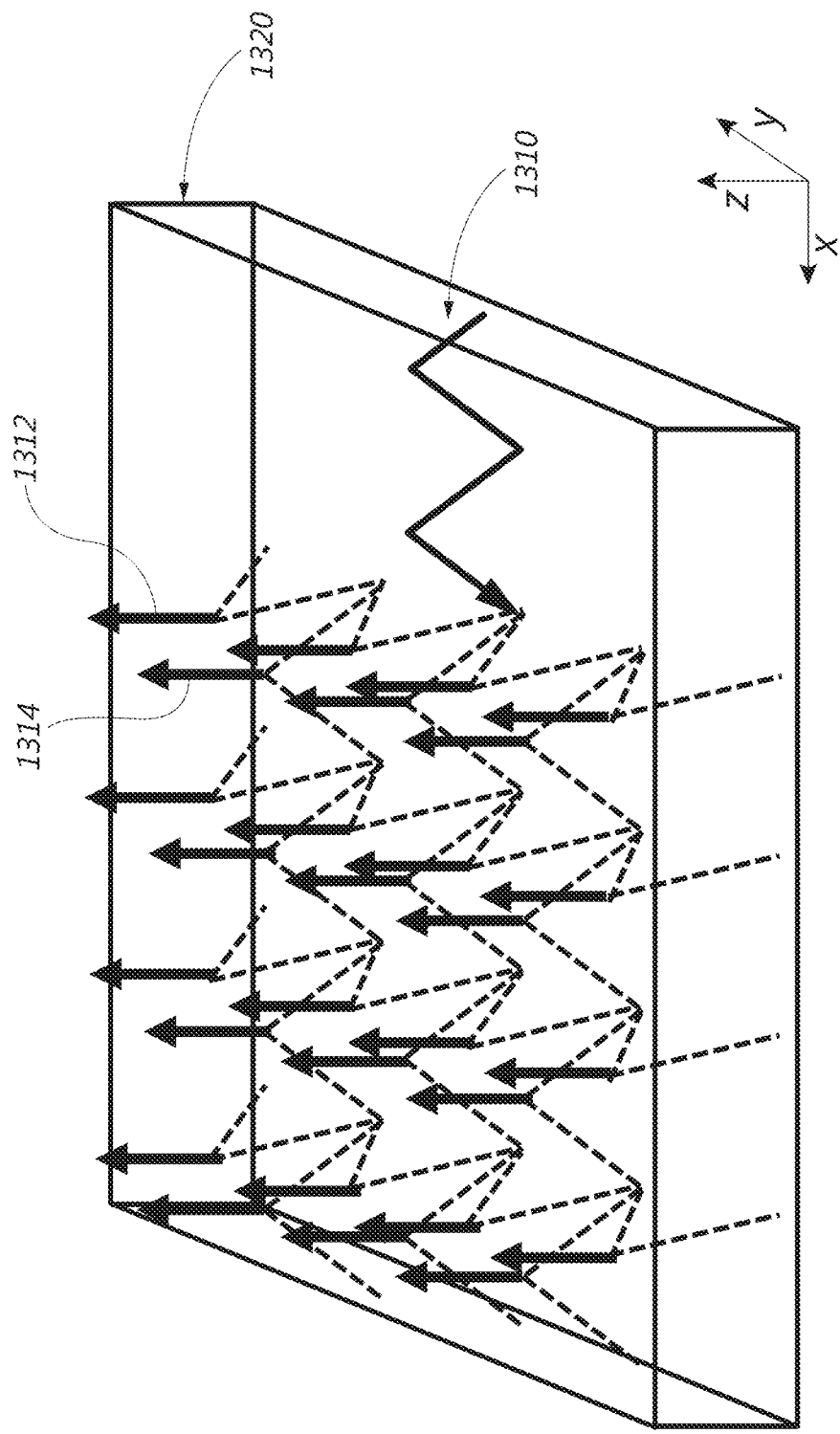
FIG. 10 shows a schematic diagram of incoupled light being distributed in two dimensions and outcoupled by an example two-dimensional waveguide light multiplexer.

Reference will now be made to FIG. 10, which shows an example schematic diagram of incoupled light 1310 propagating through a two-dimensional waveguide light multiplexer 1320 according to some embodiments, via TIR. The light 1310 interacts with the two-dimensional waveguide light multiplexer 1320 as it propagates and is distributed, or multiplexed, along two directions in a first dimension, for example the x-dimension, whereupon it is outcoupled 1312 in a normal direction from the two-dimensional waveguide light multiplexer 1320. The light 1310 also interacts with the two-dimensional waveguide light multiplexer 1320 and is multiplexed along two directions in a second dimension, for example the y-dimension, whereupon it is outcoupled 1314 from the two-dimensional waveguide light multiplexer 1320 in a normal direction. Thus, the incoupled light 1310 is multiplexed in two dimensions and outcoupled 1312, 1314 from the two-dimensional waveguide light multiplexer 1320.

FIG. 11A shows a partial schematic diagram of light 1410 being incoupled into an example waveguide 1420 by an example diffraction grating 1430 and propagating via TIR. In some embodiments, the diffraction grating 1430 has a period ($\Lambda$) larger than the wavelength of light 1410 ($\lambda$) divided by the refractive index (n) of the waveguide but smaller than the wavelength of light 1410 ($\lambda$). In some embodiments, the diffraction grating 1430 may be a binary or sinusoidal surface relief grating. In order to achieve TIR the 1st order diffraction angle ($\theta$) is greater than $\theta_c$, where $\theta$ and $\theta_c$ are such that $n \cdot \sin(\theta) = \lambda/\Lambda$ and $n \cdot \sin(\theta_c) = 1$, in the case where the medium outside of the waveguide is air. The incident light 1410 interacts with the diffraction grating 1430 and is diffracted into the waveguide 1420, whereupon TIR is achieved. As the diffracted light 1412 propagates through the waveguide 1420 via TIR, some light encounters and interacts with the diffraction grating 1430 multiple times.

As illustrated in FIG. 11B, where the propagating diffracted light 1412 interacts with the diffraction grating 1430, it is outcoupled from the waveguide 1420 in two directions 1414, 1416 along the x-dimension, thereby achieving multiplexing of the incident light 1410. This outcoupling occurs via +1 and −1 orders of diffraction.

Figure 11C:
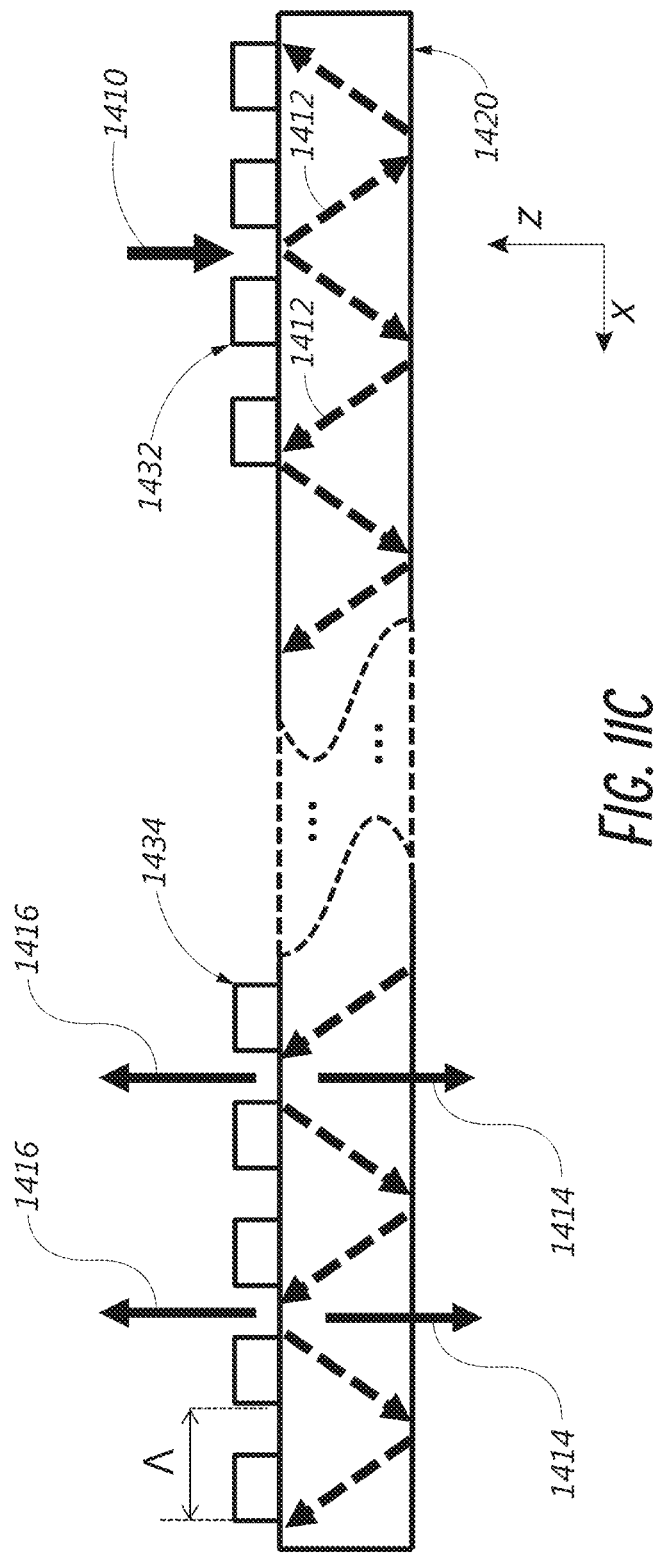
FIG. 11C shows a schematic diagram of light being incoupled into an example waveguide at a first location by an example diffraction grating, and being outcoupled by a second example diffraction grating at a second location.

FIG. 11C demonstrates how the above described phenomenon may be used to achieve light multiplexing via a first diffraction grating 1432 at a first location on a waveguide 1420 and a second diffraction grating 1434 at a second location on the same waveguide. Light 1410 is incident upon the first diffraction grating 1432, whereupon it is diffracted and propagates via TIR through the waveguide 1420 as described above. The propagating light 1412 interacts with a second diffraction grating 1434 at a second location on the waveguide 1420, whereupon it is outcoupled in two normal directions 1414, 1416. Thus a single incident beam or ray of light 1410 incident upon the waveguide 1420 at a first location may be multiplexed and outcoupled along both directions in the x-dimension at a second location.

Figure 12A:
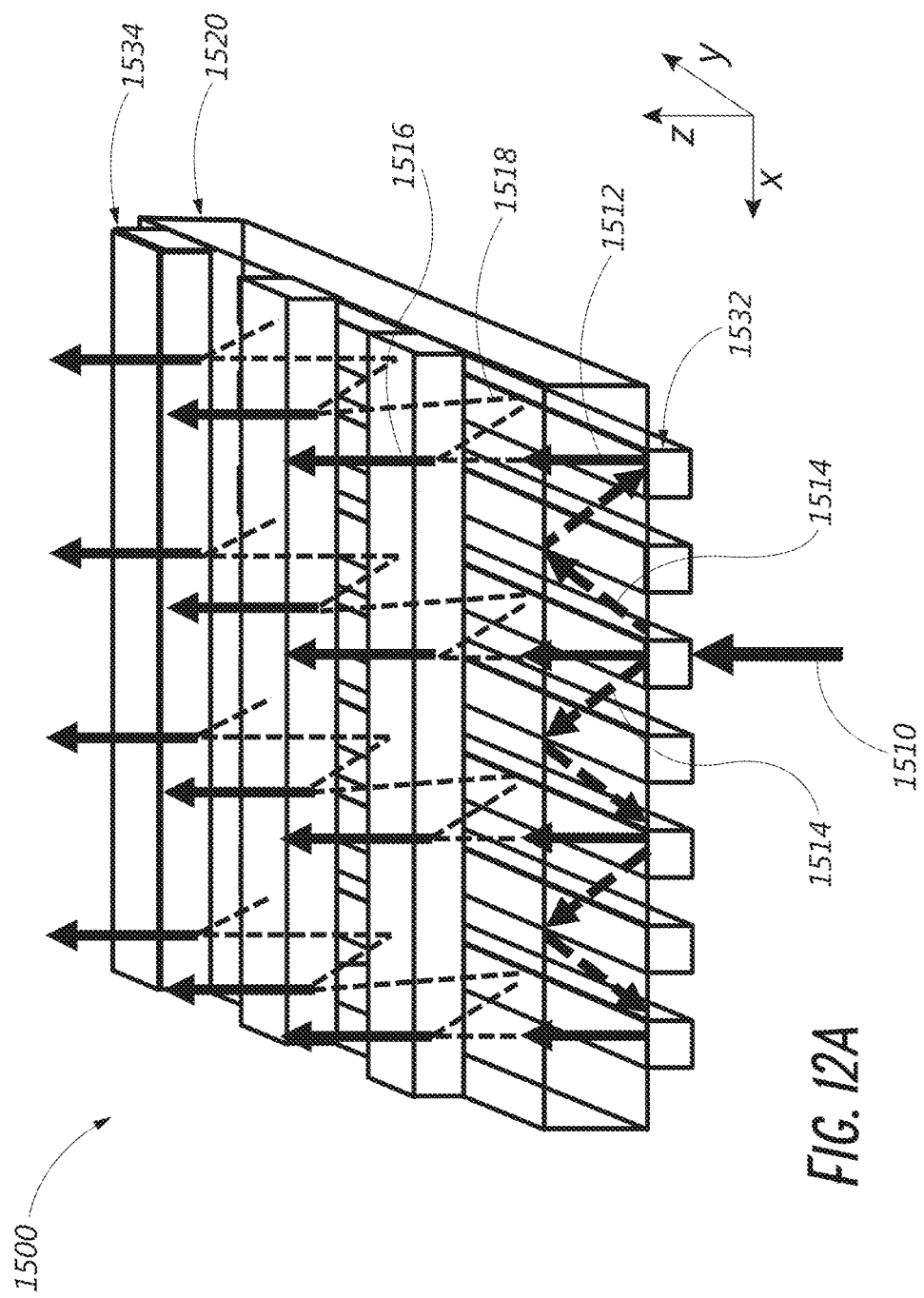
FIG. 12A shows a schematic diagram of light being incoupled, distributed in two dimensions, and outcoupled by a two-dimensional waveguide light multiplexer according to some embodiments.

In some embodiments, and as shown in FIG. 12A, a two-dimensional waveguide light multiplexer 1500 can utilize the phenomenon described above with respect to FIGS. 11A-C to achieve the two-dimensional multiplexing of incident light by including two diffraction gratings 1532, 1534 disposed over one another. In some embodiments, a first diffraction grating 1532 is located on a bottom major surface of a waveguide 1520 and a second diffraction grating 1534 is located on a top major surface of a waveguide 1520.

Importantly, each diffraction grating 1532, 1534 has a corresponding grating direction and the diffraction gratings 1532, 1534 are arranged such that the grating direction of the first diffraction grating 1532 is along the x-dimension and is perpendicular to the grating direction of the second diffraction grating 1534, which is along the y-dimension. In some embodiments, this arrangement of two diffraction gratings wherein the grating direction of a first diffraction grating is perpendicular to the grating direction of a second diffraction grating may be referred to as crossed diffraction gratings. According to some embodiments, and as shown in FIG. 12A, the grating direction corresponds to the physical orientation of the diffraction grating 1532, 1534.

In use, incident light 1510 interacts with the first diffraction grating 1532 whereby it is diffracted and spread along both directions in the x-dimension. The diffracted light propagates through the waveguide 1520 via TIR. As the light propagates it may interact with the first diffraction grating 1532 again and be diffracted and sometimes outcoupled 1512 out of the waveguide 1520. Some of the diffractive light 1512, however, interacts with the second diffraction grating 1534 and is diffracted back inwardly into the waveguide 1520. This light diffracted by the second diffraction grating 1534 may be spread along both directions in the y-dimension as the light propagates through the waveguide 1520 via TIR after being diffracted by the second diffraction grating 1534. As the light propagates in the y-dimension it may interact with the second diffraction grating 1534 again and be diffracted and outcoupled 1516 out of the waveguide 1520. This process continues multiple times until light has been outcoupled 1512, 1516 from the two-dimensional waveguide light multiplexer 1500 in two-dimensions.

Figure 12B:
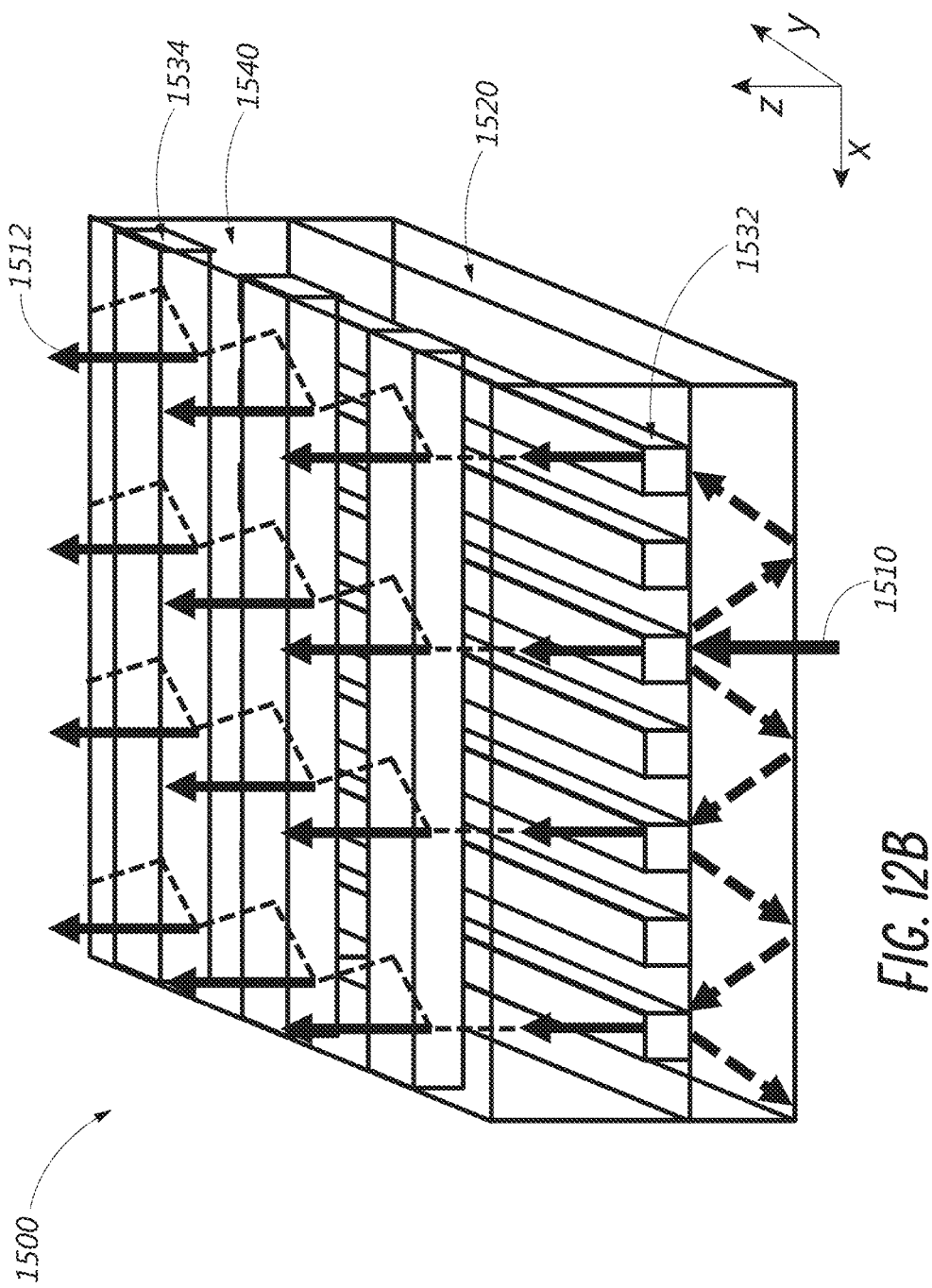
FIG. 12B shows a schematic diagram of light being incoupled, distributed in two dimensions, and outcoupled by a two-dimensional waveguide light multiplexer according to some other embodiments.

In some embodiments, and as illustrated in FIG. 12B, a two-dimensional waveguide light multiplexer 1500 may comprise a first diffraction grating 1532 disposed on a top major surface of a waveguide 1520 and a second diffraction grating 1534 disposed above the first diffraction grating 1532 and the top major surface of the waveguide 1520. This configuration functions similarly and can achieve identical two-dimensional light multiplexing 1512 to the two-dimensional waveguide light multiplexer illustrated in FIG. 12A. With continued reference to FIG. 12B, and in some embodiments, the first diffraction grating 1532 and the second diffraction grating 1534 may be separated by a spacer material 1540. In some embodiments, the spacer material 1540 may comprise an optically transparent material, for example an optically transparent oxide material or an optically transparent polymer.

Additionally, in some embodiments, light 1510 may initially be incoupled into the two-dimensional waveguide light multiplexer 1500 via a separate diffraction grating or other optical element positioned at a separate location on the waveguide 1520 from the first and second diffraction gratings 1532, 1534, in a similar manner to that described above with respect to FIG. 11C.

Figure 13A:
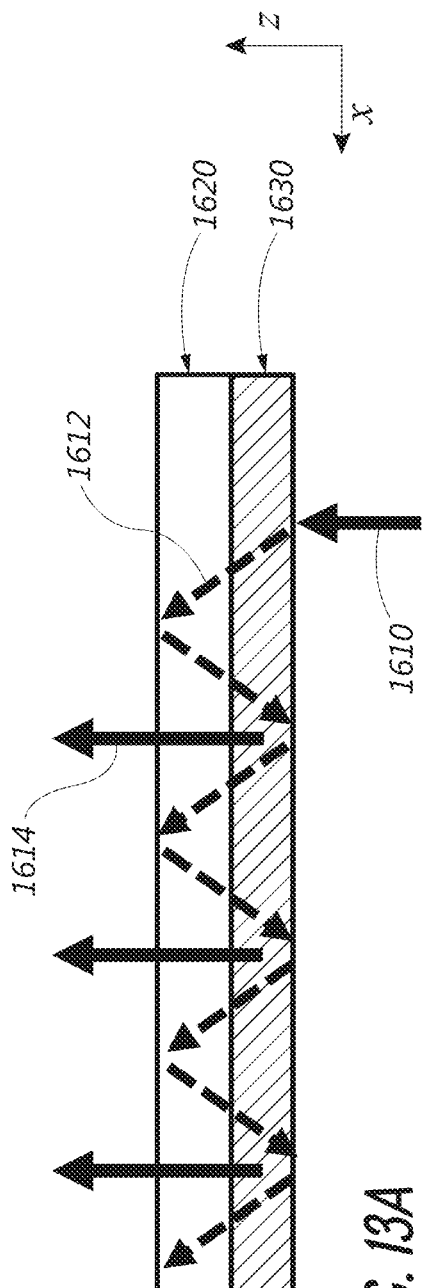
FIG. 13A shows a schematic diagram of light being incoupled into an example waveguide, distributed along one direction in one dimension, and outcoupled via an example diffraction grating having a preferred diffraction direction.

In some embodiments, a diffraction grating may be an asymmetric diffraction grating, such that the diffraction grating has a preferred diffraction direction. In some embodiments, an asymmetric diffraction grating may be, for example, a blazed grating, a Bragg grating, a liquid crystal grating, a sinusoidal grating, a binary grating, a volume phase grating, or a meta-surface grating. In some embodiments an asymmetric diffraction grating may be a polarization grating, for example a liquid crystal polarization grating. As illustrated in FIG. 13A, where a diffraction grating 1630 is an asymmetric diffraction grating having a preferred diffraction direction, light 1610 will primarily be distributed, for example via TIR in an example waveguide 1620 along the preferred diffraction direction. In some embodiments, and as shown in FIG. 13A, the diffraction grating 1630 distributes light 1610 only in the +1 order and preferentially to the left. Advantageously, as compared with the diffraction grating 1430 shown in FIG. 11A, the diffraction grating 1630 only exhibits +1 order diffraction along a preferred diffraction direction. Further, asymmetric diffraction grating 1630 can exhibit a higher diffraction efficiency than a symmetric diffraction grating, for example a binary or sinusoidal surface relief grating. A higher diffraction efficiency may allow for more of the light interacting with the grating to be diffracted in the preferred diffraction direction, thereby leading to, for example, reduced signal loss or the ability to use a lower power light signal. Accordingly, light multiplexing, illustrated as propagating light 1612, will occur primarily in the preferred diffraction direction in one dimension through the waveguide 1620. As with other embodiments described herein, when light 1612, propagating via TIR through waveguide 1620, interacts with the diffraction grating 1630 along the preferred diffraction direction it is outcoupled 1614 generally normal to the diffraction grating 1630 at locations where the interaction occurs.

Figure 13B:
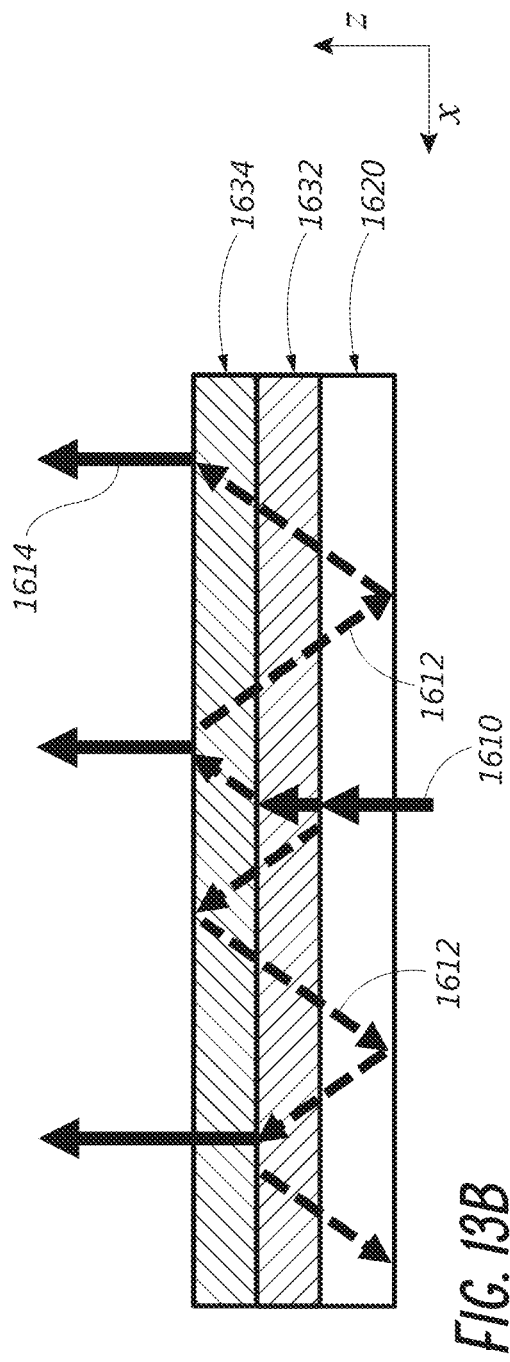
FIG. 13B shows a schematic diagram of light being incoupled into an example waveguide, distributed along two directions in one dimension, and outcoupled via two example diffraction gratings having anti-parallel preferred diffraction directions.

In some embodiments, and as shown in FIG. 13B a first asymmetric diffraction grating 1632 may be disposed on a major surface of a waveguide 1620 and a second asymmetric diffraction grating 1634 may be disposed above the first diffraction grating 1632. The second diffraction grating 1634 is configured such that the diffraction direction is anti-parallel to the diffraction direction of the first diffraction grating 1632. Incident light 1610 passes through a waveguide 1620 and interacts with the first diffraction grating 1632 as described above with respect to FIG. 13A. Some light is not diffracted by the first diffraction grating 1632 and continues in a normal direction where it interacts with the second diffraction grating 1634. As the diffraction direction of the second diffraction grating 1634 is anti-parallel to the diffraction direction of the first diffraction grating 1632, the second diffraction grating 1634 diffracts and spreads light in the opposite direction along the same dimension as the first diffraction grating 1632. The light diffracted by the first diffraction grating 1632 interacts with the first diffraction grating 1632 as it propagates along the preferred diffraction direction and is outcoupled 1614 normal to the diffraction grating 1632 at locations where the interaction occurs. Similarly, light diffracted by the second diffraction grating 1634 interacts with the second diffraction grating 1634 as it propagates along the preferred diffraction direction and is outcoupled 1614 normal to the diffraction grating 1634 at locations where the interaction occurs. In this way, and according to some embodiments, an arrangement of two anti-parallel asymmetric diffraction gratings 1632, 1634 can achieve bi-directional light multiplexing in one dimension.

FIG. 13C illustrates how the above-described phenomenon may be used to achieve directional light multiplexing via a first asymmetric diffraction grating 1632 at a first location on a waveguide 1620 and a second diffraction grating 1634 at a second location on the same waveguide. Similar to the embodiment illustrated in FIG. 11C, Light 1610 is incident upon the first diffraction grating 1632, whereupon it is diffracted and propagates via TIR through the waveguide 1620. The light 1610 is diffracted in the preferred diffraction direction and thus the diffraction grating 1632 may achieve a higher diffraction efficiency than diffraction grating 1432 of FIG. 11C, which diffracts light 1410 in two opposing directions. The propagating light 1612 interacts with a second diffraction grating 1634 at a second location on the waveguide 1620, whereupon it is outcoupled 1614 in a normal direction, and in the opposite direction as compared with diffraction grating 1434 of FIG. 11C which outcoupled light in two normal directions 1414, 1416. Thus, again, the optical element illustrated in FIG. 13C can achieve a higher efficiency for light being outcoupled from the second diffraction grating 1634 as compared with the optical element illustrated in FIG. 11C. Thus light 1610 incident upon the waveguide 1620 at a first location may be efficiently multiplexed and outcoupled along a single direction in one dimension at a second location.

FIG. 13D illustrates that a similar effect to that achieved by the optical element of FIG. 13C can be achieved by including the second diffraction grating 1634 on the bottom major surface of the waveguide 1620 at a second location. The second diffraction grating 1634 operates in transmission and may be referred to as a transmissive diffraction grating, as compared to the second diffraction grating 1634 of FIG. 13C which operates in reflection and may be referred to as a reflective diffraction grating. As compared with the optical device of FIG. 13C the optical device illustrated in FIG. 13D and according to some embodiments, can achieve efficient light multiplexing along a single direction in one dimension. The optical device of FIG. 13D can outcouple light 1614 in a single direction in one dimension at a second location.

The two-dimensional waveguide light multiplexer 1700 illustrated in FIG. 14A and according to some embodiments, comprises a first asymmetric diffraction grating 1732 and a second asymmetric diffraction grating 1734 disposed over the other. In some embodiments, a first diffraction grating 1732 is located on a bottom major surface of a waveguide 1720 and a second diffraction grating 1734 is located on a top major surface of a waveguide 1720. The first asymmetric diffraction grating 1732 is arranged such that the preferred diffraction direction is perpendicular to the preferred diffraction direction of the second asymmetric diffraction grating 1734 as discussed above. Diffraction gratings in this arrangement may be referred to as crossed diffraction gratings.

The two-dimensional waveguide light multiplexer 1700 illustrated in FIG. 14A and according to some embodiments, achieves a similar result to the two-dimensional waveguide light multiplexer 1500 illustrated in FIG. 12A, albeit possibly with a higher efficiency. In use, incident light 1710 interacts with the first diffraction grating 1732 whereby it is diffracted and spread or multiplexed along the preferred diffraction direction in a first dimension. The diffracted light propagates through the waveguide 1720 via TIR. As the light propagates it interacts with the first diffraction grating 1732 and is diffracted and outcoupled 1712. Some of the light diffracted by the first diffraction grating 1732 may interact with the second diffraction grating 1734 and be diffracted so was to propagate within the waveguide via TIR along the preferred diffraction direction of the second diffraction grating, which is perpendicular to the preferred diffraction direction of the first diffraction grating 1732. This light may be diffracted again by the second diffraction grating 1732 and be outcoupled from the light guide in the forward (z) direction as shown. This process continues multiple times until light has been outcoupled 1712, 1714 from the two-dimensional waveguide light multiplexer 1700 in two-dimensions. Notably, because the asymmetric diffraction gratings diffract light in a desired preferred diffraction direction, less light is lost via diffraction in other directions or in other orders, thereby allowing the two-dimensional waveguide light multiplexer to distribute and multiplex more of the original incident light signal.

FIG. 14B illustrates a two-dimensional waveguide light multiplexer 1700 according to some embodiments, comprising a first asymmetric diffraction grating 1732 disposed on a top major surface of a waveguide 1720 and a second asymmetric diffraction grating 1734 disposed above the first diffraction grating 1732 on a top major surface of the waveguide 1720. As in the embodiment illustrated in FIG. 14A, the first asymmetric diffraction grating 1732 and the second asymmetric diffraction grating 1734 are crossed. This configuration of first and second asymmetric diffraction gratings functions similarly and can achieve identical two-dimensional light multiplexing to the two-dimensional waveguide light multiplexer illustrated in FIG. 14A. In some embodiments, the first asymmetric diffraction grating 1732 and the second diffraction grating 1734 may be separated by a spacer material. In some embodiments, the spacer material may comprise an optically transparent material, for example an optically transparent oxide material or an optically transparent polymer.

Additionally, in some embodiments, light 1710 may initially be incoupled into the two-dimensional waveguide light multiplexer 1700 via a separate diffraction grating positioned at a separate location on the waveguide 1720 from the first and second asymmetric diffraction gratings 1732, 1734, in a similar manner to that described above with respect to FIG. 13C.

As shown in FIG. 15A and in some embodiments, a diffraction grating may be a polarization grating. A polarization grating may comprise a periodically varying birefringence pattern along a grating vector. In some embodiments, the grating axis of a polarization grating can be tilted to satisfy Bragg condition such that diffraction efficiency is maximized at a desired angle, for example a diffraction angle which will achieve TIR when a polarization grating 1830 is disposed on a major surface of a waveguide 1820 as illustrated in FIG. 15A. In some embodiments, a polarization grating may comprise liquid crystal materials. For example, the polarization grating 1830 may comprise aligned liquid crystal molecules 1840. Due to the asymmetric structure and tilted grating axis of the polarization grating 1830, the polarization grating 1830 diffracts light 1810 into a preferred direction of +1 order diffraction for only a desired type of circularly polarized light, for example left-handed circularly polarized light, depending on the pattern of the polarization grating. In this way, a circularly polarized light incident upon a polarization grating can behave similarly to, for example, an asymmetric diffraction grating described with respect to FIG. 13A. Any light which has an orthogonal polarization, for example right-handed circularly polarized light, will be transmitted through the polarization grating 1830 and will not be diffracted, as illustrated in FIG. 15B. In some embodiments, where a polarization preferentially diffracts, for example, left-handed circularly polarized light and transmits right-handed circularly polarized light the polarization grating may be referred to as a left-handed polarization grating.

Figure 15C:
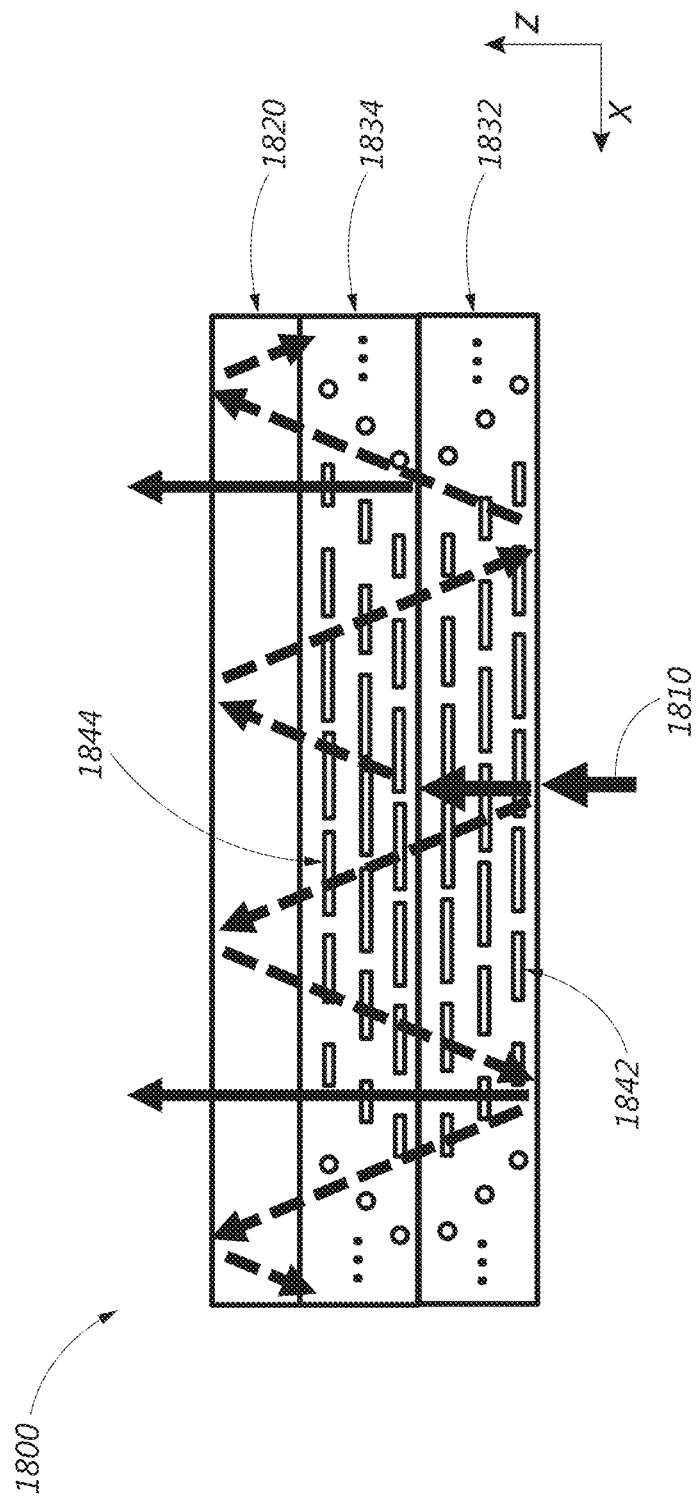
FIG. 15C shows a schematic diagram of light being incoupled into an example waveguide, distributed along two directions in one dimension, and outcoupled via two example anti-parallel polarization gratings.

FIG. 15C illustrates how the above described phenomenon may be used to achieve bi-directional light multiplexing via an optical element, or antisymmetric polarization grating 1800 having first polarization grating 1832 having a first polarization and a second polarization grating 1843 having a second polarization orthogonal to the first polarization disposed above the first polarization grating and anti-parallel to the diffraction direction of the first polarization grating and a waveguide 1820. In some embodiments, the first polarization grating 1832 may comprise aligned liquid crystal molecules 1842 and the second polarization grating 1834 may comprise aligned liquid crystal molecules 1844. The bi-directional multiplexing achieved via two anti-parallel polarization gratings and shown in FIG. 15C is similar to the bi-directional multiplexing achieved via anti-parallel diffraction gratings illustrated in FIG. 13B. Light 1810, which may be linearly or elliptically polarized or unpolarized, is incident. For example, on the first polarization grating 1832, the portion of the light which corresponds to the polarization of the first polarization grating is diffracted, or incoupled by the polarization grating 1832 along the preferred diffraction direction. Light which has a polarization that does not correspond to the polarization of the first polarization grating 1832 is transmitted through the first polarization grating 1832 where it interacts with the second polarization grating 1834. Upon interacting with the second polarization grating 1834, lighting having a polarization corresponding to the polarization of the second polarization grating 1834 is diffracted, or incoupled along the preferred diffraction direction of the second polarization grating 1834, which is anti-parallel to the diffraction direction of the first polarization grating 1832. The diffracted or incoupled light continues to propagate in its corresponding diffraction direction via TIR, where it proceeds to interact with the corresponding polarization grating such that it is outcoupled, to thereby achieve bi-directional multiplexing in one dimension.

In some embodiments, a polarization grating may comprise liquid crystal material. In some embodiments, where a polarization grating comprises liquid crystal material, the tilt or angle of the polarization grating axis can be controlled by controlling the amount and/or chirality of dopants in the liquid crystal material. In some embodiments, where the liquid crystal comprises nematic liquid crystal, the amount and/or chirality of chiral dopants present in the liquid crystal material may be adjusted to attain a desired tilt of the polarization grating axis. In some embodiments, where a polarization grating comprises cholesteric liquid crystal material, the chirality or handedness of the cholesteric liquid crystals of the liquid crystal material may be controlled to attain a desired polarization grating axis tilt.

In some embodiments, a liquid crystal material may comprise a mixture of a high chirality liquid crystal material and a liquid crystal material having a lower chirality. In some embodiments, the chirality of the liquid crystal material may be controlled by adjusting the ratio of the high chirality liquid crystal material to the low chirality liquid crystal material. In some embodiments, a liquid crystal material may comprise a non-chiral liquid crystal material and a chiral dopant. In some embodiments, the chirality of the liquid crystal material may be controlled by adjusting the amount of chiral dopant present in the liquid crystal material. In some embodiments, the liquid crystal material is not chiral. In some embodiments, a desired chirality of the liquid crystal material may correspond to the wavelength of light, angle of incidence of light, angle of travel of light within a waveguide, or other factors. In some embodiments, a liquid crystal material may be a polymerizable liquid crystal material.

In some embodiments, and as illustrated in FIG. 16A, a diffraction grating, such as a polarization grating may be fabricated by depositing an alignment layer 1910 on a substrate 1900. In some embodiments, the alignment layer 1910 may serve to align the crystal molecules 1950 of the liquid crystal material in a desired orientation. In some embodiments, the substrate 1900 may comprise, for example, a waveguide. In some embodiments, the deposited alignment layer 1910 may be patterned to align liquid crystal material 1920 in a desired orientation. In some embodiments, liquid crystal material 1920 may subsequently be deposited on the alignment layer 1910 to thereby form a diffraction grating.

In some embodiments, a number of different alignment processes may be utilized for fabricating a diffraction grating. In some embodiments, an alignment process may align the crystals of a liquid crystal material to thereby form a diffraction grating. In some embodiments, a diffraction grating may be fabricated according to the processes disclosed in, for example, U.S. Provisional Patent Applications Nos. 62/424,305 and 62/424,310 filed on Nov. 18, 2016, which are hereby incorporated by reference in their entireties. In some embodiments, a deposited liquid crystal layer may be aligned by, for example, photo-alignment, micro-rubbing, nano-imprinting, or holographic recording of liquid crystal material, such as an azo-containing polymer. In some embodiments, a nano-imprinting process may be used to align a liquid crystal material. In some embodiments, for example, a polymerizable liquid crystal material or reactive mesogen material is used to form a diffraction grating. A first layer of liquid crystal material can be imprinted for alignment and can then serve as an alignment layer for any subsequently deposited liquid crystal layer without a need for an additional alignment layer or process.

Figure 16B:
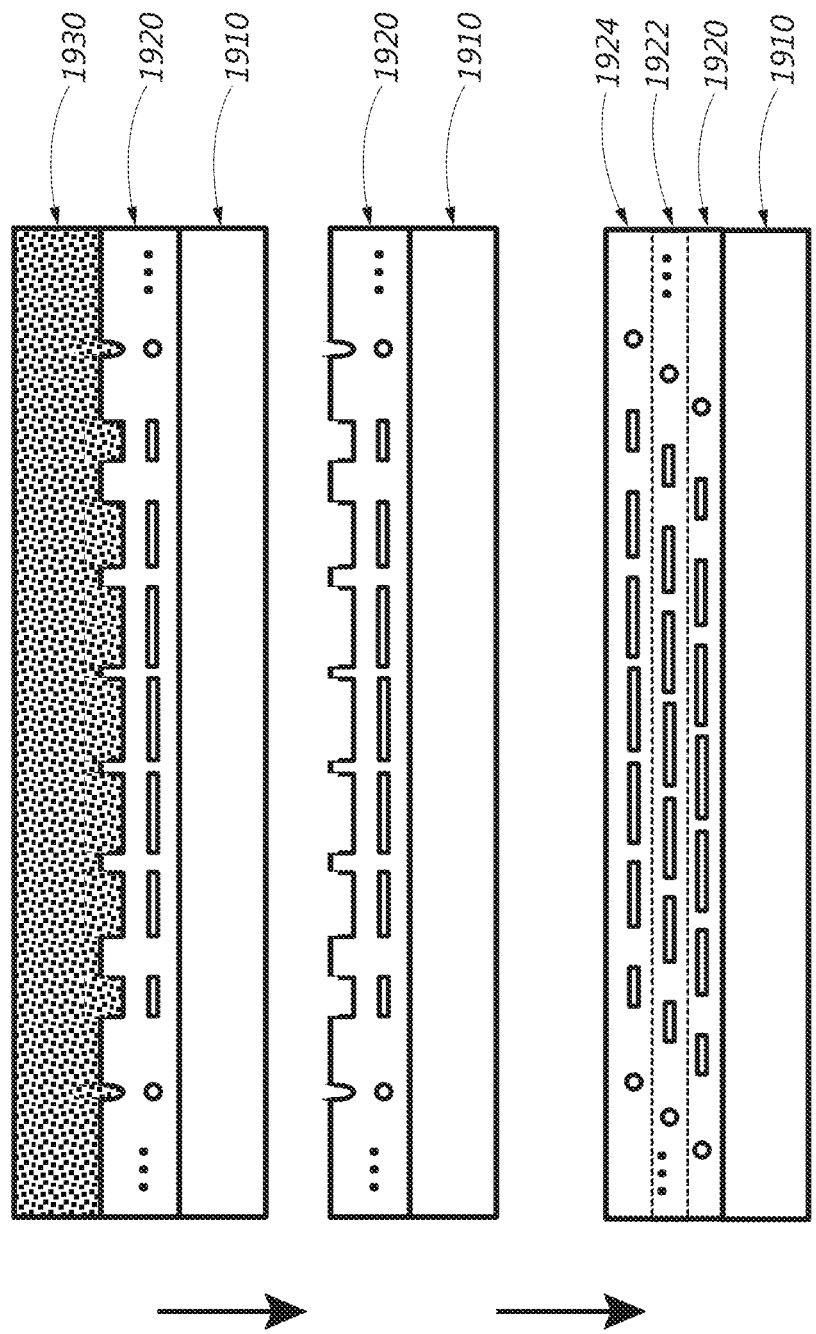
FIG. 16B is a schematic diagram showing a process for forming a liquid crystal diffraction grating using a nano-imprint alignment process according to some embodiments.

According to some embodiments, and as illustrated in FIG. 16B a first polymerizable liquid crystal layer 1920 is deposited on a substrate 1900, which may comprise, for example a waveguide. The deposited first liquid crystal layer 1920 may then be aligned via a nano-imprinting process. An imprint template 1930 comprising nanostructures may be pressed onto the surface of the first liquid crystal layer 1920 such that the liquid crystals of the first liquid crystal layer 1920 are aligned in a desired manner. The first liquid crystal layer 1920 may then be polymerized and the imprinting template 1930 may be separated and removed from the first liquid crystal layer 1920, the surface of which comprises an embossed pattern corresponding to the structure of the imprinting template 1930. A second liquid crystal layer 1922 may then be deposited on the first liquid crystal layer 1920. In some embodiments, the second liquid crystal layer 1922 may comprise the same material as the first liquid crystal layer 1920. In some embodiments, the second liquid crystal layer 1922 may comprise a liquid crystal material having a different chirality than the first liquid crystal layer 1920. In some embodiments, the second liquid crystal layer 1922 may comprise a liquid crystal material having a chirality determined by the chirality of the first liquid crystal layer 1920. In some embodiments, the imprinted pattern of the first liquid crystal layer 1920 serves to align the deposited second liquid crystal layer 1922. An additional liquid crystal layer 1924 or layers may be deposited on the second liquid crystal layer 1922 without the need for an additional imprinting or alignment step. In some embodiments, the additional liquid crystal layer 1924 or layers may comprise the same material as the first or second liquid crystal layer 1920, 1922. In some embodiments, an additional liquid crystal layer may have a different chirality than one or more other liquid crystal layers. In some embodiments, after the deposition of a second, third, fourth, fifth, or more liquid crystal layer, no imprinting signature remains on the surface of the fabricated diffraction grating because the subsequently deposited liquid crystal layers fill in the imprinted surface structures, thereby leaving a smooth surface on the grating.

Advantageously, and according to some embodiments, the above-described nano-imprinting process can be used to deposit liquid crystal layers having various spatial patterns, for example grating patterns having different grating periods, on a substrate without alignment layers therebetween. In some cases, liquid crystal layers comprising varying concentrations of chiral dopants are used. A number of deposited liquid crystal layers having a number of different orientations or different periods can be formed on a single substrate by imprinting with one or more different imprinting templates, without the need for an alignment layer between each grating.

Figure 16C:
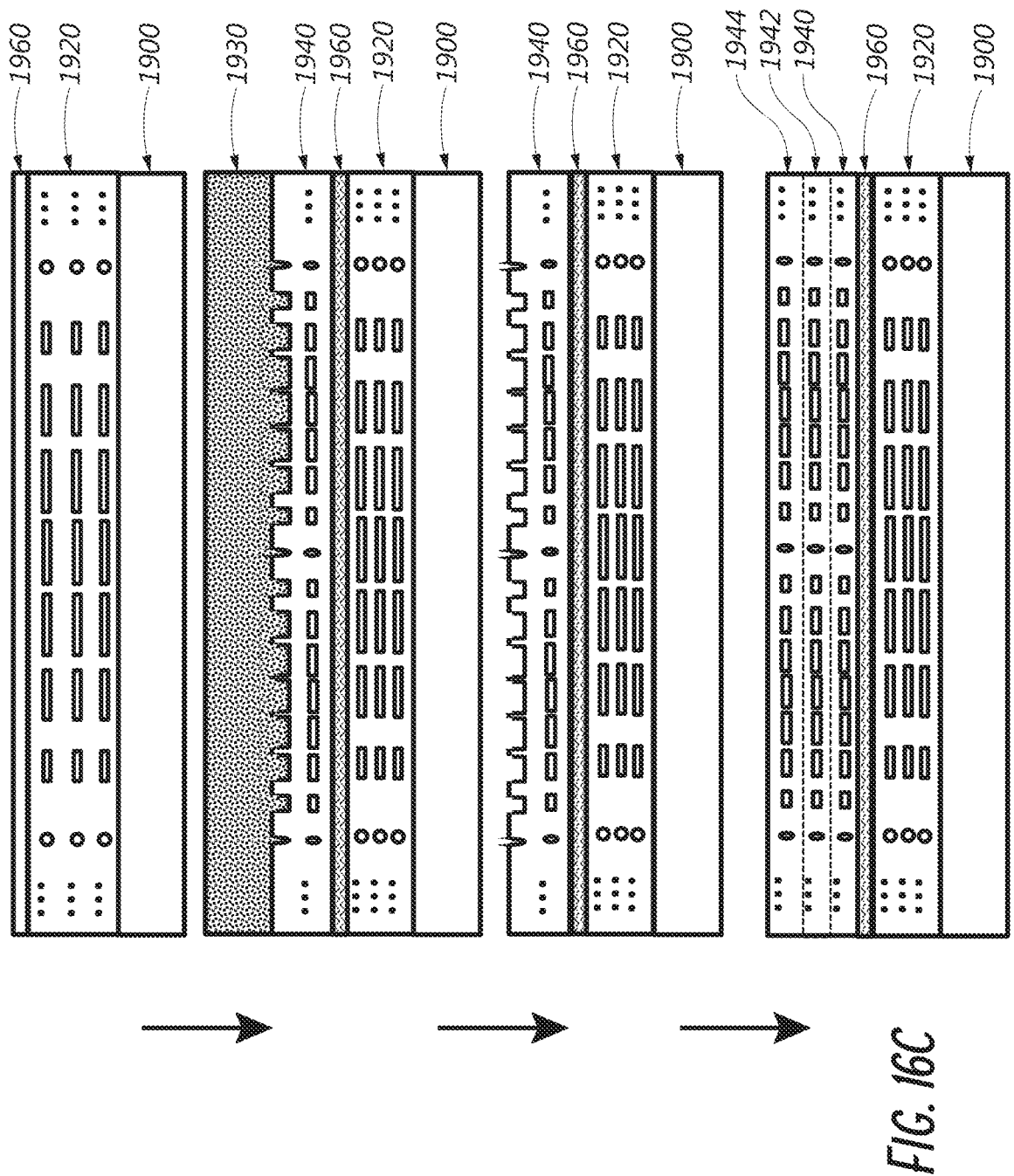
FIG. 16C is a schematic diagram showing a process for forming liquid crystal diffraction grating layers having different grating periods using a nano-imprint alignment process according to some embodiments.

According to some embodiments, and as illustrated in FIG. 16C, a first polymerizable liquid crystal layer 1920 is deposited on a substrate 1900, which may comprise, for example, a waveguide. The first liquid crystal layer 1920 may comprise, for example, one or more liquid crystal sublayers and may be aligned using a nanoimprinting process, similar to the process described above with respect to FIG. 16B. In some embodiments the first liquid crystal layer 1920 may comprise a diffraction grating having a first period and/or a first orientation. In some embodiments an isolation layer 1960 can be deposited on the first liquid crystal layer 1920. The isolation layer 1960 may comprise, for example, a transparent oxide layer, a transparent dielectric layer, or a transparent polymer.

In some embodiments a second liquid crystal sublayer 1940 may be deposited on the isolation layer 1960. The deposited second liquid crystal sublayer 1940 may then be aligned via a nano-imprinting process as described above with respect to FIG. 16B. In some embodiments the nano-imprinting process for the second liquid crystal sublayer may utilize a different imprinting template from the imprinting template used to imprint the first liquid crystal layer 1920, for example an imprinting template having a different period or in a different orientation. As such, the second liquid crystal sublayer 1940 may have a second, different period or orientation than first liquid crystal layer 1920. Additional liquid crystal sublayers, for example liquid crystal sublayers 1942, 1944 may then be deposited on the aligned second liquid crystal sublayer 1940 without the need for an additional imprinting or alignment step as described above with respect to FIG. 16B.

In some embodiments where one or more subsequent liquid crystal layers, for example liquid crystal sublayers 1940, 1942, and 1944, are deposited on isolation layer 1960, the isolation layer may serve to separate the first liquid crystal layer 1920 from the one or more subsequent liquid crystal layers in order to avoid liquid crystal alignment defects, including disclinations, due to any discontinuity between the first liquid crystal layer 1920 and any subsequent liquid crystal layers.

Figure 16D:
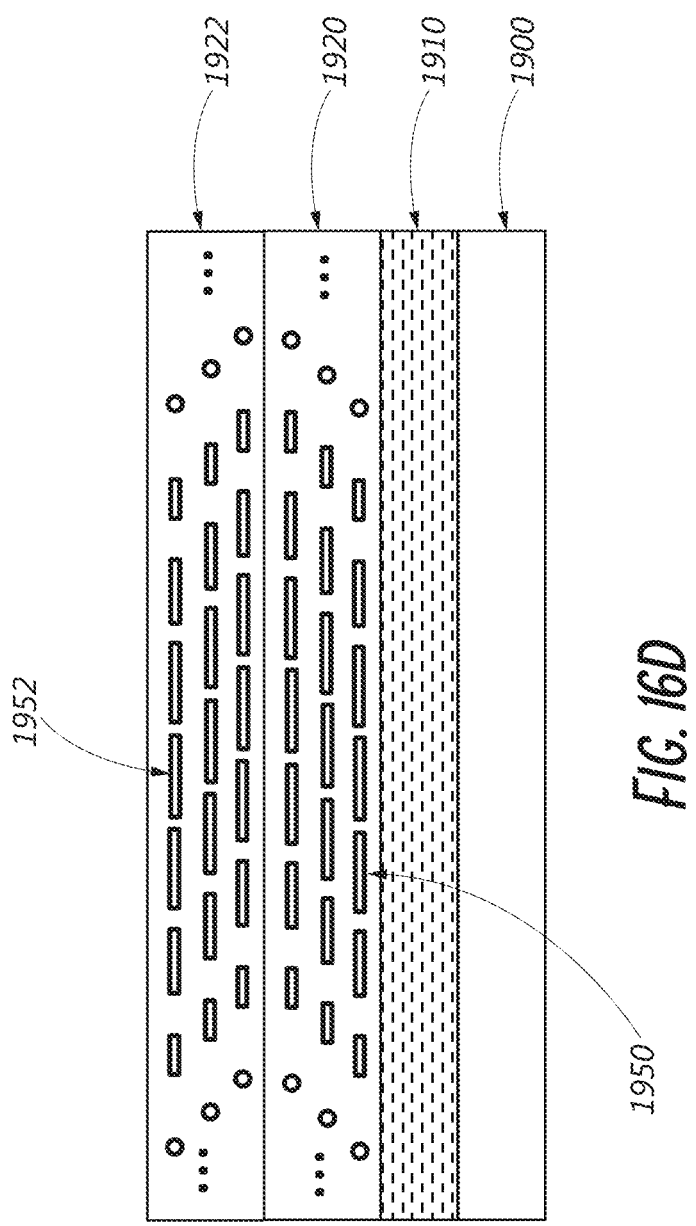
FIG. 16D shows a schematic diagram of an anti-parallel diffraction grating comprising two liquid crystal layers having opposite twist angles.

In some embodiments, antisymmetric, or anti-parallel diffraction gratings can be fabricated by depositing a first liquid crystal layer 1920 having a first handedness, or twist angle and a second liquid crystal layer 1922 having a second, opposite handedness or twist angle as illustrated in FIG. 16D. In some embodiments, the first liquid crystal layer 1920 may comprise a chiral dopant having a first handedness and a second liquid crystal layer 1922 may comprise a chiral dopant having a second, opposite handedness. In some embodiments, the first liquid crystal layer 1920 may comprise a cholesteric liquid crystal material comprising liquid crystal molecules 1950 having a first handedness and second liquid crystal layer 1922 may comprise a cholesteric liquid crystal material comprising liquid crystal molecules 1952 having a second, opposite handedness. The anti-parallel diffraction grating functions similarly to the anti-parallel diffraction grating optical element illustrated in FIG. 15C. In some embodiments, the first liquid crystal layer 1920 may be deposited on an alignment layer 1910 that has been deposited on a substrate 1900, for example a waveguide.

Figure 16E:
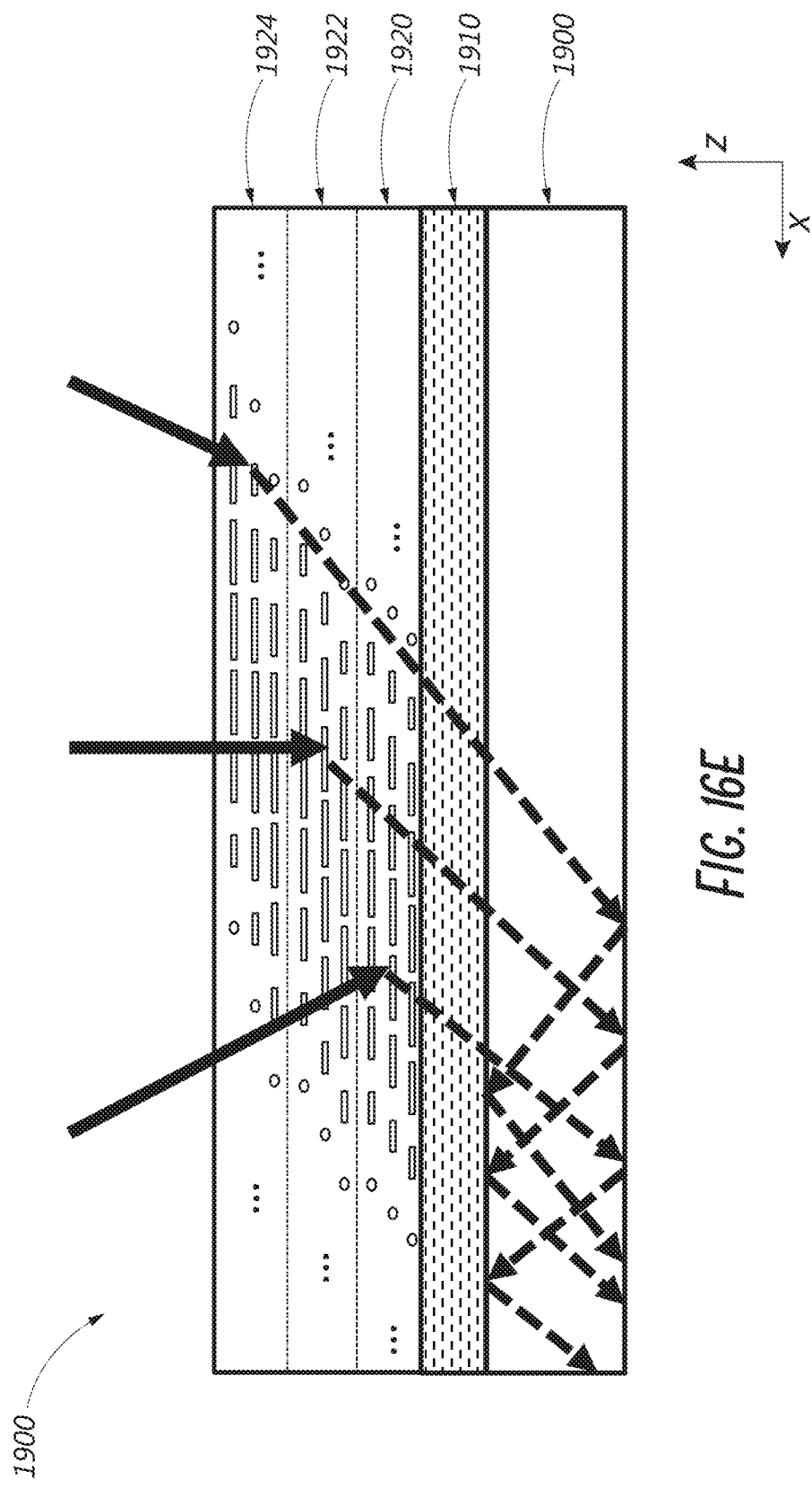
FIG. 16E shows a schematic diagram of light being incoupled from multiple incident angles into an example waveguide and distributed in one direction in one dimension by an example liquid crystal polarization grating including multiple layers of liquid crystal material having different tilt angles according to some embodiments.

FIG. 16E illustrates a diffraction grating 1901 comprising multiple liquid crystal layers 1920, 1922, 1924 deposited on an alignment layer 1910 which has been deposited on a substrate 1900, for example a waveguide according to processes described herein. In some embodiments, the diffraction grating 1901 may comprise a polarization grating. Conventional Bragg gratings, including volume phase gratings, typically have a narrow range of incident angles having high diffraction efficiencies, for example, less than about 5 degrees for the full-width at half maximum diffraction angle. Polarization gratings, however, can exhibit a relatively broad range of incident angles having high diffraction efficiencies, for example, about 15 to 20 degrees for the full-width at half maximum diffraction angle. In some embodiments, the range of angles having a high diffraction efficiency may be broadened even further by including a number of layers in the polarization grating having different tilt angles, as illustrated in FIG. 16E. As described above, the tilt angle of each liquid crystal layer 1920, 1922, 1924 can be controlled by controlling the chirality of the liquid crystal material for each layer. In some embodiments, the chirality may be controlled via the amount of chiral dopant present in nematic liquid crystal material. In some embodiments, the chirality can be controlled by utilizing cholesteric liquid crystals having different helical twist powers. Further, as described above with respect to FIG. 16B, no alignment layer or patterning or imprinting is needed between each of the liquid crystal layers 1920, 1922, 1924 having different tilt angles. Although illustrated as having three liquid crystal layers, in some embodiments, a polarization grating 1901 may comprise two, three, four, five, ten, twenty, fifty, or more liquid crystal layers.

Figure 16F:
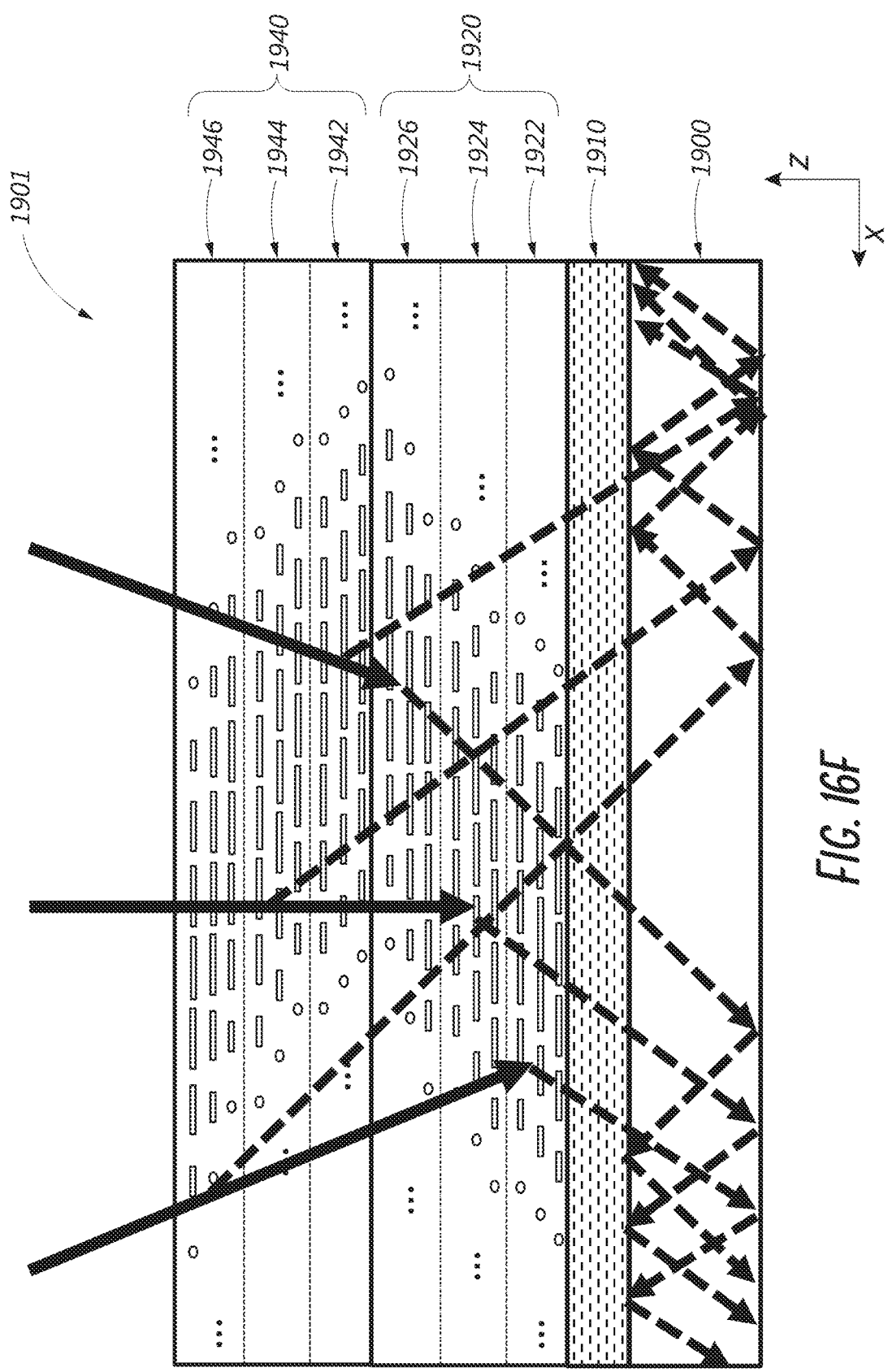
FIG. 16F shows a schematic diagram of light being incoupled from multiple incident angles into an example waveguide and distributed in two directions in one dimension by two antiparallel example liquid crystal polarization gratings including multiple layers of liquid crystal material having different tilt angles according to some embodiments.

FIG. 16F illustrates an anti-parallel or antisymmetric polarization grating 1901 where each of the two liquid crystal layers 1920, 1940 comprises a plurality of liquid crystal sublayers, each sublayer having a different tilt angle. In some embodiments, the antisymmetric, or anti-parallel polarization grating 1901 can be fabricated by depositing a first liquid crystal layer 1920 having a first handedness, or twist angle. The first liquid crystal layer 1920 is fabricated by depositing multiple liquid crystal sublayers 1922, 1924, 1926, each liquid crystal sublayer having the same handedness, but each having different tilt angle. In some embodiments, the liquid crystal sublayers 1922, 1924, 1926 are deposited and aligned according to processes described herein. A second liquid crystal layer 1940 is deposited above the first liquid crystal layer 1920, the second liquid crystal layer comprising multiple liquid crystal sublayers 1942, 1944, 1946, each liquid crystal sublayer having the same handedness, but each having different tilt angle. The handedness of the liquid crystal layer 1940 and liquid crystal sublayers 1942, 1944, 1946 is opposite the handedness of the first liquid crystal layer 1920 and liquid crystal sublayers 1922, 1924, 1926. The asymmetric polarization grating illustrated in FIG. 16F and according to some embodiments, can achieve bi-directional light multiplexing in a similar manner to the antisymmetric polarization grating 1800 illustrated in FIG. 15C. However, the antisymmetric polarization grating 1901 can achieve efficient light multiplexing for a substantially broader range of incident angles due to the multiple tilt angles of the liquid crystal sublayers of the antisymmetric polarization grating.

In some embodiments, a two-dimensional waveguide light multiplexer can comprise a waveguide, a first anti-parallel or antisymmetric polarization grating disposed on a major surface of the waveguide and a second anti-parallel or asymmetric polarization grating disposed above the first anti-parallel polarization grating. In some embodiments, the first and second anti-parallel polarization gratings are oriented such that the bi-directional multiplexing directions of each anti-parallel polarization grating are perpendicular to each other, such that the anti-parallel polarization gratings can be said to be crossed. In some embodiments, the first anti-parallel polarization grating may be disposed on a bottom major surface of the waveguide and the second anti-parallel polarization grating may be disposed on the top major surface of the waveguide. In some embodiments, the first anti-parallel polarization grating may be disposed on the top major surface of a waveguide and the second anti-parallel polarization grating may be disposed above the first anti-parallel polarization grating and top major surface of the waveguide. In some embodiments, a second anti-parallel or polarization grating may be separated from the first anti-parallel polarization grating by an isolation layer or by an alignment layer. In some embodiments, an anti-parallel polarization grating can comprise liquid crystal material as described herein.

Figure 17A:
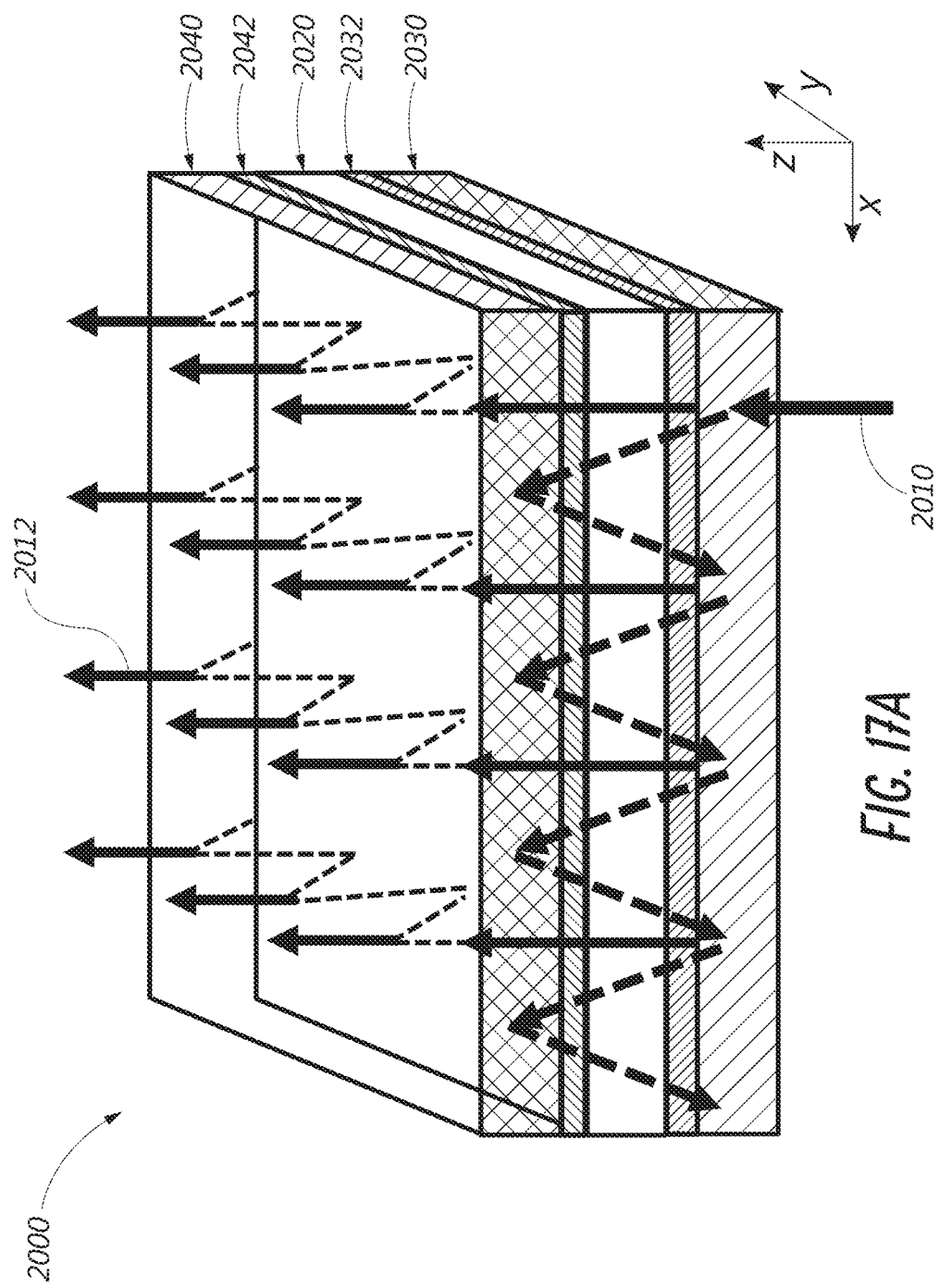
FIG. 17A shows a schematic diagram of light being incoupled, distributed in two dimensions, and outcoupled by a two-dimensional waveguide light multiplexer comprising crossed polarization gratings according to some embodiments.

FIG. 17A illustrates a two-dimensional waveguide light multiplexer 2000 according to some embodiments that comprises a liquid crystal first anti-parallel polarization grating 2030, such as the liquid crystal anti-parallel polarization grating 1901 described with respect to FIG. 16E, disposed on the bottom major surface of a waveguide 2020. The two-dimensional waveguide light multiplexer further comprises a second liquid crystal anti-parallel polarization grating 2040 disposed on top major surface of the waveguide 2020 above the first anti-parallel polarization grating 2030. The second liquid crystal anti-parallel polarization grating 2040 may also be an anti-parallel polarization grating similar to the liquid crystal anti-parallel polarization grating 1901 described with respect to FIG. 16E. The first and second anti-parallel polarization gratings 2030, 2040 are oriented such that the bi-directional multiplexing directions of the first anti-parallel polarization grating 2030 are perpendicular to the bi-directional multiplexing directions of the second anti-parallel polarization grating 2040. Similar to other embodiments of two-dimensional waveguide light multiplexers described herein, the anti-parallel polarization gratings 2030, 2040 can be said to be crossed anti-parallel polarization gratings. The two-dimensional waveguide light multiplexer also comprises a first alignment layer 2032 deposited on a bottom major surface of the waveguide 2020, which is used to align the first and subsequent liquid crystal layers and sublayers that comprise the first anti-parallel polarization grating 2030, according to processes described herein. The two-dimensional waveguide light multiplexer also comprises a second alignment layer 2042 deposited on the top major surface of the waveguide 2020 which is used similarly used to align the first and subsequent liquid crystal layers and sublayers that comprise the second anti-parallel polarization grating 2040. The two-dimensional waveguide light multiplexer 2000 illustrated in FIG. 17A and according to some embodiments functions in a similar manner to the two-dimensional waveguide light multiplexers illustrated in, for example, 12A, 12B, 14A, and 14B. However, in some embodiments, where a two-dimensional waveguide light multiplexer 2000 utilizes cross anti-parallel polarization gratings it can achieve two-dimensional light multiplexing 2012 for a broader range of angles of incident light 2010 at a higher efficiency than a two-dimensional waveguide light multiplexer using symmetric diffraction gratings, or even asymmetric diffraction gratings.

Figure 17B:
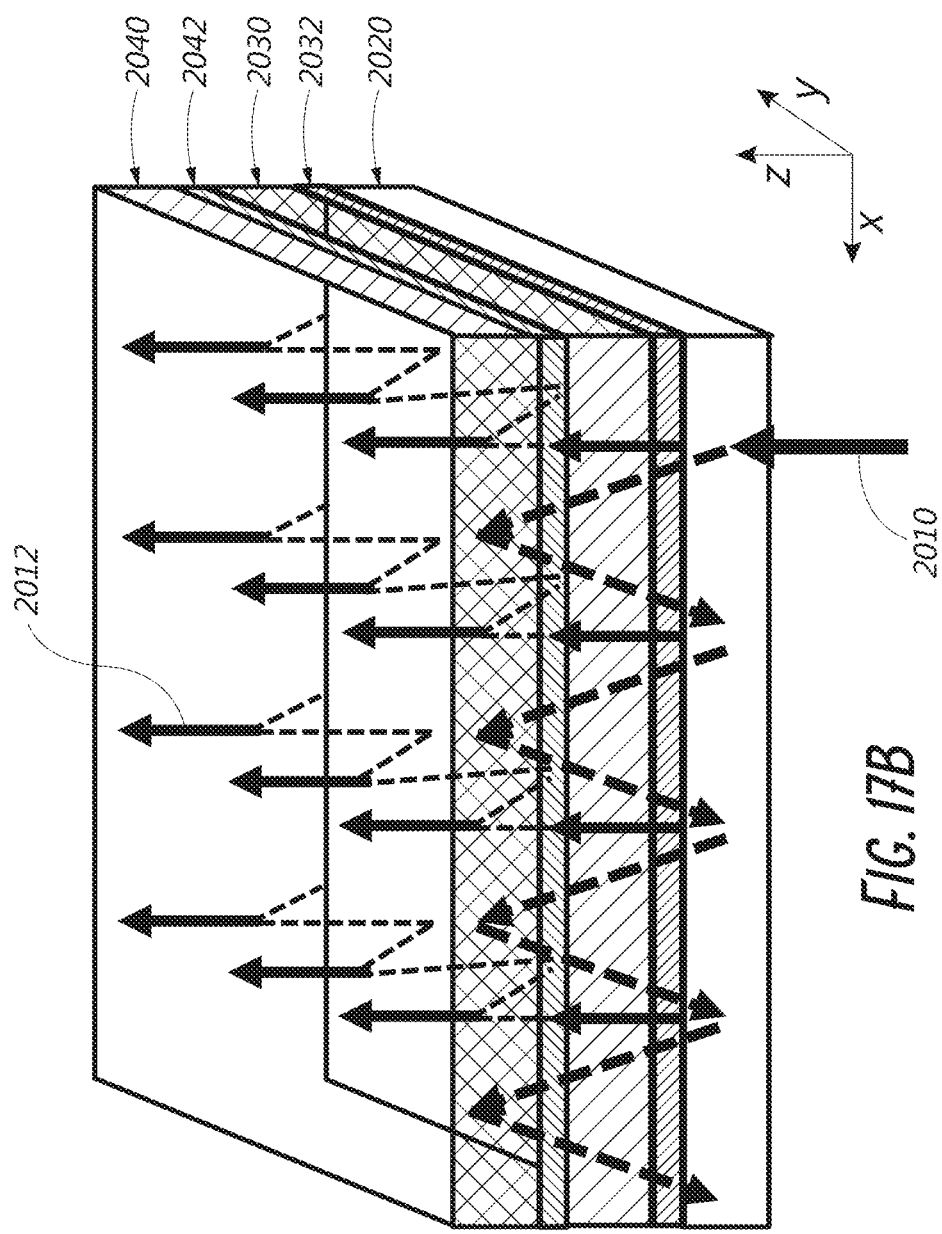
FIG. 17B shows a schematic diagram of light being incoupled, distributed in two dimensions, and outcoupled by a two-dimensional waveguide light multiplexer comprising crossed polarization gratings according to some other embodiments.

FIG. 17B illustrates a two-dimensional waveguide light multiplexer 2000 according to some embodiments where the first liquid crystal anti-parallel polarization grating 2030 is disposed on the top major surface of the waveguide 2020 and the second liquid crystal anti-parallel polarization grating 2040 is disposed above the first anti-parallel polarization grating 2030 and top major surface of the waveguide 2020. The liquid crystal anti-parallel polarization gratings 2030, 2040 are aligned via an alignment layer according to processes described herein. In some embodiments, a first alignment layer 2032 may be deposited on the top major surface of the waveguide 2020 and the first anti-parallel polarization grating 2030 may be fabricated thereon. A second alignment layer 2042 may then be deposited on the first anti-parallel polarization grating 2030 and the second anti-parallel polarization grating 2040 may be fabricated thereon to form the two-dimensional waveguide light multiplexer 2000. As such, according to some embodiments, the first anti-parallel polarization grating 2020 and the second anti-parallel polarization grating 2040 of the two-dimensional waveguide light multiplexer 2000 may be separated by an alignment layer 2042.

Figure 17C:
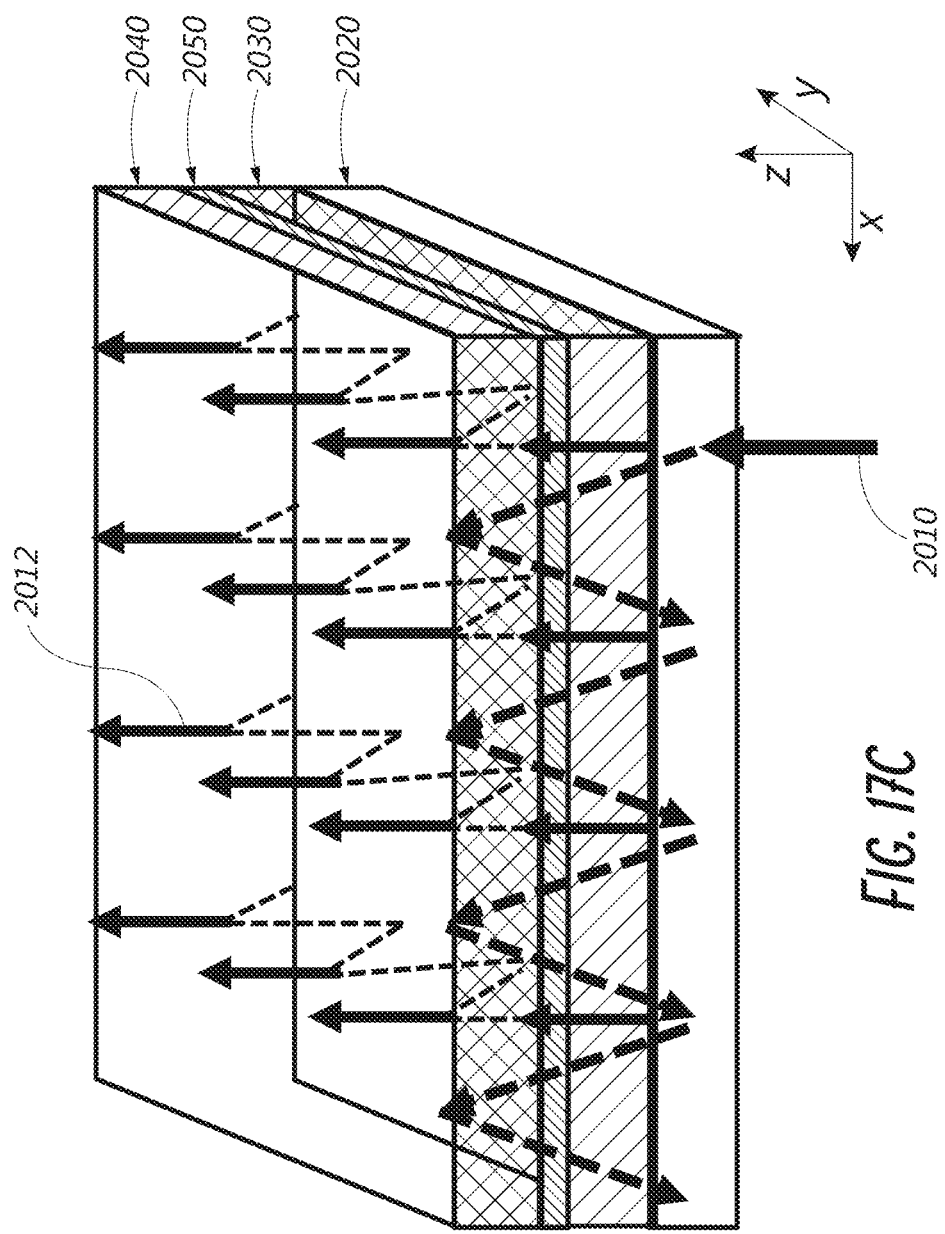
FIG. 17C shows a schematic diagram of light being incoupled, distributed in two dimensions, and outcoupled by a two-dimensional waveguide light multiplexer comprising crossed polarization gratings fabricated using a nano-imprinting process according to some embodiments.

FIG. 17C illustrates a two-dimensional waveguide light multiplexer 2000 having a similar configuration to the two-dimensional waveguide light multiplexer illustrated in FIG. 17B, such that both the first and second anti-parallel polarization gratings 2030, 2040 are disposed on the top major surface of the waveguide. The two-dimensional waveguide light multiplexer 2000 illustrated in FIG. 17C comprises liquid crystal anti-parallel polarization grating 2030, 2040 which are fabricated and aligned via a nano-imprinting process, such as the process described with respect to FIG. 15B. Each anti-parallel polarization grating 2030, 2040 is fabricated such that no separate alignment layer is required. Accordingly, an isolation layer 2050 is deposited or formed on the top major surface of the first anti-parallel polarization grating 2030 to separate the first anti-parallel polarization grating 2030 from the second anti-parallel polarization grating 2040. In some embodiments, the isolation layer 2050 may serve to protect the first anti-parallel polarization grating 2030 during imprinting of the second anti-parallel polarization grating 2040. In some embodiments, the isolation layer 2050 may be similar to other isolation layers described herein and may comprise, for example, a transparent oxide or polymer.

In some embodiments, the same imprinting template may be used to fabricate both the first and second anti-parallel polarization gratings 2030, 2040. In some embodiments, where the same imprint template is used to fabricate both the first and second anti-parallel polarization gratings 2030, 2040 the imprinting template is rotated 90 degrees with respect to its orientation during imprinting of the first anti-parallel polarization gratings 2030 when fabricating the second anti-parallel polarization grating 2040 so that the first and second anti-parallel polarization gratings 2030, 2040 are crossed.

Figure 17D:
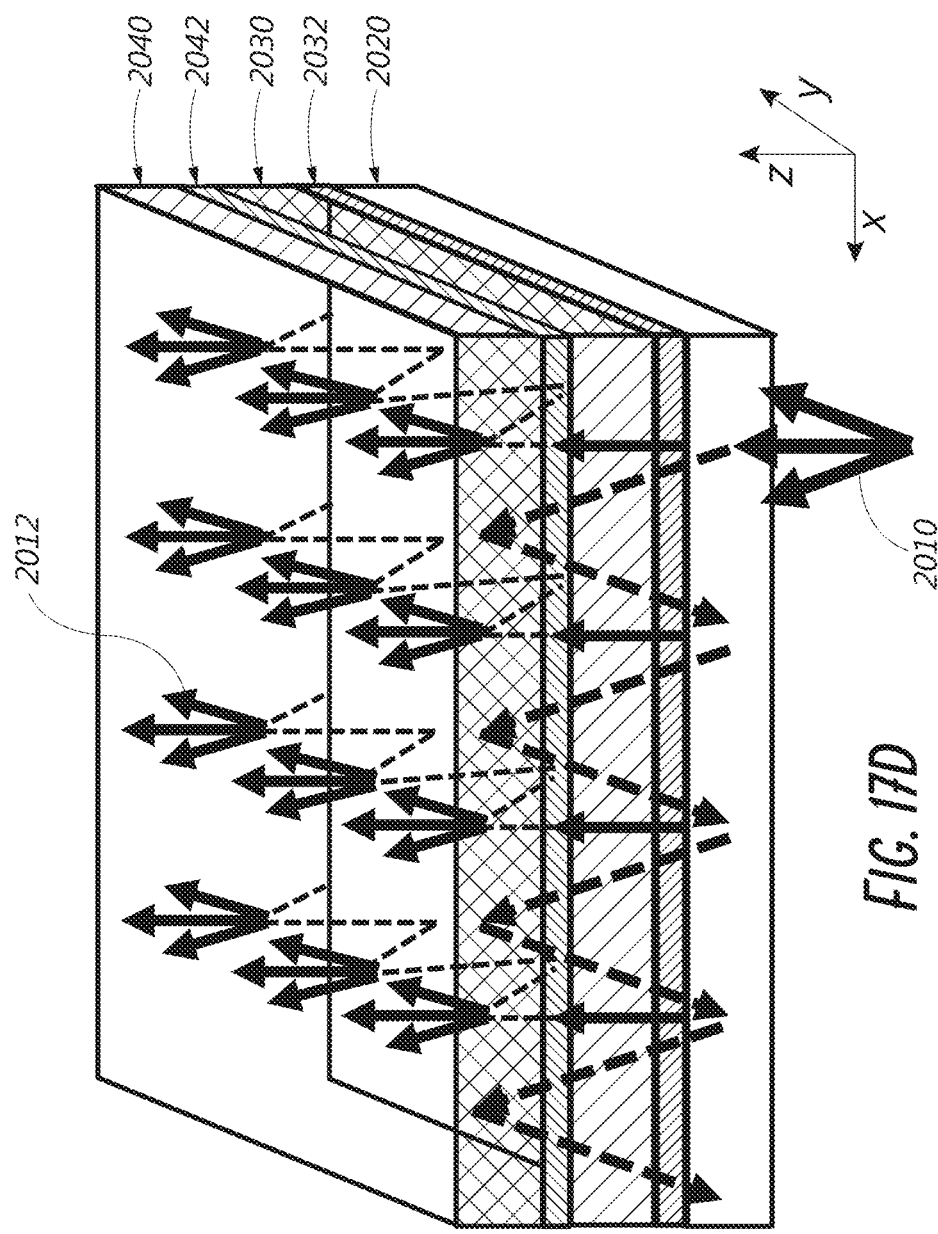
FIG. 17D shows a schematic diagram of light being incoupled from multiple incident angles, distributed in two dimensions, and outcoupled at multiple angles by a two-dimensional waveguide light multiplexer comprising crossed polarization gratings according to some embodiments.

FIG. 17D illustrates the two-dimensional waveguide light multiplexer 2000 of FIG. 17B and also illustrates that two-dimensional light multiplexing can be achieved at high efficiencies for a broad range of incident angles of light 2010. This broad range of incidence is preserved when the light is multiplexed and outcoupled 2012 from the two-dimensional waveguide light multiplexer 2000 such that a light signal comprising an image having wide field-of-view can be efficiently multiplexed in two dimensions. The ability to efficiently multiplex a wide field-of-view image in two dimensions may useful in, for example, an augmented reality device as described herein.

ADDITIONAL EXAMPLES

In a 1st example, an optical element is provided herein, wherein the optical element comprises a waveguide, at least one or more first diffraction gratings having a grating direction, the one or more first diffraction gratings disposed on a major surface of the waveguide, and at least one or more second diffraction gratings having a grating direction, the one or more second diffraction gratings disposed with respect to the one or more first diffraction gratings such that the grating direction of the one or more first diffraction gratings is perpendicular to the grating direction of the one or more second diffraction gratings.

In a 2nd example, in the optical element of the 1st example, the one or more first diffraction gratings are disposed on a bottom major surface of the waveguide and the one or more second diffraction gratings are disposed on a top major surface of the waveguide.

In a 3rd example, in the optical element of the 1st example, the one or more first diffraction gratings are disposed on a top major surface of the waveguide and the one or more second diffraction gratings are disposed above the top major surface of the waveguide.

In a 4th example, in the optical element of the 3rd example, the one or more second diffraction gratings are separated from the one or more first diffraction gratings by an isolation layer.

In a 5th example, in the optical element of the 4th example, the isolation layer comprises a transparent oxide or polymer material.

In a 6th example, in the optical element of any of the 1st to 3rd examples, the one or more first diffraction gratings and the one or more second diffraction gratings each comprise a symmetric diffraction grating.

In a 7th example, in the optical element of any of the 1st to 3rd examples, the one or more first diffraction gratings further comprise at least one or more first asymmetric diffraction gratings having a first diffraction direction and at least one or more second asymmetric diffraction gratings having a second diffraction direction anti-parallel to the first diffraction direction, and the one or more second diffraction gratings further comprise at least one or more third asymmetric diffraction gratings having a third preferred diffraction direction and at least one or more fourth asymmetric diffraction gratings having a fourth diffraction direction anti-parallel to the third diffraction direction.

In a 8th example, in the optical element of the 7th example, the one or more first, second, third, and fourth asymmetric diffraction gratings comprise a blazed grating, a Bragg grating, a liquid crystal grating, a sinusoidal grating, a binary grating, a volume phase grating, or a meta-surface grating.

In a 9th example, in the optical element of the 8th example, the one or more first, second, third, and fourth asymmetric diffraction gratings comprise a liquid crystal material.

In a 10th example, in the optical element of the 9th example, the one or more first, second, third, and fourth asymmetric diffraction gratings comprise nematic liquid crystal material.

In a 11th example, in the optical element of the 9th example, the one or more first, second, third, and fourth asymmetric diffraction gratings comprise a cholesteric liquid crystal material.

In a 12th example, in the optical element of the 9th example, the one or more first, second, third, and fourth asymmetric diffraction gratings comprise a polymerizable liquid crystal material.

In a 13th example, in the optical element of any of the 9th to 12th examples, the one or more first, second, third, and fourth asymmetric diffraction gratings are formed by a nano-imprinting process.

In a 14th example, in the optical element of any of the 9th to 12th examples, the first asymmetric diffraction grating is deposited on first alignment layer and the third asymmetric diffraction grating is deposited on a second alignment layer.

In a 15th example, in the optical element of the 14th example, the second asymmetric diffraction grating is deposited directly on the first asymmetric diffraction grating and the fourth asymmetric diffraction grating is deposited directly on the third asymmetric diffraction grating.

In a 16th example, in the optical element of any of the 9th to 15th examples, the one or more first, second, third, and fourth asymmetric diffraction gratings comprise a polarization grating.

In a 17th example, in the optical element of the 11th example, the one or more first, second, third, and fourth asymmetric diffraction gratings comprise a polarization grating and wherein a tilt angle of an asymmetric diffraction grating corresponds to a chirality, handedness, and helical pitch, of the cholesteric liquid crystal material.

In a 18th example, in the optical element of the 16th example, a tilt angle of each asymmetric diffraction grating corresponds to an amount of a chiral dopant in the liquid crystal material.

In a 19th example, in the optical element of the 16th example, the first, second, third, and fourth asymmetric diffraction grating comprise a plurality of liquid crystal material layers, wherein at least two of the plurality of liquid crystal material layers for one of said diffraction gratings have different tilt angles.

In a 20th example, in the optical element of any of the 16th to 19th examples, the one or more first asymmetric diffraction gratings comprise a first circular polarization handedness and the one or more second asymmetric diffraction gratings comprises a second circular polarization handedness orthogonal to the to the first circular polarization handedness.

In a 21th example, in the optical element of any of the 16th to 20th examples, the one or more third asymmetric diffraction gratings comprise a third circular polarization handedness and the one or more fourth asymmetric diffraction gratings comprises a fourth circular polarization handedness orthogonal to the to the third circular polarization handedness.

In a 22nd example, a method of distributing a light signal in two dimensions, the method includes distributing the light signal in a first direction via a first diffraction grating. The method additionally includes propagating a portion of the light signal in the first direction via total internal refection in a waveguide. The method additionally includes outcoupling a portion of the light signal propagating in the first direction in an outcoupling direction via the first diffraction grating. The method additionally includes distributing a portion of the light signal in a second direction via a second diffraction grating. The method additionally includes propagating the portion of the light signal in the second direction via total internal refection in the waveguide. The method additionally includes outcoupling the portion of the light signal propagating in the second direction in the outcoupling direction via the second diffraction grating, wherein the first direction is perpendicular to the second direction, and wherein the light signal is outcoupled at a plurality of locations disposed on a major surface of the waveguide.

In the foregoing specification, various specific embodiments have been described. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A waveguide comprising:
    a single substrate configured to propagate light within the waveguide by total internal reflection (TIR) as the light internally reflects off of opposite major surfaces of the single substrate; and
    an optical element on the substrate, the optical element arranged to multiplex, in at least a first direction and a second direction that is substantially perpendicular to the first direction, the light that is propagating in the waveguide while incoupling the light into the waveguide or outcoupling at least a portion of the light from the waveguide, the optical element comprising:
        a first arrangement of one or more first diffraction gratings disposed on a major surface of the substrate, wherein the one or more first diffraction gratings are arranged to cause the light propagating in the waveguide to be multiplexed in the first direction; and
        a second arrangement of one or more second diffraction gratings disposed over and overlapping the one or more first diffraction gratings on a same side of the substrate such that the one or more first diffraction gratings are substantially between the substrate and the one or more second diffraction gratings without another waveguide interposed between the one or more first diffraction gratings and the one or more second diffraction gratings,
        wherein the one or more second diffraction gratings are arranged to cause the light propagating in the waveguide to be multiplexed in the second direction that is different than the first direction, wherein the first and second directions are different lateral directions that are substantially parallel to the major surface of the waveguide and that are substantially perpendicular to each other, and
        wherein the first direction is substantially perpendicular to the second direction to cause the light propagating in the waveguide to be multiplexed in the substantially perpendicular first and second directions within the same waveguide.

2. The waveguide of claim 1, wherein the optical element is an outcoupling optical element that is further arranged to outcouple, from the waveguide, at least a portion of the light that is propagating in the waveguide, while multiplexing the light in at least the first direction and the second direction.

3. The waveguide of claim 2, further comprising an incoupling optical element on the substrate, the incoupling optical element arranged to incouple, into the waveguide, light that is incident on the incoupling optical element such that at least a portion of the light is propagated within the waveguide.

4. The waveguide of claim 3, wherein the incoupling optical element is positioned at a location on the substrate that is laterally displaced from the outcoupling optical element.

5. The waveguide of claim 1, wherein the optical element is an incoupling optical element that is further arranged to incouple, into the waveguide, the light that is incident on the incoupling optical element such that at least a portion of the light is propagated within the waveguide, while multiplexing the light in at least the first direction and the second direction.

6. The waveguide of claim 5, further comprising an outcoupling optical element on the substrate, the outcoupling optical element arranged to outcouple, from the waveguide, at least a portion of light that is propagating in the waveguide.

7. The waveguide of claim 6, wherein the outcoupling optical element is positioned at a location on the substrate that is laterally displaced from the incoupling optical element.

8. The waveguide of claim 1, wherein one or both of the first arrangement and the second arrangement comprises at least one symmetric diffraction grating.

9. The waveguide of claim 1, wherein one or both of the first arrangement and the second arrangement comprises at least one polarization grating.

10. The waveguide of claim 1, wherein one or both of the first arrangement and the second arrangement comprises a first layer of one or more first asymmetric diffraction gratings and a second layer of one or more second asymmetric diffraction gratings.

11. The waveguide of claim 10, wherein the one or more first asymmetric diffraction gratings have a first diffraction direction and the one or more second asymmetric diffraction gratings have a second diffraction direction different than the first diffraction direction.

12. The waveguide of claim 10, wherein the one or more first asymmetric diffraction gratings are deposited on an alignment layer that is on the substrate, and the one or more second asymmetric diffraction gratings are deposited on the one or more first asymmetric diffraction gratings.

13. The waveguide of claim 10, wherein the one or more first asymmetric diffraction gratings include one or more first polarization gratings having a first tilt angle, and the one or more second asymmetric diffraction gratings include one or more second polarization gratings having a second tilt angle different than the first tilt angle.

14. The waveguide of claim 13, wherein the one or more first polarization gratings have a first chirality, and the one or more second polarization gratings have a second chirality different than the first chirality.

15. The waveguide of claim 14, wherein one or both of the first arrangement and the second arrangement includes at least one diffraction grating comprising a liquid crystal material, and wherein the tilt angle of each asymmetric diffraction grating corresponds to an amount of a chiral dopant in the liquid crystal material of the asymmetric diffraction grating.

16. The waveguide of claim 10, wherein the one or more first asymmetric diffraction gratings exhibit a first circular polarization handedness and the one or more second asymmetric diffraction gratings exhibit a second circular polarization handedness orthogonal to the first circular polarization handedness.

17. The waveguide of claim 1, wherein one or both of the first arrangement and the second arrangement includes at least one diffraction grating comprising a cholesteric liquid crystal material.

18. The waveguide of claim 1, wherein one or both of the first arrangement and the second arrangement comprises at least one blazed diffraction grating.

19. The waveguide of claim 1, wherein one or both of the first arrangement and the second arrangement comprises at least one binary diffraction grating.

20. The waveguide of claim 1, wherein the substrate comprises an optically transparent portion.

* * * * *